(12) United States Patent
Cash et al.

(10) Patent No.: US 7,548,879 B2
(45) Date of Patent: *Jun. 16, 2009

(54) CONVENIENCE STORE EFFECTIVENESS MODEL (CSEM)

(75) Inventors: Charles Robert Cash, New Albany, OH (US); William Douglas Poynter, Duluth, GA (US); Phinsuda Tarmy, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 895 days.

This patent is subject to a terminal disclaimer.

(21) Appl. No.: 10/197,476

(22) Filed: Jul. 18, 2002

(65) Prior Publication Data

US 2004/0015424 A1 Jan. 22, 2004

(51) Int. Cl.
*G06Q 40/00* (2006.01)

(52) U.S. Cl. .............................. 705/35; 703/22; 705/8; 705/9; 705/10

(58) Field of Classification Search .................. 705/35, 705/16, 42, 43, 70, 7, 8, 9, 10; 703/22; 235/383
See application file for complete search history.

(56) References Cited

U.S. PATENT DOCUMENTS

| | | | | |
|---|---|---|---|---|
| 4,972,504 A * | 11/1990 | Daniel et al. | ................... | 705/10 |
| 5,331,544 A * | 7/1994 | Lu et al. | ........................ | 705/10 |
| 5,390,107 A * | 2/1995 | Nelson et al. | .................. | 705/10 |
| 5,490,060 A * | 2/1996 | Malec et al. | ................... | 705/10 |
| 5,586,021 A * | 12/1996 | Fargher et al. | ............... | 700/100 |
| 5,764,953 A * | 6/1998 | Collins et al. | .................. | 703/17 |
| 5,765,143 A * | 6/1998 | Sheldon et al. | ............... | 705/28 |
| 5,832,456 A * | 11/1998 | Fox et al. | ....................... | 705/10 |
| 5,893,075 A * | 4/1999 | Plainfield et al. | .............. | 705/14 |
| 5,974,396 A * | 10/1999 | Anderson et al. | ............. | 705/10 |
| 6,125,351 A * | 9/2000 | Kauffman | ....................... | 705/7 |
| 6,219,065 B1 * | 4/2001 | Mashita et al. | .............. | 345/619 |
| 6,505,168 B1 * | 1/2003 | Rothman et al. | .............. | 705/10 |
| 7,146,304 B1 * | 12/2006 | Cash et al. | ..................... | 703/22 |
| 2001/0041995 A1 * | 11/2001 | Eder | .............................. | 705/7 |
| 2001/0053991 A1 * | 12/2001 | Bonabeau | ....................... | 705/7 |
| 2002/0032655 A1 * | 3/2002 | Antonin et al. | ............... | 705/43 |
| 2002/0032656 A1 * | 3/2002 | Chen | ........................... | 705/43 |

(Continued)

OTHER PUBLICATIONS

Human Factors Engineering: User Interface Design Services (1999). www.ncr.com.*

(Continued)

*Primary Examiner*—Hani Kazimi
*Assistant Examiner*—Muriel Tinkler
(74) *Attorney, Agent, or Firm*—Harden E. Stevens, III

(57) ABSTRACT

Convenience Store Effectiveness Model (CSEM) is a self-contained PC application to quantitatively predict operational and financial impact of changes to Convenience Store (CStore) and Financial Services Center (FSC) operations. CSEM includes Simulation Analysis Module and Financial Analysis Module. Simulation Analysis Module includes FSC model and CStore model. CStore model predicts the effect of an unlimited number of changes in store design, customer demand patterns, and checkout procedures on store performance. Financial Analysis Module creates a Profit and Loss (P&L) statement showing cash flows, Net Present Value (NPV), and Internal Rate of Return (IRR) for deploying FSCs using simulation results or user input values. An analyst can use CSEM to provide a sound and quantified basis for developing a business case for investing in new technologies, i.e., FSC, or other design and procedure changes in a convenience store environment.

23 Claims, 47 Drawing Sheets

U.S. PATENT DOCUMENTS

| | | | |
|---|---|---|---|
| 2002/0035478 A1* | 3/2002 | Levitt et al. | 705/1 |
| 2002/0042751 A1* | 4/2002 | Sarno | 705/26 |
| 2003/0014379 A1* | 1/2003 | Saias et al. | 706/45 |
| 2004/0002843 A1* | 1/2004 | Robarts et al. | 703/13 |

OTHER PUBLICATIONS

White-K.P. Simulating Nonstationary Poisson Process using Bivariate Thinning: the case of "typical weekday" arrivals at a consumer electronics store. Dept. of System Engineering. Univ. of Virginia Dec. 5-Dec. 8, 1999.*

Gabriel et al. A Simulation Approach to Balancing Annual Risk and Reward in Retail Electrical Power Markets Univ. of Mayrland Nov. 2002.*

Madigan-E.F. et al. "Simulation Success Storeis: Business Processing Reengineering" 1997 Winter Simulation Cofnerence. p. 1275-1279 (pertinent pp. 1276-1277).*

* cited by examiner

FIG. 9

Edit Simulation Scenario

Model Name: FSC Model

Scenario Name: test

Parameter Categories

- Model Parameters (902)
- Customer Demand (904)
- Transaction Probabilities (906)
- ATM Transactions (908)
- Check Transactions (910)
- Bill Payment Transactions (912)
- Money Order Transactions (914)
- Wire Transfer Transactions (916)
- Phone Card Transactions (918)
- General Transactions (920)

| Parameter | Value | Range | Description |
|---|---|---|---|
| Time length of scenario | 1200 | 0.0 to 1440.0 (minutes) | Length of simulation scenario in minutes |
| Unlimited arrivals option identifier | 0 | 0 or 1 | Enter 0 to represent customer arrival process OR 1 to represent unlimited number of customers |
| Constant inter-arrival option identifier | 0 | 0 or 1 | Enter 0 to represent a random customer arrival process OR 1 to represent a constant time between arrivals. Only used if Unlimited Arrivals Option is off (i.e., 0) |
| Customer arrival rate | 1.6 | 1.0 to 200.0 (customers per hour) | Expected number of customer arrivals per hour. Only used if Unlimited Arrivals Option is off (i.e., 0) |
| Balk queue size threshold | 5 | 0 to 50 | The queue size threshold for the FSC at which a new |

Return to Simulation Analysis Form

FIG. 12

Customer Decision Matrix -- Inside

| From \ To | FSC | ATM | Cooler Non-Alcohol | Cooler Alcohol | Cooler Other | Food Court -Hot Drinks | Food Court -Cold Drinks | Food Court -Food | Merchandise Shelves | Other Service |
|---|---|---|---|---|---|---|---|---|---|---|
| Store Entrance | 0.427 | 0 | 0.053 | 0.031 | 0.008 | 0.02 | 0.061 | 0.009 | 0.076 | 0.01 |
| FSC | 0 | 0 | 0.011 | 0.027 | 0 | 0 | 0.011 | 0.011 | 0.141 | 0.005 |
| ATM | 0 | 0 | 0 | 0 | 0 | 0 | 0 | 0 | 0 | 0 |
| Cooler Non-Alcohol | 0.013 | 0 | 0 | 0.115 | 0 | 0 | 0.128 | 0.026 | 0.167 | 0.026 |
| Cooler Alcohol | 0 | 0 | 0.042 | 0 | 0 | 0 | 0 | 0 | 0.042 | 0 |
| Cooler Other | 0 | 0 | 0.077 | 0 | 0 | 0 | 0.077 | 0.007 | 0.294 | 0 |
| Food Court-Hot Drinks | 0 | 0 | 0 | 0 | 0.059 | 0 | 0.059 | 0.059 | 0.106 | 0.021 |
| Food Court-Cold Drinks | 0 | 0 | 0.085 | 0 | 0.021 | 0.056 | 0 | 0.021 | 0.056 | 0.111 |
| Food-Court Food | 0 | 0 | 0.167 | 0.037 | 0.111 | 0.028 | 0.167 | 0 | 0 | 0.019 |
| Merchandise Shelves | 0.075 | 0 | 0.047 | 0.111 | 0 | 0.111 | 0.084 | 0.019 | 0 | 0 |
| Other Service Points | 0 | 0 | 0.111 | 0.111 | 0 | 0.111 | 0.111 | 0 | 0 | 0 |
| Checkout Counter | 0.047 | 0 | 0.008 | 0.006 | 0.011 | 0.03 | 0.011 | 0.011 | 0.05 | 0.006 |

Print CDM — Reset Values to Zero — Return to Previous Form

FIG. 14

Performance Measures for Convenience Store Model
November 19, 1999

| Performance Measure | Average | Standard Error | Minimum | Maximum | Scenario Name |
|---|---|---|---|---|---|
| Scenario run length (hours) | 24.00 | 0.00 | 24.00 | 24.00 | Default |
| Number of replications | 30.00 | 0.00 | 30.00 | 30.00 | Default |
| Number of customers served | 1,455.93 | 8.28 | 1,339.00 | 1,541.00 | Default |
| Number of items purchased (includes lotto tickets) | 664.93 | 5.10 | 625.00 | 751.00 | Default |
| Number of lottery tickets purchased | 139.33 | 2.62 | 108.00 | 166.00 | Default |
| Gallons of gas purchased | 3,114.37 | 35.37 | 2,571.00 | 3,550.00 | Default |
| Number of outside balks | 85.67 | 4.73 | 53.00 | 163.00 | Default |
| Average number at store | 13.99 | 0.14 | 12.75 | 15.63 | Default |
| Maximum number at store | 31.27 | 0.50 | 26.00 | 37.00 | Default |
| Average time at store (minutes) | 13.49 | 0.18 | 11.97 | 16.17 | Default |
| Maximum time at store (minutes) | 128.20 | 3.93 | 88.92 | 176.17 | Default |
| Scheduled cashier time (hours) | 2,160.00 | 0.00 | 2,160.00 | 2,160.00 | Default |
| Cashier busy time (hours) | 1,072.18 | 6.72 | 999.39 | 1,173.59 | Default |
| Scheduled supervisor time (hours) | 1,080.00 | 0.00 | 1,080.00 | 1,080.00 | Default |
| Supervisor busy time (hours) | 0.00 | 0.00 | 0.00 | 0.00 | Default |
| FSC average queue size | 4.10 | 0.04 | 3.63 | 4.51 | Default |
| FSC maximum queue size | 6.03 | 0.03 | 6.00 | 7.00 | Default |
| FSC queue time (minutes) | 26.00 | 0.39 | 21.87 | 30.88 | Default |
| FSC transaction time (minutes) | 6.18 | 0.07 | 5.43 | 6.97 | Default |
| FSC transaction count (all FSC transactions) | 230.23 | 2.64 | 204.00 | 263.00 | Default |
| FSC transaction count - ATM | 110.90 | 2.26 | 87.00 | 140.00 | Default |
| FSC transaction count - Check Cashing | 104.10 | 1.11 | 95.00 | 119.00 | Default |
| FSC transaction count - Money Order | 7.67 | 0.47 | 2.00 | 12.00 | Default |
| FSC transaction count - Wire Transfer | 5.83 | 0.38 | 2.00 | 10.00 | Default |
| FSC transaction count - Phone Card | 1.50 | 0.21 | 0.00 | 4.00 | Default |
| FSC transaction count - Bill Payment | 0.23 | 0.08 | 0.00 | 1.00 | Default |
| FSC transaction count - General | 0.00 | 0.00 | 0.00 | 0.00 | Default |
| FSC unsuccessful transaction count | 24.93 | 0.77 | 15.00 | 35.00 | Default |
| FSC balk count | 380.67 | 4.98 | 341.00 | 450.00 | Default |

FIG. 29

Performance Measures for FSC Model
December 13, 1999

| Performance Measure | Average | Standard Error | Minimum | Maximum | Scenario Name |
|---|---|---|---|---|---|
| Scenario run length (minutes) | 1,200.00 | 0.00 | 1,200.00 | 1,200.00 | test |
| Number of replications | 50.00 | 0.00 | 50.00 | 50.00 | test |
| Number of customers | 33.00 | 0.82 | 21.00 | 51.00 | test |
| Number of successful transactions | 32.00 | 0.82 | 20.00 | 49.00 | test |
| Number of unsuccessful transactions | 1.00 | 0.19 | 0.00 | 5.00 | test |
| Number of balks | 0.00 | 0.00 | 0.00 | 0.00 | test |
| Total transaction time (minutes) | 2.00 | 0.07 | 1.68 | 3.53 | test |
| Queue size | 0.00 | 0.00 | 0.00 | 0.03 | test |
| Maximum queue size | 0.00 | 0.09 | 0.00 | 3.00 | test |
| Queue time (minutes) | 0.00 | 0.03 | 0.00 | 1.06 | test |
| Utilization of FSC | 0.00 | 0.00 | 0.03 | 0.10 | test |
| CI terminal task time (minutes) | 2.00 | 0.55 | 0.00 | 19.99 | test |
| ATM transaction time (minutes) | 1.00 | 0.01 | 1.30 | 1.80 | test |
| Check Cashing transaction time (minutes) | 7.00 | 0.34 | 3.86 | 19.89 | test |
| Money Order transaction time (minutes) | 3.94 | 0.96 | 0.00 | 39.02 | test |
| Wire Transfer transaction time (minutes) | 0.00 | 0.13 | 0.00 | 3.98 | test |
| Phone Card transaction time (minutes) | 0.00 | 0.00 | 0.00 | 0.00 | test |
| Bill Payment transaction time (minutes) | 0.00 | 0.00 | 0.00 | 0.01 | test |
| General transaction time (minutes) | 0.00 | 0.00 | 0.00 | 0.00 | test |
| Number of successful ATM transaction | 27.00 | 0.79 | 15.00 | 45.00 | test |
| Number of successful Check Cashing transactions | 3.00 | 0.24 | 1.00 | 8.00 | test |
| Number of successful Money Order transactions | 0.00 | 0.11 | 0.00 | 3.00 | test |
| Number of successful Wire Transfer transactions | 0.00 | 0.04 | 0.00 | 1.00 | test |
| Number of successful Phone Card transactions | 0.00 | 0.00 | 0.00 | 0.00 | test |
| Number of successful Bill Payment transactions | 0.00 | 0.02 | 0.00 | 1.00 | test |

Financial Analysis Results

Model Name: FSC Model    Scenario Name: test

| | Year 0 | Year 1 | Year 2 | Year 3 | Year 4 | Ye... |
|---|---|---|---|---|---|---|
| Benefits and Cost Analysis | | | | | | |
| Number of Transactions | | 47684 | 52452.4 | 57697.64 | 63467.41 | 698 |
| Acquisition, Setup Cost & Salvage | 60000 | 0 | 0 | 0 | 0 | 0 |
| Benefits | | | | | | |
| Transaction Revenue | | 69154.54 | 76069.99 | 83676.99 | 92044.69 | 101 |
| Other Revenue | | 2000 | 2080 | 2163.2 | 2249.728 | 233 |
| Costs | | | | | | |
| Transaction Cost | | 28078.96 | 30886.86 | 33975.54 | 37373.09 | 411 |
| Other Cost | | 900 | 935.9999 | 973.4399 | 1012.377 | 105 |
| Depreciation | | 11000 | 11000 | 11000 | 11000 | |
| IBT | | 31175.58 | 35327.14 | 39891.21 | 44908.94 | 504 |
| | | | | | | |
| Financial Analysis | | | | | | |
| Income Tax | | 12158.47 | 13777.58 | 15557.57 | 17514.49 | 196 |
| Net Income (Loss) | | 19017.1 | 21549.55 | 24333.64 | 27394.45 | 307 |
| Add Back Depreciation | | 11000 | 11000 | 11000 | 11000 | |
| Net After Tax Cash Flow | -60000 | 30017.1 | 32549.55 | 35333.64 | 38394.45 | 417 |
| Cumulative Cash Flow | | -29982.9 | 2566.656 | 37900.3 | 76294.75 | 118 |
| | | | | | | |
| Business Impact | | | | | | |
| Number of FSCs | | 1 | 0 | 0 | 0 | |

Print Scenarios — 3202    Return to Financial Analysis Form — 3204    Return to Main Menu — 3206

P&L Statement for Financial Services Center

| Scenario Name | Year 0 | Year 1 | Year 2 | Year 3 | Year 4 | Year 5 | Year 6 | Year 7 | Year 8 | Year 9 | Year 10 |
|---|---|---|---|---|---|---|---|---|---|---|---|
| test | | | | | | | | | | | |
| Benefits and Cost Analysis | | | | | | | | | | | |
| Number of Transactions | | 47,684 | 52,452 | 57,698 | 63,467 | 69,814 | 0 | 0 | 0 | 0 | 0 |
| Acquisition, Setup Cost & Salvage | 60,000 | 0 | 0 | 0 | 0 | 0 | 0 | 0 | 0 | 0 | 0 |
| Benefits | | | | | | | | | | | |
| Tranaction Revenue | | 69,155 | 76,070 | 83,677 | 92,045 | 101,249 | 0 | 0 | 0 | 0 | 0 |
| Other Revenue | | 2,000 | 2,080 | 2,163 | 2,250 | 2,340 | 0 | 0 | 0 | 0 | 0 |
| Cost | | 0 | 0 | 0 | 0 | 0 | 0 | 0 | 0 | 0 | 0 |
| Tranaction Cost | | 28,079 | 30,887 | 33,976 | 37,373 | 41,110 | 0 | 0 | 0 | 0 | 0 |
| Other Cost | | 900 | 936 | 973 | 1,012 | 1,053 | 0 | 0 | 0 | 0 | 0 |
| Depreciation | | 11,000 | 11,000 | 11,000 | 11,000 | 11,000 | 0 | 0 | 0 | 0 | 0 |
| IWT | | 31,176 | 35,327 | 39,891 | 44,909 | 50,426 | 0 | 0 | 0 | 0 | 0 |
| Financial Analysis | | | | | | | | | | | |
| Income Tax | | 12,158 | 13,778 | 15,558 | 17,514 | 19,666 | 0 | 0 | 0 | 0 | 0 |
| Net Income (Loss) | | 19,017 | 21,550 | 24,334 | 27,394 | 30,760 | 0 | 0 | 0 | 0 | 0 |
| Add Back Depreciation | | 11,000 | 11,000 | 11,000 | 11,000 | 11,000 | 0 | 0 | 0 | 0 | 0 |
| Net Afte Tax Cash Flow | | 30,017 | 32,550 | 35,334 | 38,394 | 41,760 | 0 | 0 | 0 | 0 | 0 |
| Cumulative Cash Flow | -60,000 | -29,983 | 2,567 | 37,900 | 76,295 | 118,054 | 0 | 0 | 0 | 0 | 0 |
| Business Impact | | | | | | | | | | | |
| Number of FSCs | | 1 | 0 | 0 | 0 | 0 | 0 | 0 | 0 | 0 | 0 |
| Net Present Value (NPV) | | 62,756 | 0 | 0 | 0 | 0 | 0 | 0 | 0 | 0 | 0 |
| Internal Rate of Return (IRR) | | 0 | 0 | 0 | 0 | 0 | 0 | 0 | 0 | 0 | 0 |
| Approximate Payback Period | | 2 | 0 | 0 | 0 | 0 | 0 | 0 | 0 | 0 | 0 |

3300

CUSTOMER ACTIVITY

BALK CHECK LOGIC

GENERAL SERVICE PROCESS

FSC PROCESS

COUNTER PROCESS

CASHIER SCHEDULE LOGIC

CUSTOMER TRANSACTION PROCESS
ON A FINANCIAL SERVICE CENTER (FSC)

CONVENIENCE STORE EFFECTIVENESS MODEL (CSEM)

RELATED APPLICATIONS

The present invention claims priority from a provisional application Ser. No. 60/151,629 filed on Aug. 31, 1999 entitled "Management Decision Modeling Software Applications" which is hereby incorporated by reference in its entirety into this specification. The present application is related to application Ser. No. 09/653,195 filed on Aug. 31, 2000 entitled "Branch Effectiveness Model Application" which is hereby incorporated by reference in its entirety into the present specification. The present application also claims priority from application Ser. No. 09/653,196 filed on Aug. 31, 2000 entitled "Lane and Front End Effectiveness Model" which is hereby incorporated by reference in its entirety into the present specification.

FIELD OF THE INVENTION

The present invention relates generally to Management Decision Modeling (MDM), and more particularly, to a type of MDM used for modeling a convenience store. Even more particularly, the present invention is related to an MDM called a Convenience Store Effectiveness Model (CSEM) used to predict the impact of changes to an existing or future convenience store.

BACKGROUND ART

Management Decision Models (MDM) are a class of software applications and methodologies that provide decision-makers with new information about their business to help them address key business issues. MDM are flexible, data driven, software tools used to predict the operational effect of process, design, or technology changes on productivity and other business performance measures, as well as the financial impact of such changes. MDM may be customized to address questions relating to any business domain, including product manufacturing, service industry, and retail operations (e.g., convenience stores and post offices). MDMs have graphical user interfaces. Components of an MDM include 1) a database management module to maintain the application's input data parameters and output data performance measures; 2) a simulation engine to represent the dynamic interaction between the elements of a system, such as, the people, equipment, material, information and energy; 3) animation to visualize how the system reacts to changes in input parameters; 4) an environmental design layout module for calculating physical space requirements to accommodate new equipment or process changes; and 5) a financial module which transforms operational performance measures into financial metrics to assess the return on investment for the evaluated changes.

The output from a MDM indicates the predicted performance of the system using metrics that are most meaningful to the decision-maker. The output includes operational performance measures, such as, queuing times or sizes, equipment utilization, number of stock-outs, and customer system times as well as financial metrics, such as Internal Rate of Return (IRR), Net Present Value (NPV), and Payback Period.

There are no MDMs that are currently available to characterize an existing or future retailer's store checkout process or entire convenience store's operations that attempts to solve the complex design and operational problems.

There are no computer software applications that are currently available to address complex convenience store design and operational problems using the methodology and features provided by the present invention. Thus, a need exists in the art for a CSEM which has the flexibility, features and functionality to address strategic issues relating to convenience store design and operational issues.

DISCLOSURE/SUMMARY OF THE INVENTION

It is therefore an object of the present invention to provide a model for predicting the impact of changes to retail and financial customer service points commonly found in a convenience store domain.

Another object of the present invention is to provide a model to predict the impact of changes to an existing or future convenience stores.

Another object of the present invention is to provide a simulation model which shows an animation and outputs results based on changes to existing or future convenience stores.

Yet another object of the present invention is to provide a simulation model having numerous parameters such that users with little or no simulation or modeling experience can easily use the CSEM application.

The CSEM is a self-contained PC desktop application enabling an analyst to quantitatively predict the impact of changes to convenience store and financial services center (FSC) operations. An FSC is a self-service device enabling customers to perform ATM transactions, cash checks, purchase money orders, send/receive wire transfers, purchase phone cards, pay bills, and possibly other related transactions. One example FSC is a financial kiosk. Convenience Store environments have been identified as an ideal delivery channel for this type of self-service device. Modeling tools, such as the CSEM, when used in a customer engagement or product research and development role can help provide a sound and quantified basis for developing a business case for investing in new technologies, i.e., FSC, or other design and procedure changes.

The CSEM application, according to an embodiment of the present invention, includes two simulation models and a financial analysis model all representing the complex interactions between customers, staff, and convenience store resources. The first simulation model is a Financial Services Center Simulation Model (FSC Model) and the second model is a Convenience Store Simulation Model (CStore Model). The preferred embodiment of the FSC Model represents the detailed transaction process performed by customers at an FSC and allows the user to predict the effect of changes in FSC design, transaction features, and transaction times on customer service (e.g., queue times, queue size, and throughput). Modeling an FSC by itself provides a clearer understanding of the relationship between its features and its performance without the additional assumptions and work required to characterize the environment in which it is located.

The preferred embodiment of the CStore Model represents the multifaceted interactions between customers, staff, and primary service points of a Convenience Store (e.g., gas pumps, parking spaces, food courts, self-service points, checkout counters, etc.). Although, one intended use of the CStore Model is to predict the impact of deploying FSC in convenience store environments, the user can employ the CStore Model to predict the effect of an unlimited number of changes in store design, customer demand patterns, and checkout procedures on store performance. The financial analysis model allows the user to create a Profit and Loss (P&L) statement showing the cash flows, Net Present Value (NPV), Internal Rate of Return (IRR) for deploying FSCs using simulation results or user input values.

An analyst can use the CSEM to evaluate, in detail, different convenience store configurations and transaction processes and the effect these changes have on convenience store performance. The overall purpose of the CSEM is to provide a product design team, consultant, or retailer with timely information to reduce the risk and uncertainties of investing in new technologies or design changes by predicting their impact and return before committing resources to their acquisition or implementation.

CSEM is a decision support software application that assists retail management in making strategic business decisions. The CSEM is inventive because it addresses business problems in a unique way. CSEM is a flexible, data-drive and integrated software tool. It is flexible so the user can address an unlimited number of process or design issues relating to customer points of transaction in a convenience store domain and the detailed customer interactions with a financial kiosk, i.e., a FSC. It is data driven so the user can customize a model to a particular problem by entering the appropriate values into the input data parameters (eliminating any software programming required by the user). It is integrated so the user can apply one or more components of the tool to address their business questions. Yet another key concept embodied by CSEM is that it is designed to be usable by individuals that are knowledgeable about the application domain and not necessarily knowledgeable about the tool's methodology. In summary, CSEM provides a structured, quantitative approach to address process, design, and technology changes in a convenience store environment and help retailers profitably manage and grow their business.

The current version of CSEM is a modeling application of the retail operations of convenience store systems. An analyst can use CSEM and detailed data, either collected or readily available, on a particular store (or category of stores) customizing the analysis to solve problems relating to that store (or category of stores) for a specific retailer. One value of CSEM is in providing an approach to improve the likelihood a retailer selects the right set of new technologies, convenience store design changes, and operating procedures by predicting their impact before committing to implementation.

The software tool enabling a user to employ this methodology is the CSEM application. CSEM is a general purpose, flexible, integrated, data-driven software tool that predicts the effect of process, design or technology changes on productivity and other business performance measures as well as the financial impact of such changes in a convenience store environment. It can be customized to address questions relating to any financial impact of such changes. It can be customized to address questions relating to any convenience store operations and customer service. Components of CSEM include:

a database management module to maintain the application's input data parameters and output data performance measures, a simulation engine and multiple simulation models to represent the dynamic interaction between the elements of a convenience store system, such as a retailer's personnel (cashiers, clerks, supervisors, etc.), store configurations, service points inside and outside the store, customers and operating procedures. The simulation models generate output data to provide quantitative predictions of system behavior over time and can be displayed and printed in numeric or graphical format, animation to visualize how the system reacts to changes in input parameters, an environmental design layout module which calculates physical space requirements to accommodate new equipment or process changes, a financial module which transforms operational performance measures generated either by simulation or direct user input into financial metrics that can be displayed or printed in numeric or graphical format.

The output from CSEM indicates predicted performance of the system using metrics most meaningful to the decision-maker. They would include operational performance measures, such as queuing times or sizes, equipment utilization, number of transactions and customer system times as well as financial metrics, such as IRR, NPV and Payback Period.

These and other objects of the present invention are achieved by collecting (or assembling available) data to characterize a particular convenience store system as prescribed by CSEM input data dictionary (i.e., set of input parameters); entering the data into CSEM's database module; selecting one or more of CSEM components, i.e., simulation models, design layout module, or financial module to analyze the data and to transform the data into actionable information. A method of quantitatively evaluating alternatives to check-out operations using a simulation model. Parameter values are input describing check-out operations into the simulation model. The simulation model is run and results are outputted from the simulation model.

The above described objects are fulfilled by a method of quantitatively evaluating alternatives to convenience store operations using a simulation model, design layout module, or financial module. Parameter values are input describing convenience store operations, then the user selects at least one of the analysis module to evaluate the performance of the system based on the set of inputs. The simulation model is run and results are outputted from the simulation model.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 9 depicts an edit simulation scenario form for an FSC model;

FIG. 12 depicts a customer decision matrix form;

FIG. 14 depicts a distribution of items purchased form;

FIG. 29 depicts an example report for a convenience store model;

FIG. 30 depicts an example report for a financial service center model;

FIG. 32 depicts a financial analysis output form;

FIG. 33 depicts a profit and loss statement;

BEST MODE FOR CARRYING OUT THE INVENTION

A method and apparatus for evaluating an existing or future convenience store are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
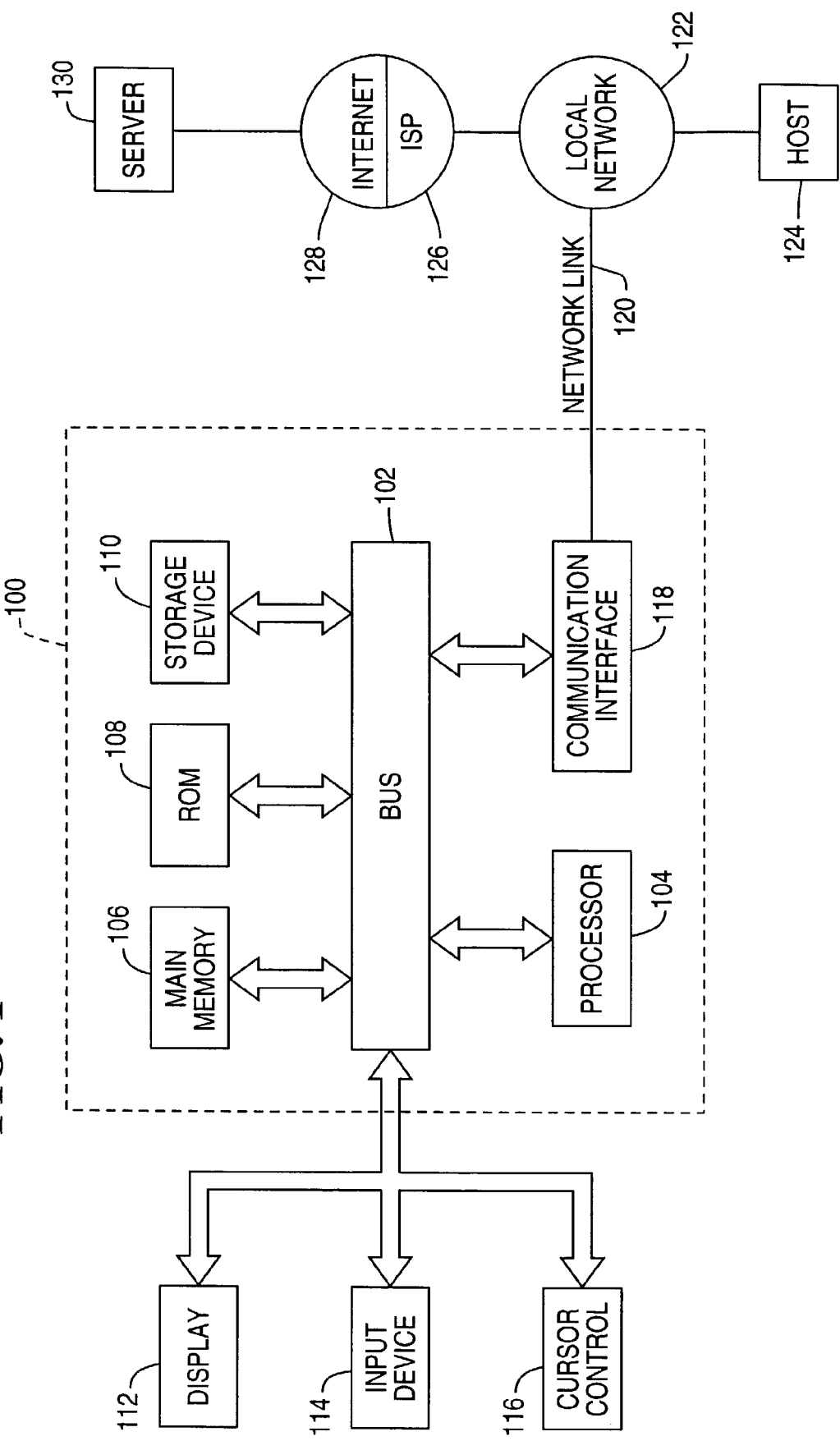
FIG. 1 is high-level block diagram of a computer system usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to display a convenience store effectiveness model. According to one embodiment of the invention, the convenience store effectiveness model and display is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line, e.g., an analog line or a digital subscriber line (DSL). As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the convenience store effectiveness model. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for a convenience store effectiveness model as described herein.

The received code may be executed by processor 104 as it is received, and/or stored in storage device 110, or other non-volatile storage for later execution. In this manner, computer system 100 may obtain application code in the form of a carrier wave.

The CSEM application provides an approach to quickly assess the impact of changes to FSC design features or a mix of service points and operations of a Convenience Store without incurring unnecessary costs. The preferred embodiment of this software tool has a Graphical User Interface (GUI) that allows the user to:

Input and manage data characterizing a particular simulation or financial scenario;

Select and run one or more scenarios corresponding to one of the two simulation models or calculate the financial return of one or more FSCs, and;

View or write (to a file, printer, or other software application) the simulation or financial results.

The preferred embodiment of CSEM includes two simulation models and a financial analysis model. The first model is called the FSC model and enables the user to predict the effect of changes in FSC design, transaction features, and transaction times on customer service (e.g., queue times, queue size, and throughput).

The second model, called the CStore model, represents the complex interactions between customers, staff, and the primary service points of a Convenience Store (e.g., gas pumps, parking spaces, food courts, self-service points, checkout counters, etc.). Although, the intended use of the CStore model is to predict the impact of deploying FSC in convenience store environment, one can use the CStore model to predict the effect of an unlimited number of changes in store design, customer demand patterns, and checkout procedures on store performance. The user can create scenarios that characterize a store's operations. For example, the user can specify the number and type of service points, transaction times, customer arrival patterns and numbers of items purchased, and personnel schedules.

The financial analysis model allows the user to create a P&L statement that displays the annual cash flows and return on investment for one or more FSCs using transactions counts from simulation results or transaction counts and financial values entered by the user.

The CSEM application provides an analyst with a process and tool usable to predict the impact of changes to FSC design or Convenience Store environments without physically making those changes. An analyst may use the CSEM application along with data that represents a retailer's operations to carry out a detailed analysis to determine which alternate (or set of alternatives) configurations and store procedures performs the best. Insight from the customer's data and results from running the model assist the analyst in identifying and recommending alternative business methods affecting:

Productivity;

Customer service;

Operating costs, and;

Overall profitability.

These improvements may result from the implementation of new checkout technologies or procedures, determining the appropriate number and type of FSC or other service points inside and outside of a store, refinements in personnel scheduling, etc.

Two components of a preferred embodiment of the CSEM application are now described: the Simulation Analysis and Financial Analysis Modules.

The Simulation Analysis Module allows the user to create and manage input data scenarios that characterize event times, logic, and configuration for both of the FSC and CStore simulation models. For example, the user may create a scenario that specifies number of counter positions or gas pumps, service times or service operations, customer arrival patterns or service requirements. The Data Input Dictionary (DID) for each simulation model lists and defines the parameters used in each model. Appendix A contains the combined DID and the default scenario parameter values for each model.

Although there are included methods to maintain data input integrity, such as limiting the range of values for input parameters, the development of procedures that would prevent the user from running unreasonable model scenarios is known to persons skilled in that art. Thus, the user is expected to understand the definitions of the input parameters and to use good judgment when running the model. Users may make invalid inferences based on results from the CSEM application.

Running Simulation

The Simulation Analysis Module allows the user to select one of the models and one or more input scenario, and run the simulation. Each simulation model can run with or without animation. A model with animation turned on is more effective for understanding and communicating the model's results. In many cases the animation provides a visual check that the model is running the way the user expects. There are also several screen views providing additional insight when the model is run with animation. With animation turned off, the models execute much faster, allowing the user to conduct more statistically sound experiments and evaluate more scenarios in a shorter time period. We refer to this mode of running scenarios as the analysis mode.

Simulation Output

The Simulation Analysis Output Module allows the user to view and write the results of the simulation to a file, printer, or another software application. The model output includes performance measures like FSC and cashier utilization, labor times, queue times, queue lengths, balk counts, and transaction volumes.

Financial Analysis Module

The Financial Analysis Module allows the user to predict the impact FSCs will have on annual cash flows. The Financial Analysis Module has a similar interface and functionality as the Simulation Analysis Module. That is, the user can create, save, edit, delete, print, and run input parameter files to predict the impact of changes in financial (or simulation) input values on financial results.

Financial Output

The Financial Analysis Output Module allows the user to view and write the results of the financial analysis to a file, printer, or another software application. The financial output report is in the form of a P&L statement and shows the effect of one or more FSCs on a retailer's cash flow. The report also provides three financial metrics: NPV, IRR, and approximate payback period.

Design of the CSEM

The CSEM application contains two flexible, data driven simulation models that represent the transaction process at a FSC and the operations at a convenience store. By data driven, it is meant that the user specifies input parameter values that control the model's event times, logic, and resource configuration. This design feature allows the user to analyze an unlimited number of "What-if" scenarios without having to modify (or re-program) any of the application's analysis modules. Each model has a DID that lists and defines all the parameters used in the model.

The preferred embodiment of CSEM contains a flexible, data driven financial model that quickly generates a P&L statement showing the financial return of one or more FSCs over a user specified planning period.

The overall goal of these models is to provide a retailer (or FSC product manager) with decision-making information about FSC designs and transaction procedures, so they can better manage and grow their business.

FSC Model Logic

The FSC model allows the user to analyze, in detail, changes in FSC designs, transaction procedures, and transaction times. For instance, one business question might be "what is the impact on average queuing time if we could reduce the check cashing transaction time below five minutes?"

The following five steps illustrate the basic steps represented in the transaction process of the FSC model:

1. A customer "arrives" at an FSC.
2. The customer may have to wait before they can receive service. The customer may also balk if the queue size is beyond a preset threshold.
3. Once FSC resources are available the transaction process begins. The type and duration of the transaction is based on user input.
4. The transaction may or may not be successful.
5. After the transaction is finished or unsuccessful, the customer departs the FSC.

The FSC model allows the user to represent customer demand in one of two ways: Unlimited or Limited Arrival mode. In the Unlimited Arrival mode, there is always a customer available to receive service when an FSC has capacity (an ideal situation). In this mode, the user can evaluate the maximum throughput (defined as either the number of transactions or items per time unit) of an FSC. In the Limited Arrival mode, there is a time interval between customer arrivals. The user can enter the mean inter-arrival time (i.e., the arrival rate) and whether the inter-arrival distribution is constant or random. The Limited Arrival mode is used to evaluate customer queuing behavior. In general, the Limited Arrival mode is, perhaps, more representative of the actual customer checkout process.

Representing the transaction process at a FSC is an important part of the FSC model. The following outline of events is one preferred representation of the transaction process at a FSC:

Sign-up
    Customer maybe required to sign-up for a particular FSC service
    Possible unsuccessful sign-up task
Initialization
    Customer prepares information to process a transaction and selects the transaction type from FSC initialization screen
Information Entry
    Customer enters information required for a particular service
    Possible unsuccessful information entry task
Approval Processing
    Customer may wait for approval for a particular transaction
    Possible unsuccessful approval processing task
Customer Interface (CI) Terminal Usage
    Customer may require help to resolve a transaction problem The user can specify the duration, frequency, and unsuccessful rates of these events.

Assumptions for the FSC Models

The following list illustrates several assumptions that may be embodied in the logic of the FSC model:

1. Transactions cannot start for the next customer until the transaction of the previous customer is finished.
2. The miscellaneous event can occur after the approval-processing event.
3. A customer occupies both the CI terminal and ATM terminal when performing their transaction.
4. A customer may perform multiple transactions at FSC.
5. A customer leaves if a transaction is unsuccessful.

Design of the CStore Model

The CStore model represents the interactions between customers, staff, and store resources in a typical convenience store environment. Like the FSC model, the CStore model is flexible and data driven. The primary difference is this model represents the overall store retail operations and not just the FSC processes. As a result of this larger scope, the CStore model does not go into the level of detail in the transaction process that the FSC model provides.

CStore Model Resources

Two key resource types represented in the CStore model are service points and staff.

Service points
    The CStore model represents two types of service points: inside the store and outside the store. Service points outside the store are gas pumps, parking spaces, and general service point (user-defined). Inside the store, service points include FSCs, ATMs, food court (hot drinks, cold drinks, and food), coolers (non-alcoholic, alcoholic, and other), merchandise shelves, general service point (user-defined), and checkout counters. The user enters the number and type of service points available for a scenario. Checkout counter requires a cashier to process a transaction, and a supervisor to process customer interventions when intervention events are possible.

Staff

The CStore model represents two types of personnel: cashiers and supervisors. The user can specify personnel schedules (i.e., the number of staff available) in 30 minutes intervals. Supervisors are scheduled in a pool and their only responsibility in the model is to respond to customer interventions during checkout.

CStore Model Customer Logic

The following 6-steps describe the basic customer flow represented in the CStore model:

1. A customer arrives at the convenience store in a car. The user enters the expected number of arrivals per hour in 15-minute intervals.
2. A customer goes to a gas pump, general outside service point (user defined), or parking space.
3. If the service points are busy, the customer chooses to join the shortest waiting line. However, if the queue size is longer than the threshold, the customer may balk (leave without receiving service).
4. If a customer goes to a gas pump or general outside service point, then after receiving service the customer may pay at the service point or go inside the store. A customer who goes to a parking space always goes inside the store.
5. Inside the store, a customer may visit any service points, wait in line or balk.
6. After a customer finishes their transactions at one or more service points, they leave the store, return to their car and depart.

CStore Model Resource Transaction Logic

In the preferred embodiment of the CStore model, transaction times are represented as a single event for all but two key service points defined in a scenario. These service points are the FSC and Checkout Counter. The transaction process at a FSC is similar to the process described in the FSC model. One general approach to represent the Checkout transaction process is outlined using the following events:

Pre-itemization
  This occurs only if a customer arrives at a counter position that is idle (e.g., the cashier is waiting for a customer to arrive). The pre-itemization event represents the time to unload items per transaction at a counter position.
Itemization
  The itemization event represents the time for the cashier to enter items at the POS system. A customer may also purchase or redeem lottery tickets.
Error and Miscellaneous
  A customer may experience additional delays for error or miscellaneous events base on user input values.
Finalization
  The finalization event represents the tender time per transaction by tender type.
Bagging
  The bagging event represents the time to bag a customer's items.
Intervention
  The intervention event represents all types of resolution activities for a transaction. This event, if it occurs, will follow the itemization event and will require a supervisor's assistance.

The following is a list of definitions for terms used:

Balking—Describes the behavior of a customer who decides not to enter a queue upon arriving and leaves without receiving service.
Data Input Dictionary (DID)—List of parameters under user control specifying a scenario for simulation and financial analysis.
Financial Services Center (FSC)—Device/location allowing customers to perform financial transactions, e.g., ATM, cashing checks.

Figure 2:
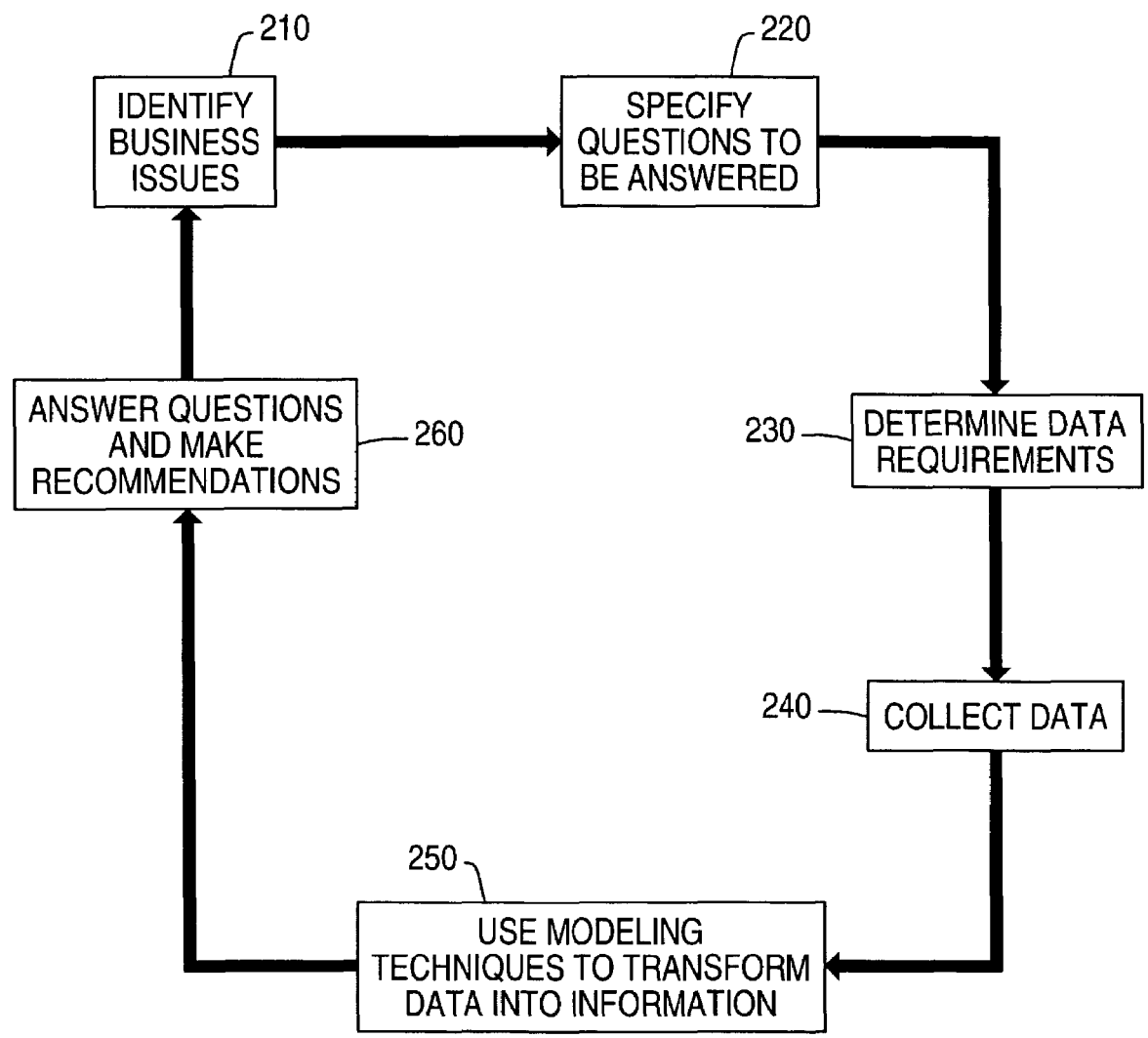
FIG. 2 is a flow diagram overview of a customer engagement process.

FIG. 2 illustrates an overview of an engagement process using CSEM. At step 210 business issues are identified. At step 220 the questions are specified that have to be answered. At step 230 data requirements are determined. At step 240 data is collected. At step 250 modeling techniques are used to transform data into information. At step 260 the User answers questions and makes recommendations based upon the output of the modeling techniques. At step 210 the process can be continued in a circular fashion until the modeling technique is completed. The FIG. 2 diagram is an overview of the MDM process.

Figure 3:
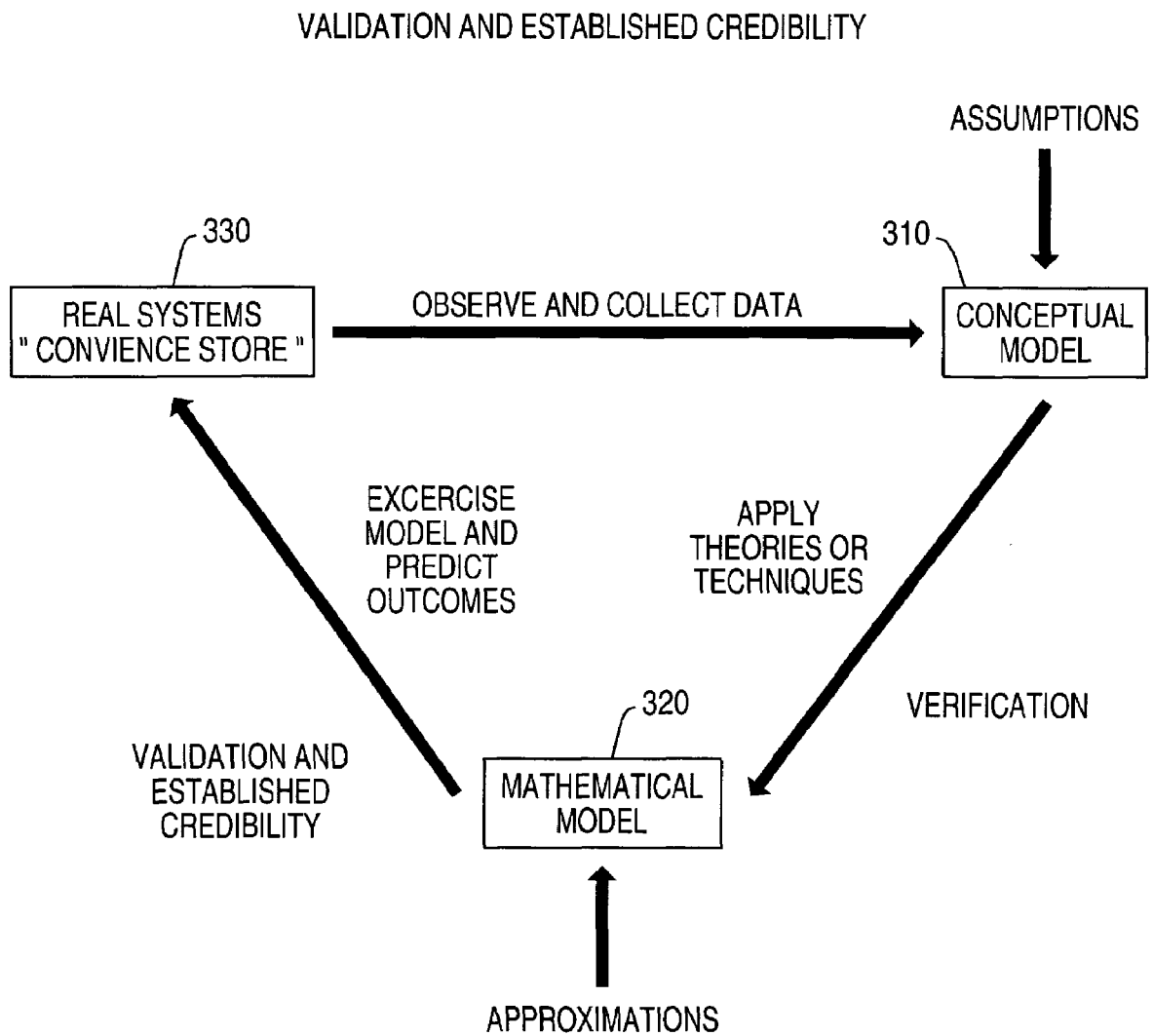
FIG. 3 is a flow diagram overview of a modeling process.

FIG. 3 shows a conceptual overview of the modeling process (e.g., convenience store design) used in FIG. 2 and more specifically the modeling technique of step 250 in FIG. 2. The modeling process must be validated and creditability established for the modeling process to be effective. First assumptions must be made and incorporated into the conceptual model 310. The output from the conceptual model is input into a mathematical model 320 which includes approximations. The mathematical model is exercised and outcomes are predicted by checking the mathematical model against the real convenience store. Data is collected and the convenience store is observed to validate and establish credibility for the mathematical model.

Figure 4:
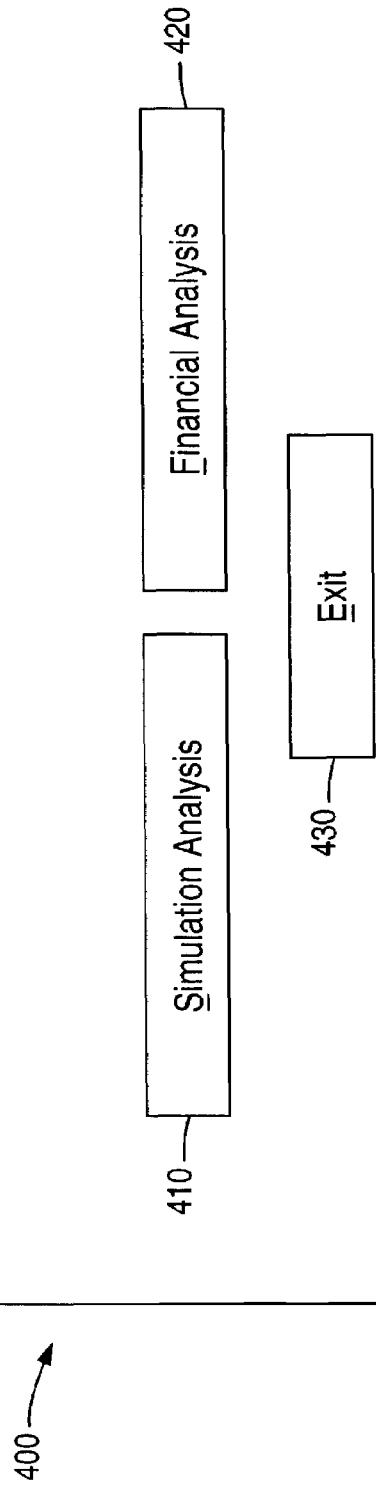
FIG. 4 depicts a convenience store effectiveness model main menu form.

FIG. 4 is a view of an example screen of a Main Menu form 400 of the CSEM application. From the Main Menu form 400, the user can enter the Simulation Analysis Module or Financial Analysis Module by selecting the corresponding button, i.e., Simulation Analysis button 410 or Financial Analysis button 420, with their mouse or other pointing device or keyboard.

When finished, the user can close the CSEM application by selecting the Exit button 430.

Simulation Analysis Module

Figure 5:
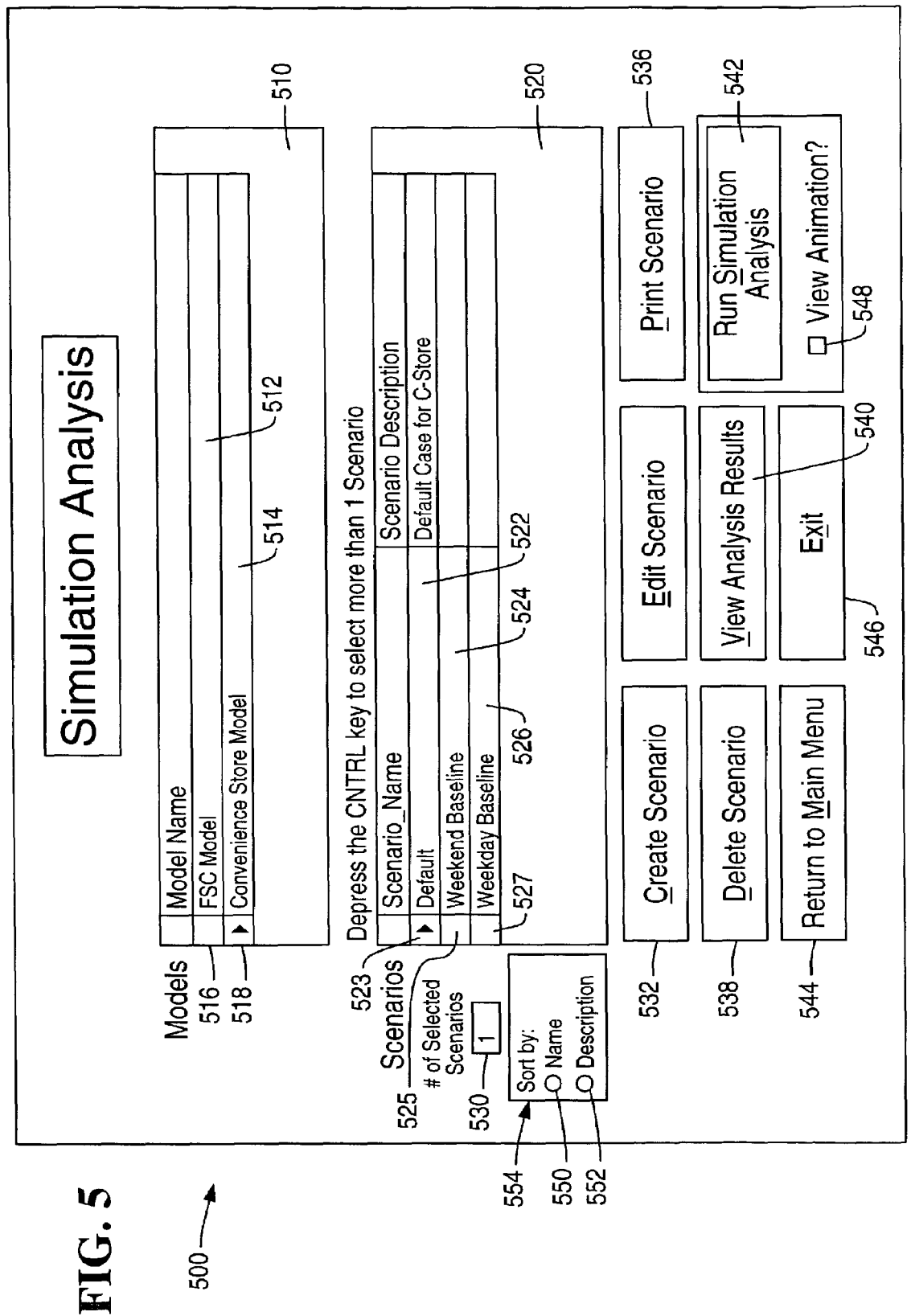
FIG. 5 depicts an example simulation analysis module form.

FIG. 5 is a view of an example Simulation Analysis Module form 500. The Simulation Analysis Module allows the user to create, save, edit, delete, and print input parameter files that specify model scenarios. The user can also run a simulation scenario with and without animation from Simulation Analysis Module form 500, and view the analysis results. The user can perform these operations by first selecting the type of model they wish to run in a Models table 510. The Models table 510 includes the previously described name fields: FSC Model 512 and Convenience Store Model 514. After choosing the simulation model, a Scenarios table 520 will display the scenario files available for that model. As depicted in FIG. 5, the Scenarios table 520 includes a default name field 522, a weekend baseline 524, and a weekday baseline 526. Each simulation model has its own set of input parameter files. The user may then select the input parameter file the user wants to work with (i.e., edit, delete, print or run). To select a model or scenario, the user clicks in the models 512, 514 or scenario name field 522, 524, 526 or on the small rectangle area to the left of these fields 516, 518, 523, 525, and 527, respectively.

The user can select and run multiple scenarios in a batch, one after the other by selecting multiple scenarios in Scenarios table 520 by appropriately clicking the small rectangle area 523, 525, 527 to the left of the Scenario name field 522, 524, and 526, respectively. A Selected Scenarios counter 530 to the left of the list increments (and decrements, upon deselection of a scenario) by one for each scenario selected. Selecting multiple scenarios is only used for invoking the Run Simulation Analysis button in analysis mode (i.e., animation off).

FIG. 5 shows the selection of the Convenience Store Model 514 and the Default scenario 522. The user does not have to select a scenario before selecting the Create Scenario button 532. The user will have the opportunity to select a scenario from which to create a new scenario on a Create Parameter File form 600, described in detail below. The user can select an Edit Scenario button 534 to edit a scenario, a Print Scenario button 536 to print a scenario, a Delete Scenario button 538 to delete a scenario, a View Analysis Results button 540 to view the results of a simulation run, a Run Simulation Analysis button 542 to run a simulation, a Return to Main Menu button 544, and an Exit button 546. If the user wants to run a simulation model with animation, an Animation checkbox 548 is activated before selecting the Run Simulation Analysis button 542. To run a model without animation, the Animation checkbox 548 is left unchecked.

The last two options, i.e., Return to Main Menu button 544, and an Exit button 546, from the Simulation Analysis form 500 allow the user to return to Main Menu form 400 or quit the application.

The Simulation (or Financial) Analysis Modules are designed to allow the user to create numerous scenario (assuming the user has adequate hard disk space available) files for each simulation. The user can sort the list of scenarios by name or description by selecting the corresponding radio button, i.e., Name Sort button 550 and Description Sort button 552, in the Sort By section 554.

When installed on computer system 100, the CSEM includes one Default scenario for each simulation model. The values in the Default scenarios are from industry composite data collected and summarized.

Create Parameter File

Figure 6:
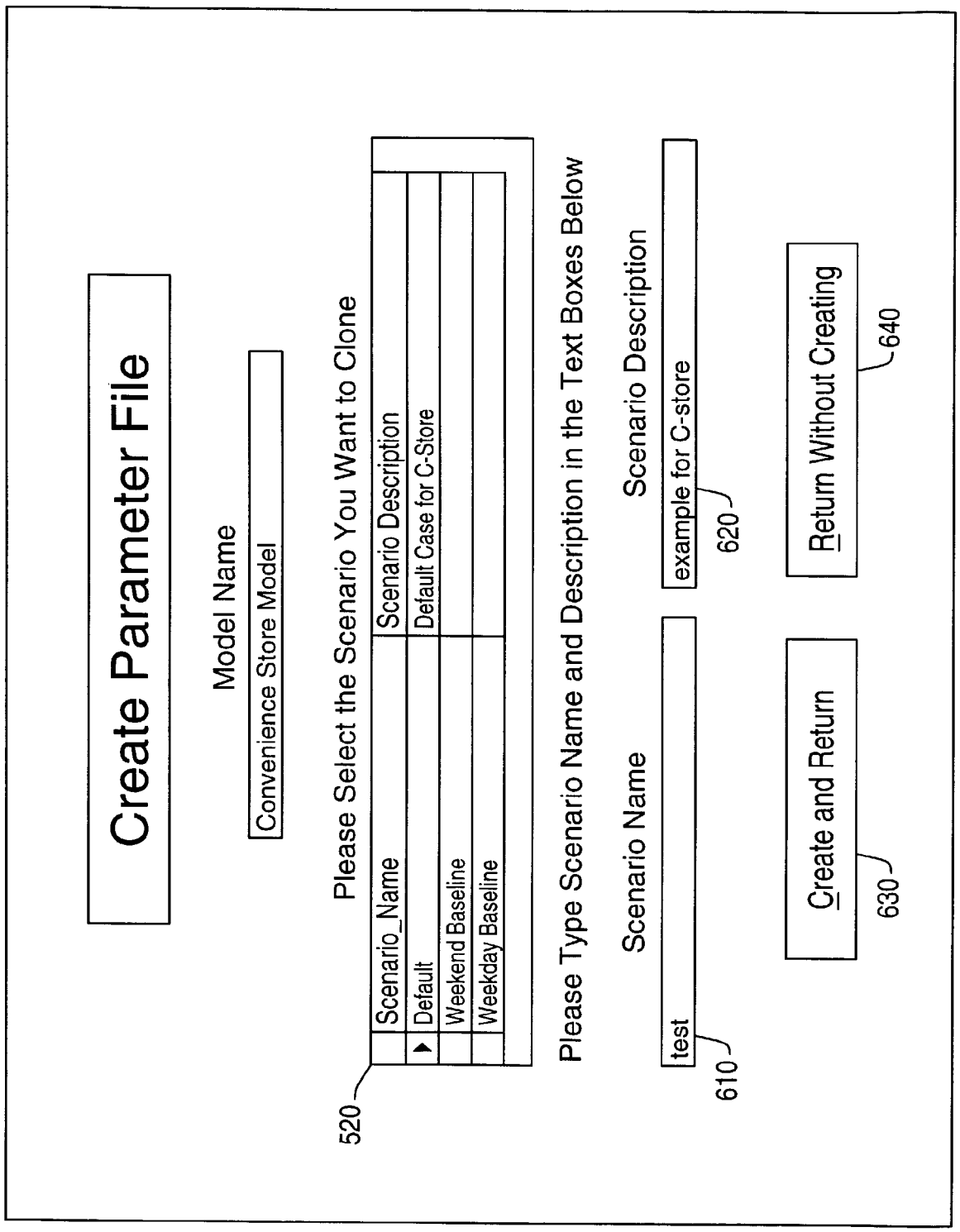
FIG. 6 depicts a create parameter file form.

The user can create a new scenario file by activating the Create Scenario button 532 from the Simulation Analysis (or Financial Analysis) Module form 500. FIG. 6 depicts the Create Parameter File form 600. To create a scenario, the user selects the existing file that the user wants to use to create the new file from in the list of scenarios in the center of the Create Parameter File form 600. A scroll bar (not shown) will display to the right of the list when there are more than four scenarios for a model. A name for a new scenario is entered by positioning the cursor in a Scenario Name field 610 and using keyboard to type in the name. The CSEM does not allow duplicate scenario names for a simulation or financial model. The Scenario Name can be up to 50 characters (including embedded blank spaces). The user can also enter an optional Scenario Description in the Scenario Description field 620 of up to 55 characters to further describe the parameter file.

After entering the Scenario name in the Scenario Name field 610 and optional description in the Scenario Description field 620, the user should select a Create and Return button 630 (or press Alt-C) to create the scenario file. The application will prompt the user to confirm their selection before returning to the Simulation or Financial Analysis Module form 500. FIG. 6 illustrates the scenario file called "test" will be created by this process. The other option one could take from this form is a Return Without Creating button 640 that returns the user to the Simulation Analysis Module form 500 without creating a file. The Scenario table 520 is displayed listing scenario names and scenario descriptions available to be cloned.

Figure 7:
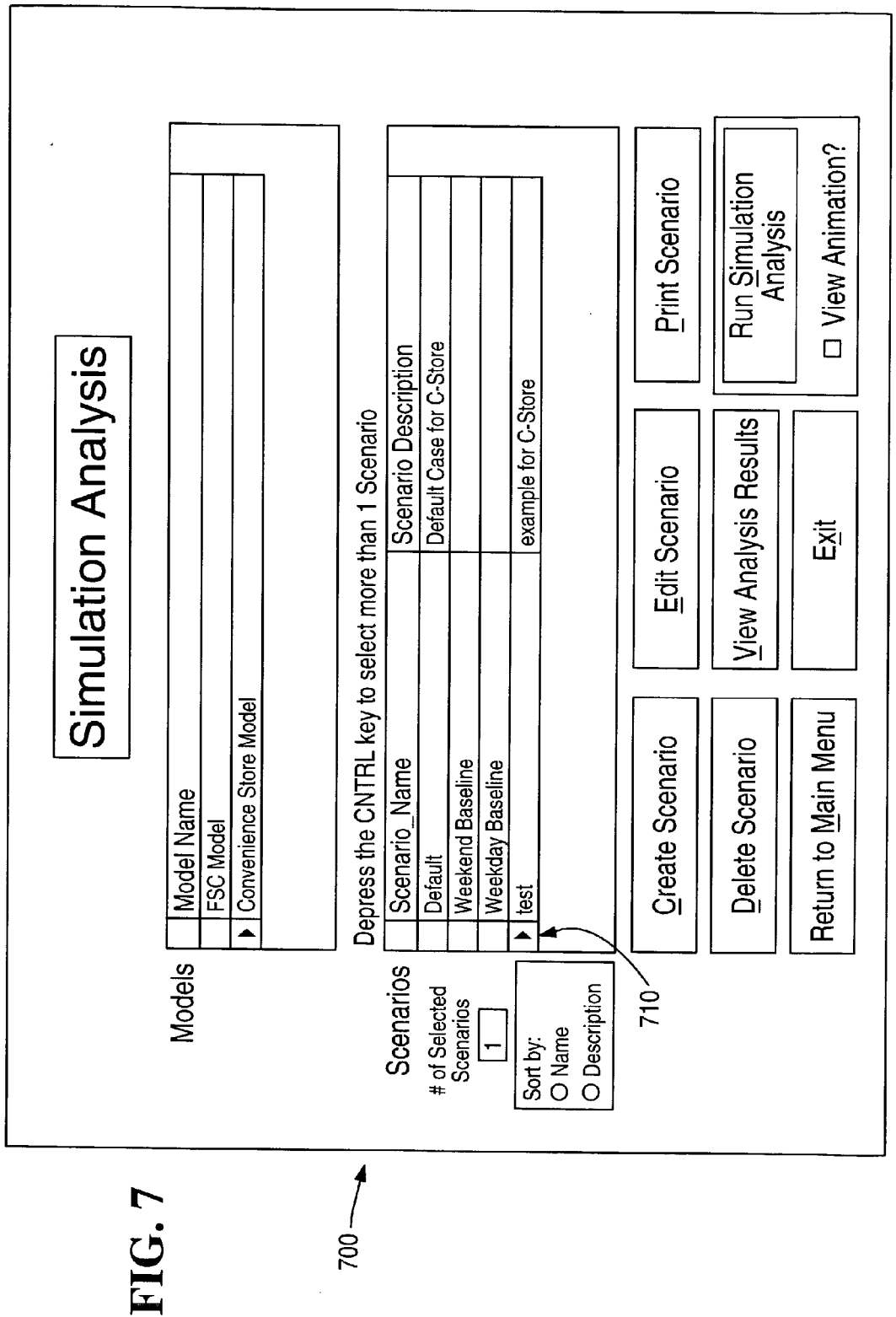
FIG. 7 depicts an input module form after creating a test scenario.

FIG. 7 shows the Simulation Analysis Module form after the creation of scenario "test" 710. A scroll bar (not shown) will display to the right of the Scenarios list when there are more than eight scenarios for a model.

Data Input Dictionary

Each of the simulation and financial models in the CSEM application has its own set of data parameters the user can control to create a scenario. A model's Data Input Dictionary (DID) defines the model's input parameters and properties, i.e., parameter values, ranges, and what each parameter controls in a model scenario. The user can view or print a model's DID using the Print Scenario button 536 from the Simulation or Financial Analysis Module form 500. The DID provides the following information for each parameter.

Parameter. The parameter column provides a brief description of how the model uses the input parameter data. If the parameter field contains the word "ARRAY" it means that it has more than one value assigned to it. For example, the user can enter up to 96 values for the parameter representing the expected number of arrivals per hour in 15-minute time intervals for a 24-hour day.

Value. The value column displays the current data value assigned to each parameter. A parameter that has more than one value will not display its values in this field, i.e., the field is blank. Parameters of this type (non-scalar parameters) are edited using an additional edit form.

Range. The range column defines the range of values and the units for the parameter.

Description. The description column provides a more detailed description of the parameter and its use in the model.

Table 1 below shows the number of parameters and values under the control of the user for each of the CSEM models.

TABLE 1

| Model | Number of Parameters | Number of Values |
|---|---|---|
| Convenience Store Model | 145 | 610 |
| FSC Model | 190 | 190 |

The simulation parameters for the CStore model are divided into five categories to make them easier to learn and easier to change their values. The five categories are as follows:

1. Model Parameters;
2. Customer Demand & Routing (CDR);
3. Transaction Characteristics;
4. Labor Schedule, and;
5. Configuration.

The parameter categories for the FSC model parameters in the Simulation Analysis Module are 1. Model Parameters;
2. Customer Demand;
3. Transaction Probabilities;
4. ATM Transactions;
5. Check Transactions;
6. Bill Payment Transactions;

7. Money Order Transactions;
8. Wire Transfer Transactions;
9. Phone Card Transactions, and;
10. General Transactions.

The main difference between the two categorizations is there is no labor and other resource configuration parameters needed to model a single FSC in the FSC model. With a more focused scope, the FSC model also breaks down the FSC transactions into more detailed tasks. These task parameters are grouped into categories by transaction type. Similar FSC transaction parameters as well as transaction parameters for other resources (i.e., fuel pumps, ATM, counter, etc.) are contained in the Transaction Characteristic category of the CStore model.

In the Financial Analysis Module for the FSC model, there is only one category of parameters, i.e., financial. Thus, the user may edit the 49 financial parameters directly from the Edit Financial Analysis form described in detail below. A FSC model scenario created in the Simulation Analysis Module will also appear in the Financial Analysis Module (and vice-versa). This feature allows the user to base their financial analysis on simulation results or user input transaction volumes.

Model Parameters

There are three parameters in this category for the CStore model. They are "Number of replications", "Stream number identifier", and "Check input option identifier". In the FSC model, a fourth parameter, "Time length of scenario", is included in this category as well. In most applications, the user will not need to change the values of these parameters. If the user wishes more precision in the model's estimates of the mean performance measures, they should increase the value of "Number of replications". It is recommended that the user does not reduce the value of this parameter below 30 when using the model results to make inferences about the FSC or convenience store design. Changing the value of the "Stream number identifier" will run the scenario using a different sequence of random numbers. Finally, the "Check input option identifier" specifies whether a model writes the scenario parameter values to a file, e.g., c:\\CSEM\CSEMChk.out. The purpose of this file is to verify input parameter values or for technical support.

Customer Demand Category

The Customer Demand & Routing (CDR) category has parameters controlling the workload of the convenience store, such as number of customer arrivals, where customers go, number of items purchased, etc. The CStore model uses a random sampling process (called a non-homogeneous Poisson arrival process) to generate the arrival times. The user controls how many customers arrive by a non-scalar parameter with values that can vary by time of day. Once a customer arrives to the store, there are other parameters in this category, e.g., the Customer Decision Matrix, that govern what service points customers visit while at the store. There are also other parameters indicating what customers' purchase, such as the distributions of number of items and distribution of gallons of gas pumped, in this category. Finally, travel times between service points and balk parameters are included in this category.

Parameters in the Customer Demand category for the FSC model allow the user to represent workload in two ways: Unlimited Arrivals and Limited Arrival method (see FSC Model Logic section). The user selects between these methods by setting the "Unlimited arrivals option identifier" parameter to 1 (Unlimited Arrivals) or to 0 (Limited Arrivals). Setting this parameter to 1 causes the models to ignore the parameter values in "Constant inter-arrival option identifier" and "Customer arrival rate". Otherwise, the user needs to enter values in these two parameters for the models to generate customer arrival times.

Transaction Characteristics Category

The Transaction Characteristics category contains parameters describing transaction types and their duration at different service points in the CStore model. In the FSC model, Transaction Characteristics are further divided into the 8 different FSC transaction types, e.g. ATM transactions, Money Order transactions, and so forth.

Labor Schedule Category

Parameters in the Schedules category for the CStore model allow the user to enter cashier and supervisor schedules in 30-minute intervals during a scenario. The cashier's only responsibility in the CStore model is to process checkout transactions. A customer cannot receive service at the checkout counter if there is not at least one cashier scheduled. The supervisor's only role in the CStore model is to respond to checkout transaction intervention requests. A customer cannot finish a transaction that requires intervention if there is no supervisor available. The FSC model obviously does not contain a labor resource.

Configuration Category

The Configuration category contains parameters that define the length and resources in a scenario, e.g., the number of checkout counters, the number of FSCs, etc. Although, the DID provides definitions for all the parameters in a model, there are requirements for several of the Configuration parameters that are important to understand. The CStore model requires at least one cashier to be at the checkstand for the entire scenario. This means the user must specify a value of at least one for each time interval on the "Schedule of cashiers" parameter between the "Start time" and "End time" parameters. The user must define at least one unit of a resource (e.g., fuel pump, ATM, etc.) for it to exist in a CStore model scenario. If the user sends a customer to a resource (via the CDM logic) that does not exist, then the model will terminate the scenario and write an error message to a specific file, e.g., c:\CSEM\CSEMChk.out. Also the model will write an error message to the screen if the user is running the scenario in animation mode.

Financial Parameters Category

The financial category (FSC Model only) includes parameters the user can enter to evaluate the financial impact of 1 or more FSCs. These parameters allow the user to specify the following values:

Revenue by transaction type and for other variable and fixed revenue amounts;

Annual % growth in volume by transaction type;

Costs by transaction type and other variable and fixed cost amounts;

Number of FSCs, purchase price, set-up cost and annual maintenance cost, and;

Cost of capital, inflation rate, depreciation life, etc.

The user can also specify whether to use transaction volumes from simulation analysis or input values directly into the financial parameters. The parameters in the financial category are only accessible from the Edit Financial Scenarios form in the Financial Analysis Module.

Edit Simulation Scenario

Figure 8:
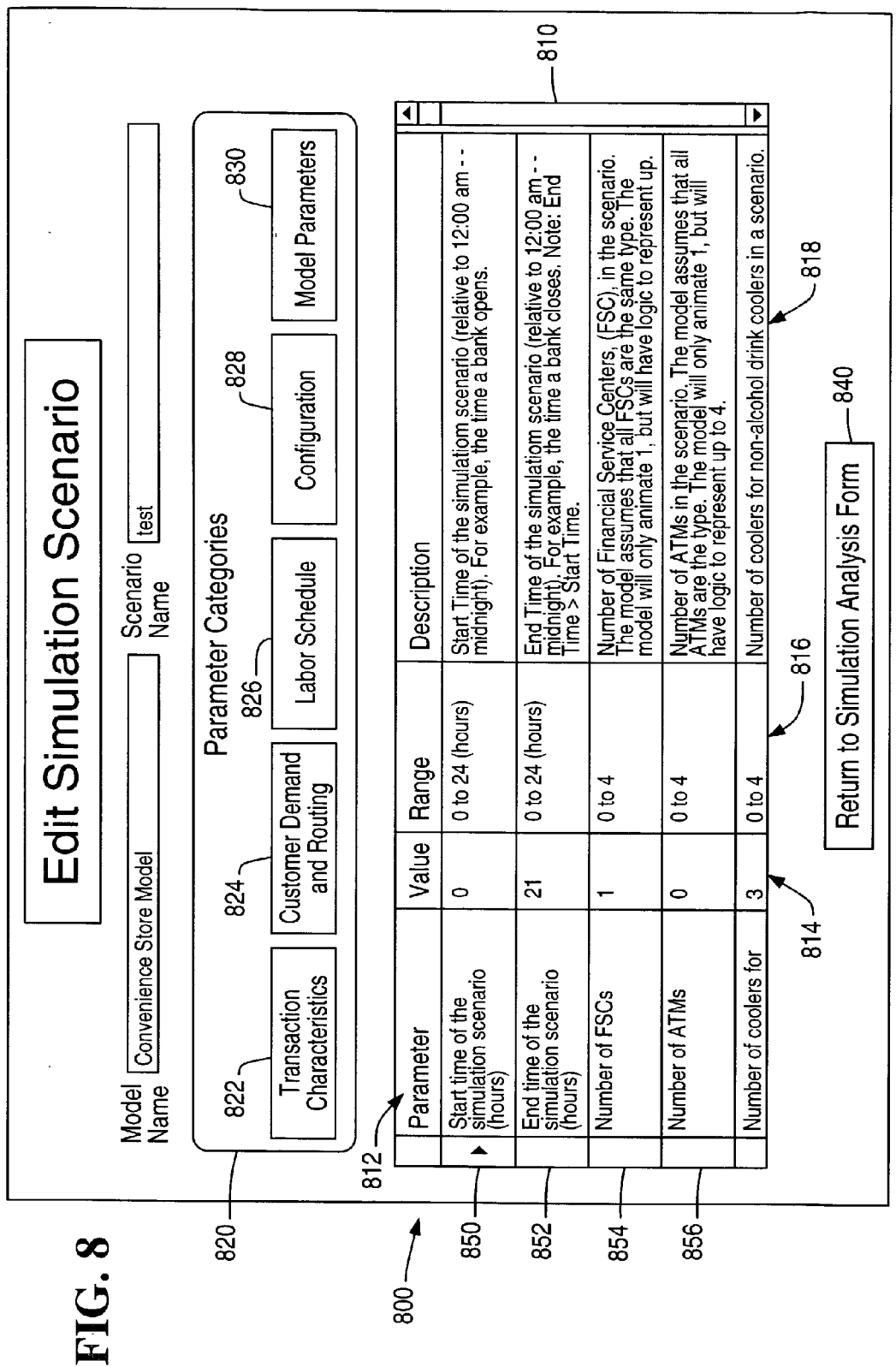
FIG. 8 depicts an edit simulation scenario form for a CStore model.

To modify the parameter values for a scenario, the user should select the Edit Scenario button 534 on the Simulation (or Financial) Analysis Module form 500. FIG. 8 depicts the Edit Simulation Scenario form 800 for the CStore model in the Simulation Analysis Module. The Edit Simulation Scenario form 800 allows the user to view or change the values for each parameter in the scenario files created by the user. Recall that the user cannot change the values in a model's Default scenario.

Each time the user enters this form, an edit table 810 displays the full set of parameters in the DID. The edit table 810 includes a Parameter column 812, a Value column 814, a Range column 816, and a Description column 818. The user can use the scroll bar to the right of the edit table 810 to browse through the full set. Alternatively, the user can view a subset of the parameters corresponding to a particular category by clicking on the category button in the Parameter Categories section 820. The Parameter Categories section 820 includes a Transaction Characteristics button 822, a CDR button 824, a Labor Schedule button 826, a Configuration button 828, and a Model Parameters button 830. For example, to view a subset of parameters corresponding to the transactions performed at each resource, click on the Transaction Characteristics button 822. The Edit Simulation Scenario form 800 also includes a Return to Simulation Analysis Form button 840 to return the user to the Simulation Analysis form 500.

The Parameter Categories section 820 is slightly different for FSC models. FIG. 9 shows the Edit Simulation Scenario form 900 for the FSC model. The Transaction Probabilities and seven FSC transaction type categories replace the Transaction Characteristics, Labor Schedule, and Configuration categories. The Parameter Categories section 901 includes a Model Parameters button 902, a Customer Demand button 904, a Transaction Probabilities button 906, an ATM Transactions button 908, a Check Transactions button 910, a Bill Payment Transactions button 912, a Money Order Transactions button 914, a Wire Transfer Transactions button 916, a Phone Card Transactions button 918, and a General Transactions button 920. The Edit Simulation Scenario form 900 also includes an edit table 930 similar to the edit table 810 of the Edit Simulation Scenario form 800.

There are two approaches for editing a parameter's value(s) depending on whether the parameter has a single value (called a scalar parameter) or has multiple values (called a non-scalar parameter or an ARRAY). To edit the value for a scalar parameter, the user selects the cell in the Value column 814 of the edit table 810 for the parameter that the user wants to change and enters the new value. For example, to change the scenario Start Time parameter from 12 midnight (i.e., 0) to 7:30 am in FIG. 8, the user selects the cell containing the value of 0 and type in 7.5. Note the Start Time and End Time parameters are in units of hours from 12 midnight. When changing values, the user should make sure the new value is within the allowable range displayed in the Range column 816 for the parameter. If the user enters a value outside the allowable range, the application will remind the user with a warning message. To edit the values for a non-scalar parameter, the user must click on the small rectangle icon 850 just to the left of the Parameter field. Other Parameter fields have similar rectangular icons 852, 854, 856 as depicted in FIG. 8. This action will invoke a new form allowing the user to edit each value for the parameter. A non-scalar parameter will have the word "Array" in the Value column.

In the CSEM application, only the CStore model has non-scalar parameters. The following is a list of the seven non-scalar parameters:

1. Expected number of arrivals per hour in 15-minute intervals;
2. Balking probabilities for applicable resources;
3. Customer Decision Matrix (CDM);
4. Schedule of cashiers to operate checkout counter;
5. Schedule of supervisors to assist checkout process;
6. Distribution of number of items purchased by a customer, and;
7. Distribution of number of gallons of gas purchased by a customer.

After the User clicks on the rectangle icon adjacent to the left side of the Parameter column, the CSEM application will open a new form that allows the user to modify the parameter's values. The next six sections describe the edit forms for these non-scalar parameters.

Arrival Rate Schedule

Figure 10:
FIG. 10 depicts an arrival rate schedule form.

FIG. 10 is a depiction of an Arrival Rate Schedule form 1000 for editing the "expected number of arrivals per hour in 15-minute intervals". The Arrival Rate Schedule form 1000 allows the user to change the values for the parameter that describes the rate at which customers arrive to the convenience store. The model uses these rates to randomly generate customer arrival times throughout the simulation scenario.

An edit table 1010 in the Arrival Rate Schedule form 1000 lists values from 12:01 am to 12:00 am in 15-minute intervals. To change a value, the user scrolls using a scroll bar 1012 to the time interval that the user wishes to edit, selects the corresponding cell in the Number of Arrivals column 1014, and enters the new value. The units for the values entered into this parameter are number of arrivals per hour in 15 minutes not the number of arrivals in 15 minutes.

The user must understand this important difference to prevent running a scenario with a different customer arrival pattern then the user intended to run. For example, if the user wants to represent 100 customers per hour from 9:00 to 9:30 am, and 150 customers per hour from 9:30 to 10:00 am, then the entries should be:

9:01-9:15 am 100
9:16-9:30 am 100
9:31-9:45 am 150
9:46-10:00 am 150

The model ignores values entered in the Number of Arrivals column 1014 before and after the time intervals specified by the Start Time and End Time parameters, respectively.

There are two options from this form, either Print Schedule button 1020 or Return to Edit Form button 1022. The Print Schedule button 1020 creates a report containing the arrival rate schedule and displays it on the screen. The user can then send the report to a printer or save it to a file in a variety of data formats. The Return to Edit Form button 1022 returns the user to the appropriate Edit Simulation Scenario form 800 or 900.

Balking Probabilities

Figure 11:
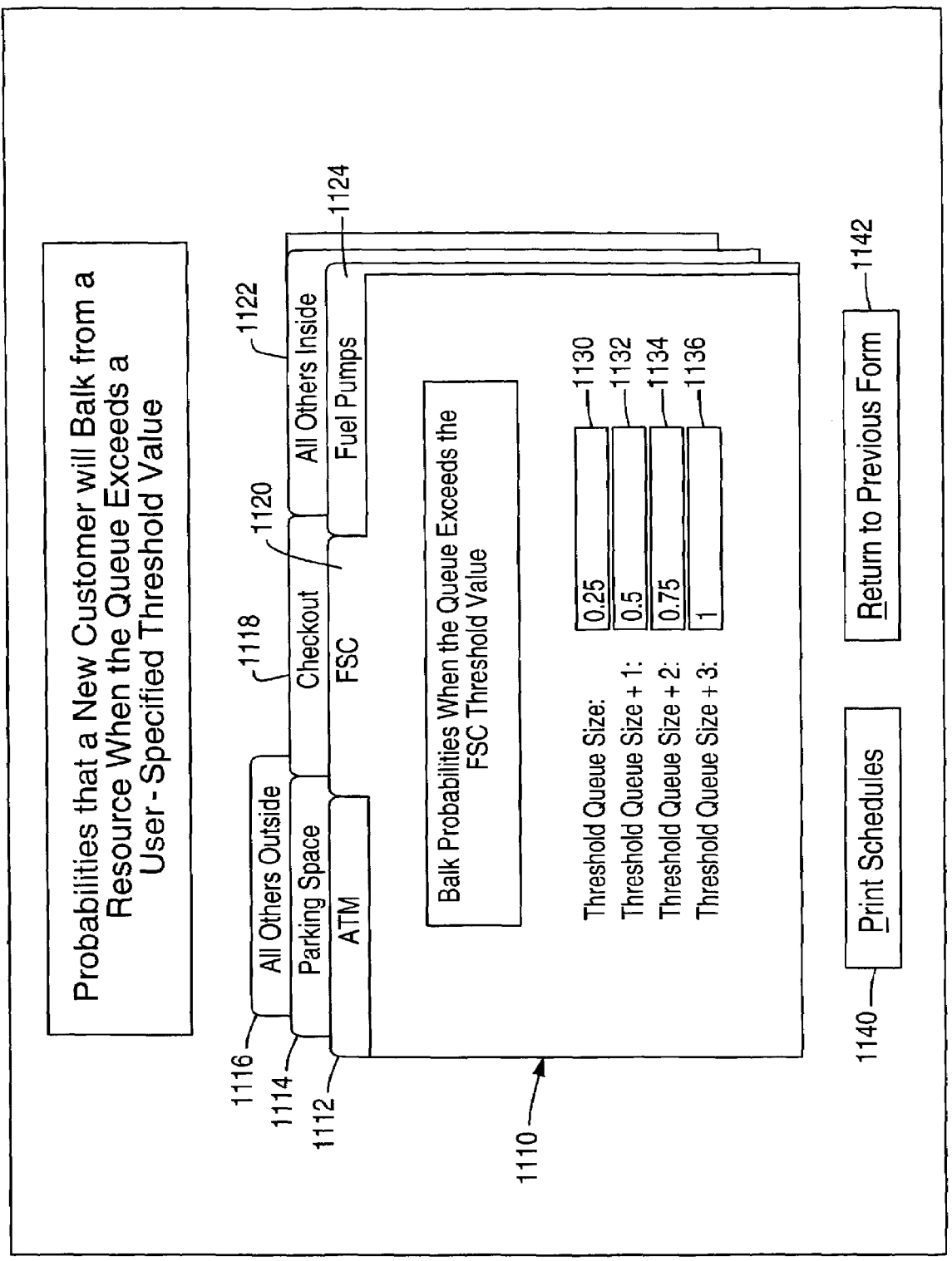
FIG. 11 depicts a balking probabilities form.

FIG. 11 depicts a Balking Probabilities form 1100 for editing the Balking Probabilities. The Balking Probabilities form 1100 allows the user to change the values for the parameter describing the likelihood that a customer will balk (leave without receiving service) from a resource when the queue reaches or exceeds a user-specified threshold value. A customer that balks will leave the store and the model increments the balk-counter used in the output report. A balked customer will not follow the logic for the next step indicated by the CDM.

The balk probabilities indicate the probability that a newly arriving customer will not join the queue when its size reaches the threshold queue size or greater. The Balking Probabilities form 1100 includes a Balk Probability tab sheet 1110 having tabs for individual balk probabilities 1112, 1114, 1116, 1118, 1120, 1122. Each tab includes input fields for entry of balk probabilities similar to Threshold Queue Size entry field 1130, Threshold Queue Size+1 entry field 1132, Threshold Queue Size+2 entry field 1134, and Threshold Queue Size+3 entry field 1136. For example, assume there are 5 people waiting in line to use a FSC and the FSC threshold queue size parameter is set to 4 and the balk probabilities are those displayed in FIG. 11, i.e., entry fields 1130, 1132, 1134, 1136. Then, say the next event is the arrival of a new customer who wishes to use the FSC. In this case, the new customer would balk with probability 0.5. For this example, a customer would never balk if the queue size is less than 4 and the queue size would never exceed 7 (because the balk probability at Threshold Queue Size+3 is 1.0). In general, if the balking probabilities allow the queue size to get larger than the Threshold Queue Size+3, then the model would use the probability in this last cell for the probability that a customer balks.

Two important things to remember when modifying the balk probabilities:
1. The four probability entries in each tab do not need to sum to 1.
2. The only valid probability entries are between 0.0 to 1.0

Similar to the Arrival Schedule form 1000, there are two options from Balking Probabilities form 1100, either a Print Schedules button 1140 or a Return to Previous Form button 1142. The Print Schedules button 1140 creates a report containing the balk probabilities for all applicable resource types and displays it on the screen. The user can then send the report to a printer or save it to a file in a variety of data formats. The Return to Previous Form button 1142 returns the user back to the appropriate Edit Simulation Scenario form 800 or 900.

Customer Decision Matrix

FIG. 12 depicts a Customer Decision Matrix form 1200 used to edit the Customer Decision Matrix parameter. This parameter defines the probability a customer visits a particular sequence of service points when they enter the store. The logic represented by this approach is referred to as probabilistic routing. The logic specified in the CDM indicates the probability a customer goes from a "row" location to a "column" location. The probabilities are captured in a CDM probability table 1210 having a series of "from" rows 1212 and "to" columns 1214. For example, FIG. 12 depicts that a customer who enters the store (row 1) has a 42.7% chance of going directly to a FSC, 1% chance of going directly to an ATM, 5.3% chance of going to Cooler non-Alcohol, etc. If a customer goes to a FSC (row 2), then have a 1.1% chance of going to the Cooler non-Alcohol next, 2.7% chance of going to the Cooler Alcohol, and so forth. Eventually, the customer will go to the exit point and depart the store.

Two important things to remember when modifying the CDM:
1. The row probabilities must sum to 1.
2. The only valid entries for a cell are between 0.0 to 1.0

The current version of the CSEM checks to make sure the rows sum to one and will issue a warning message if they do not. If this occurs, then the user will have to make the necessary corrections.

FIG. 12 shows the default scenario CDM entries in the CDM probabilities table 1210 for the CStore model.

There are three options from the Customer Decision Matrix form 1200, a Print CDM button 1220, a Reset Values to Zero button 1222, or a Return to Previous Form button 1224. The Print CDM button 1220 creates a report containing the CDM and displays it on the screen. The user can then send the report to a printer or save it to a file in a variety of data formats. The Reset Values to Zero button 1224 replaces all probability values with zero, with the exception of the last column, Exit, which is set to one (to satisfy property #1 above). The Return to Previous Form button 1226 returns the user back to the appropriate Edit Simulation Scenario form 800 or 900.

Personnel Schedules

Figure 13:
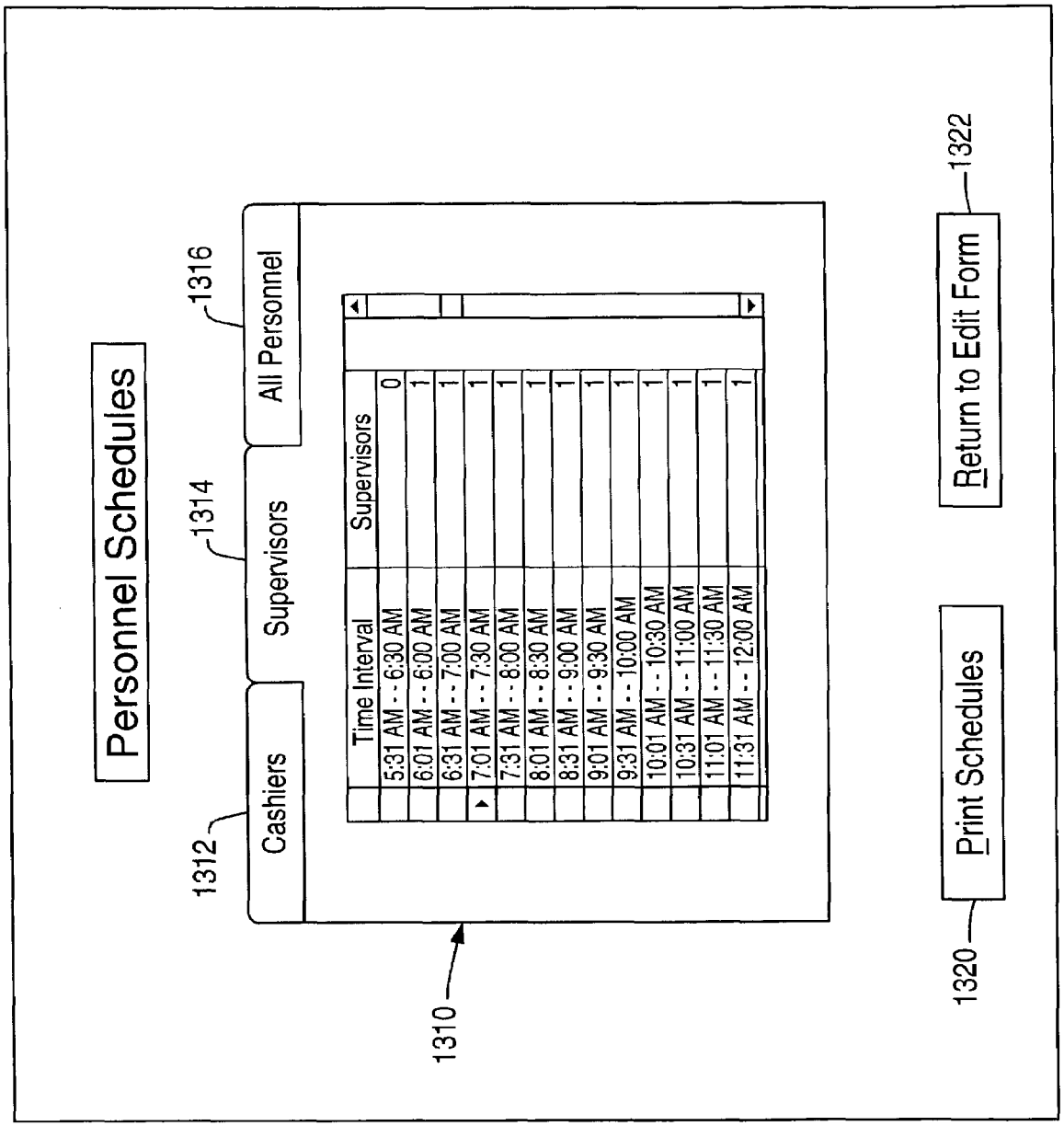
FIG. 13 depicts a personnel schedules edit form.

FIG. 13 depicts a Personnel Schedules edit form 1300. The Personnel Schedules form 1300 enables the user to enter the number of convenience store personnel available by personnel type in 30-minute time intervals for a scenario using an edit table 1310. The two types of personnel the user can schedule are cashiers and supervisors as indicated by a cashiers tab 1312 and a supervisors tab 1314. All personnel can be scheduled using the all personnel tab 1316.

FIG. 13 depicts the current active parameter is the "Schedule of supervisors". After the user enters this form from the Edit Simulation Scenario form 800 for either cashiers schedule or supervisors schedule parameters, the user can edit the values for the other parameter by selecting the corresponding parameter tab 1312, 1314, 1316. The tab labeled All Personnel displays an edit table for both parameters at the same time.

The CStore requires that at least one cashier, and if intervention event is possible, at least one supervisor, are available throughout a scenario; otherwise, the only other requirement is the user should enter only nonnegative integer values. The model ignores values entered in the schedules before and after the time intervals indicated by the Start Time and End Time parameters, respectively. Also, the user should not enter a value in a schedule larger than the number of counter positions. For example, if the number of counter positions is 2, then entering a value greater than two in the "Schedule of cashiers" will result in the same performance as entering a value of two. The only difference is that the user has more scheduled cashier time in the output report.

After the user finishes editing the values in this form, the user can select one of two options, either a Print Schedule button 1320 or a Return to Edit form button 1322. The Print Schedule button 1320 creates a report containing the schedules for both parameters by time of day and displays it on the screen. The user can than send the report to a printer or save it to a file in a variety of data formats. The Return to Previous Form button 1322 returns the user back to the appropriate Edit Simulation Scenario form 800 or 900.

Distribution of Items Purchased

Figure 14:
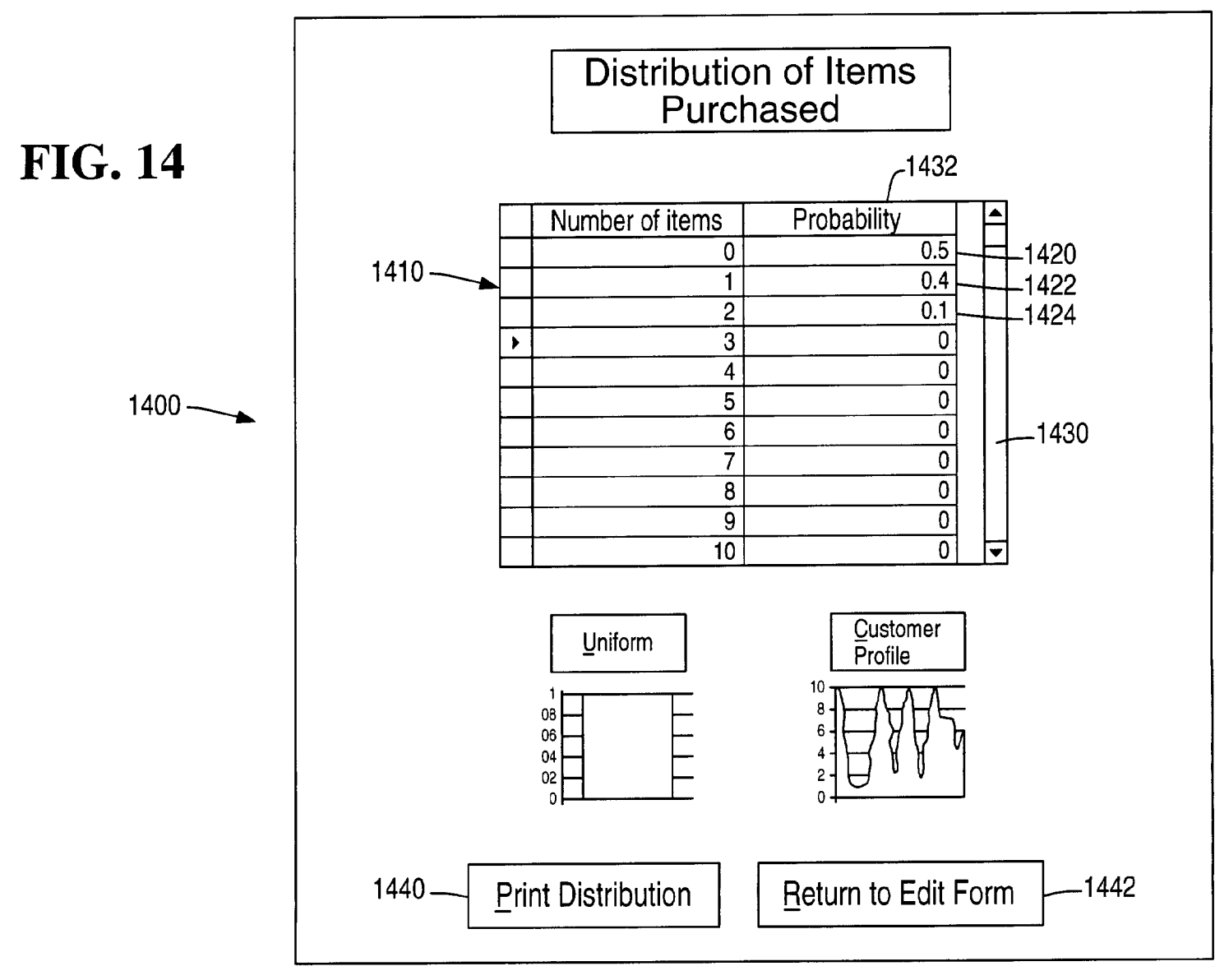

A Distribution of Items Purchased form 1400, as shown in FIG. 14, enables the user to enter values for the parameter specifying the probability of the number of items a customer purchases during a scenario. The model uses these values to randomly generate the number of items for each customer.

FIG. 14 shows the edit form for the "Distribution of items purchased" parameter including an edit table 1410. In this example, a customer can purchase 0, 1, or 2 items with probability 0.5, 0.4, and 0.1, as indicated by edit table entries 1420, 1422, and 1424 respectively. The "Distribution of items purchased" parameter refers to prepackaged merchandise only and does not include the purchase of gasoline or lottery tickets. The logic for purchasing gas or lottery tickets is handled by other model parameters.

To change a value in the Distribution of Items Purchased form 1400, simply scroll using scroll bar 1430 to the number of items that the user wish to edit, select the corresponding cell in a Probability column 1432, and enter the new value. Similar to other probability forms, the valid entries in the probability column are between 0.0 and 1.0, and the column sum must be 1.0.

Similar to previously described edit forms 1000, 1100, and 1300, there are two options from the Distribution of Items Purchased form 1400, either a Print Distribution button 1440 or a Return to Edit Form button 1442. The Print Distribution button 1440 creates a report containing the numbers of items purchased and their probabilities, and displays it on the screen. The user can than send the report to a printer or save it to a file in a variety of data formats. The Return to Previous Form button 1442 returns the user back to the appropriate Edit Simulation Scenario form 800 or 900.

Distribution of Gallons Purchased

Figure 15:
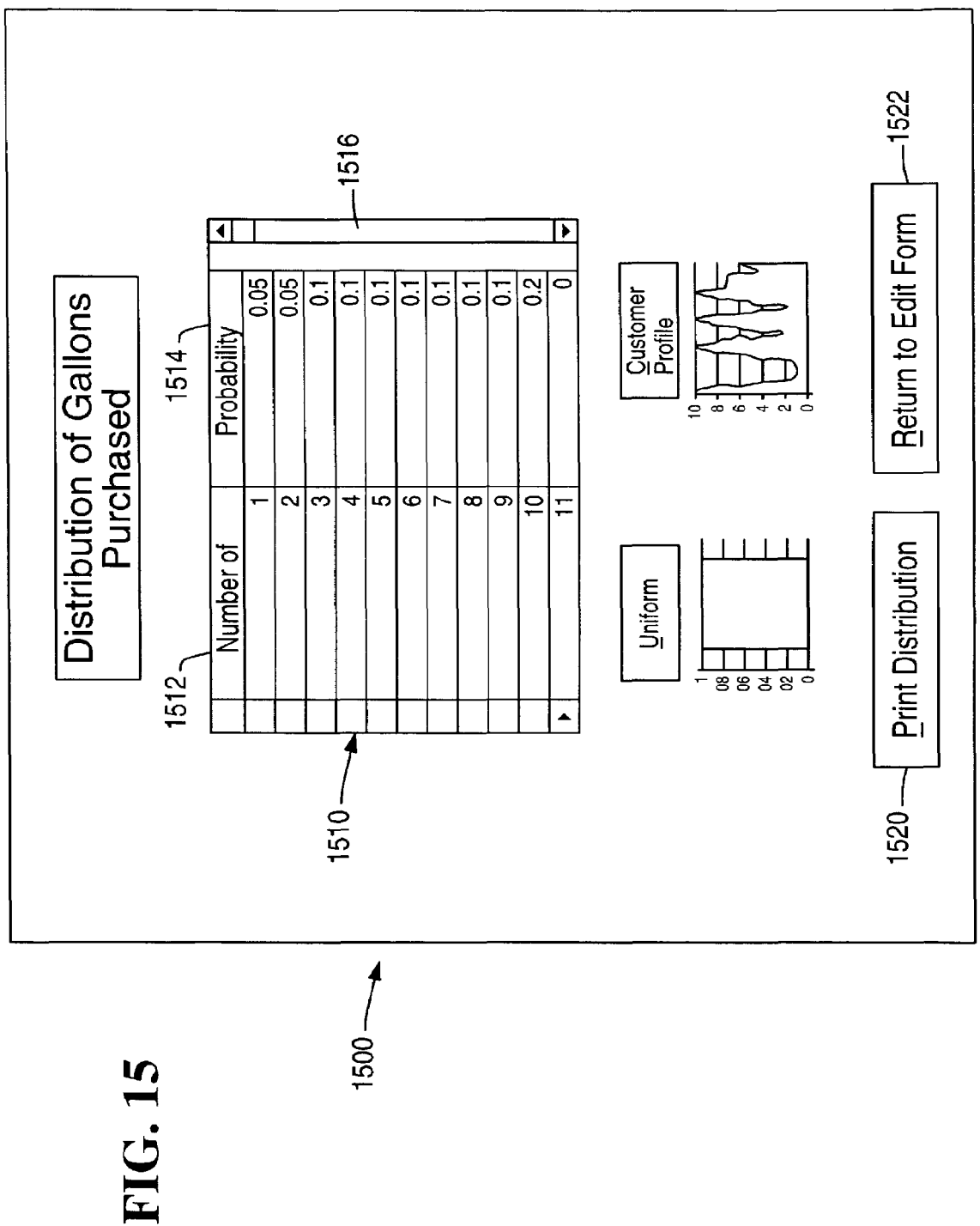
FIG. 15 depicts a distribution of gallons purchased form.

FIG. 15 depicts a Distribution of Gallons Purchased form 1500 which is very similar to the Distribution of Items Purchased form 1400. The Distribution of Gallons Purchased form 1500 allows the user to enter values for the parameter that specifies the probability of the number of gallons of gas a customer purchases, if they go to a gas pump. Using a discrete probability distribution like this is, of course, an approximation for representing a continuous random variable (i.e., number of gallons of gas). The developers chose this approach because it provides the user with a consistent and flexible format to represent gas purchases and with the understanding that the model's primary focus was not to predict the amount of gasoline consumption. In an alternate embodiment, CSEM converts this parameter to a continuous random.

The Distribution of Gallons Purchased form 1500 includes an edit table 1510 having a Number of column 1512, a Probability column 1514, and a scroll bar 1516. In this example, a customer can purchase 1, 2, 3, 4, 5, 6, 7, 8, 9, or 10 gallons, as indicated in the rows of the Number of column 1512, with probability 0.05, 0.05, 0.1, 0.1, 0.1, 0.1, 0.1, 0.1, 0.1, and 0.2, as indicated in the rows of the corresponding Probability column 1514.

To change a value in this form, the user scrolls using scroll bar 1516 to the row of the number of items that the user wish to edit in the Number of column 1512, selects the corresponding cell in the Probability column 1514, and enters the new value. Similar to other probability forms, e.g., Distribution of Items Purchased form 1400, the valid entries in the probability column are between 0.0 and 1.0, and the column sum must be 1.0.

Similar to previously described edit forms 1000, 1100, 1300, and 1400, there are two options from the Distribution of Gallons Purchased form 1500, either a Print Distribution button 1520 or a Return to Edit Form button 1522. The Print Distribution button 1520 creates a report containing the numbers of items purchased and their probabilities, and displays it on the screen. The user can than send the report to a printer or save it to a file in a variety of data formats. The Return to Previous Form button 1522 returns the user back to the appropriate Edit Simulation Scenario form 800 or 900.

Delete Parameter File

Figure 16:
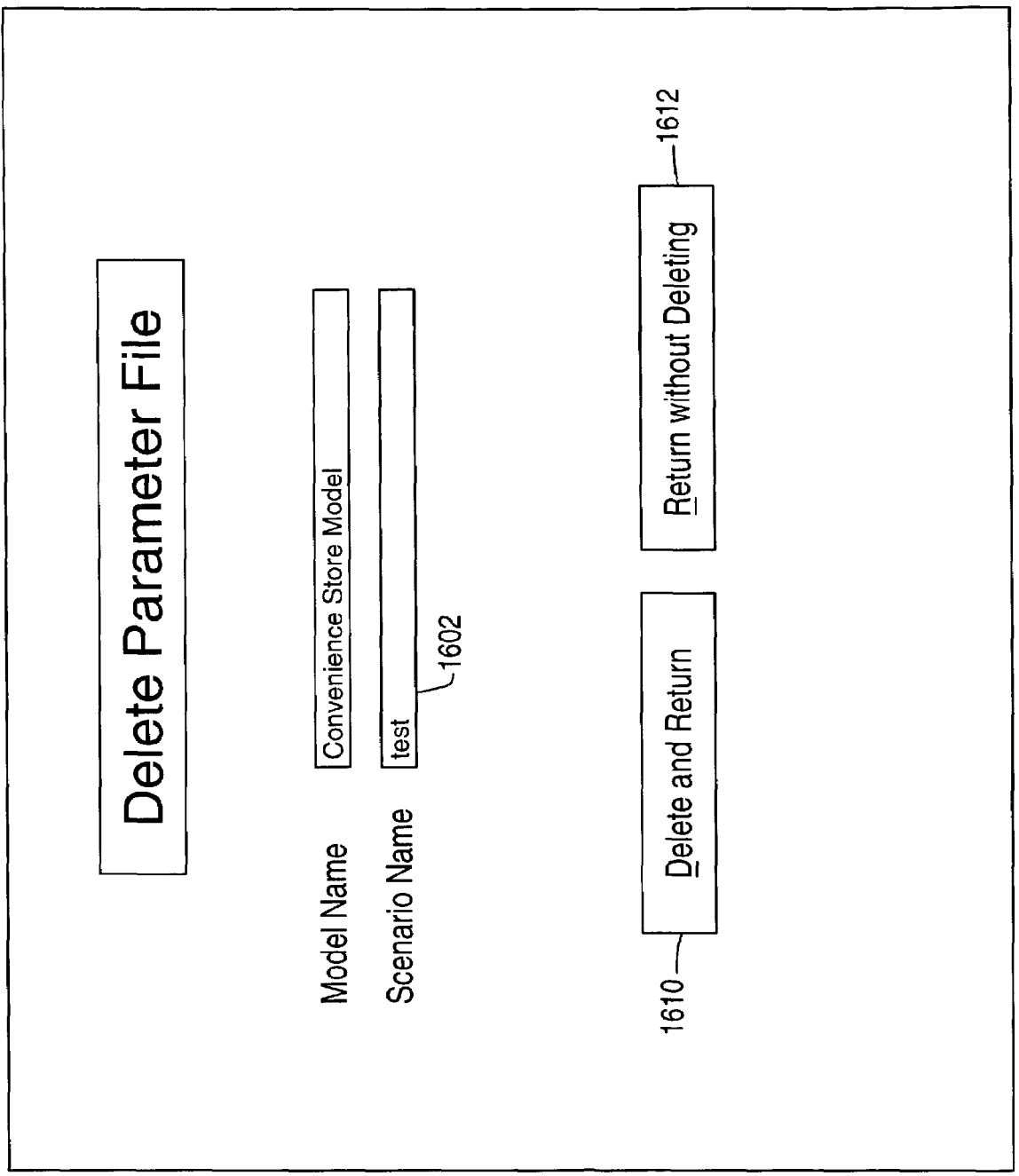
FIG. 16 depicts a delete parameter file form.

The user can delete scenario files by selecting the scenario on the Simulation Analysis or Financial Analysis Module forms 500, 700 and selecting the Delete Scenario button 538. Performing this action will cause a Delete Parameter File form 1600 to be displayed as depicted in FIG. 16. In FIG. 16, the user is about to delete a scenario called "test", as indicated in Scenario Name field 1602, created for the CStore model.

There are two options from the Delete Parameter File form 1600: a Delete and Return button 1610 and a Return Without Deleting button 1612. If the user selects Delete and Return button 1610, then the CSEM opens a window that prompts the user to confirm their request to delete the scenario file. Selecting OK to the confirmation will delete the scenario file and return the user to the Simulation (or Financial) Analysis Module form 500, 700. Selecting CANCEL on the confirmation will return the user to the Delete Parameter File form 1600 without deleting the file. The Return Without Deleting button 1612 returns the user to the Simulation Analysis Module form 500, or Financial Analysis Module form 700, without deleting the scenario file. Remember that the user cannot delete a model's Default scenario, so the only option the CSEM will allow the user to select in the Delete Parameter File form 1600 displayed in FIG. 16 is Return Without Deleting button 1612.

Print Scenario

Figure 17:
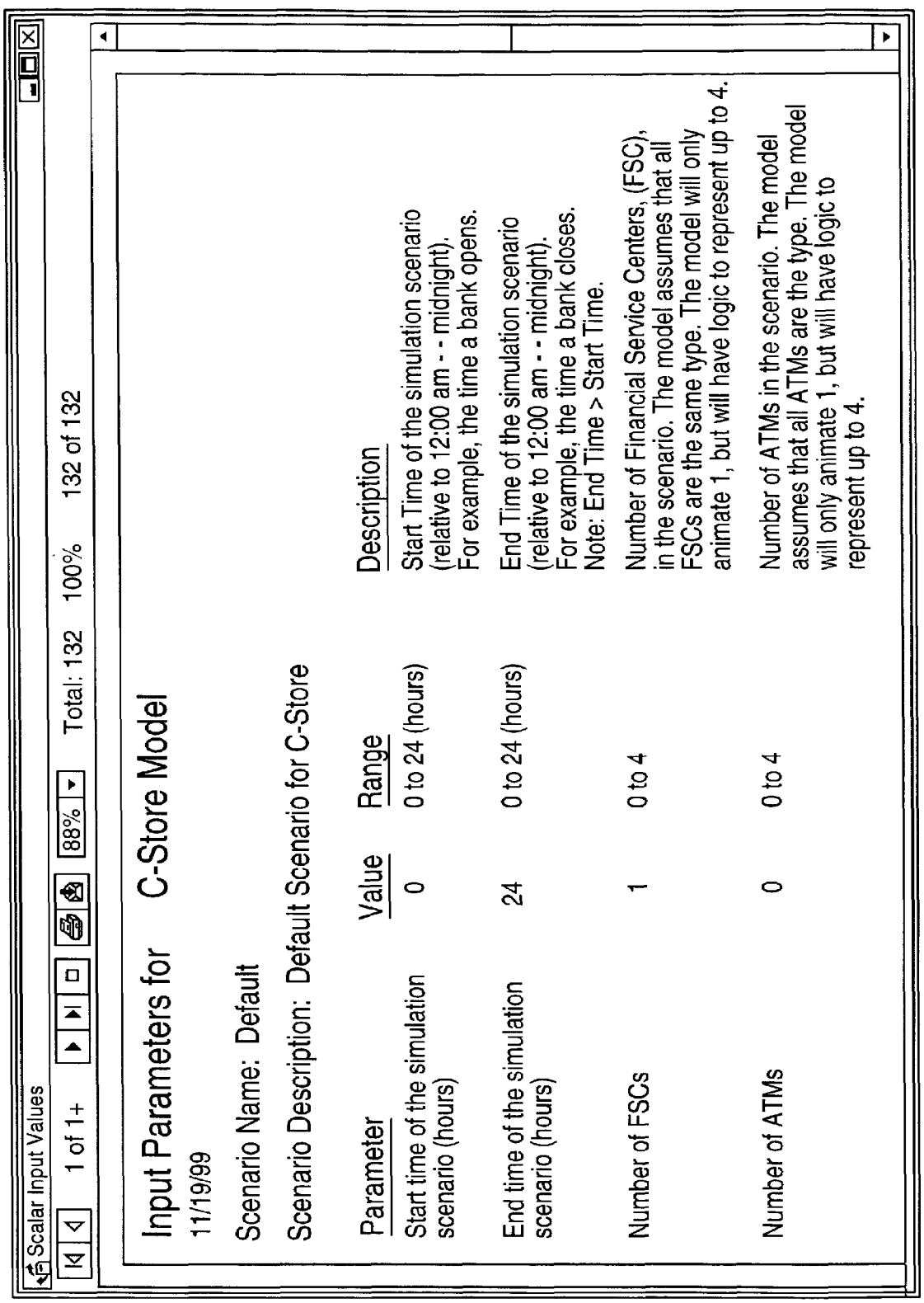
FIG. 17 depicts a first page of the Data Input Dictionary (DID) for the convenience store model.

The user can display a model's DID by selecting the Print Scenario button 536 from the Simulation Analysis or Financial Analysis Module forms 500, 700. FIG. 17 depicts the first page of the DID for the convenience store model. The user can use the control buttons at the top of this window to 1. Page through the report;
2. Print the report to the default printer, or;
3. Save the report to a disk file in the name of the user's choice and in a variety of data formats.

After finishing with the DID report, the user can close the report window as the user would with any other window, e.g., click on the "X" icon in the upper right hand corner.

The Print Scenario button 536 from the Simulation Analysis and Financial Analysis Module forms 500, 700 will create and display a report of only a model's scalar parameters and their values. To generate a report containing the values for non-scalar parameters, the user needs to select the print option button on the non-scalar parameter edit form. For example, selecting the Print Schedules button 1320 from the Personnel Schedules edit form 1300 will print the values for these parameters. Recall, only the CStore model contains non-scalar parameters.

Running Simulation

The user can run a simulation model from the Simulation Analysis Module form 500, 700. The user selects the model and scenarios the user wants to run and starts the simulation by selecting the Run Simulation Analysis button 542. Checking the Animation checkbox 548 below the Run Simulation Analysis button 542 will turn on the animation.

Animation Mode

New users are advised to first run a simulation scenario with the animation on. This will help users become familiar with the models and DID parameters. The animation will help, in many cases, to visually confirm the scenario that the user wishes to run is actually the one they are running. That is, the user did not set an input parameter value incorrectly.

Figure 18:
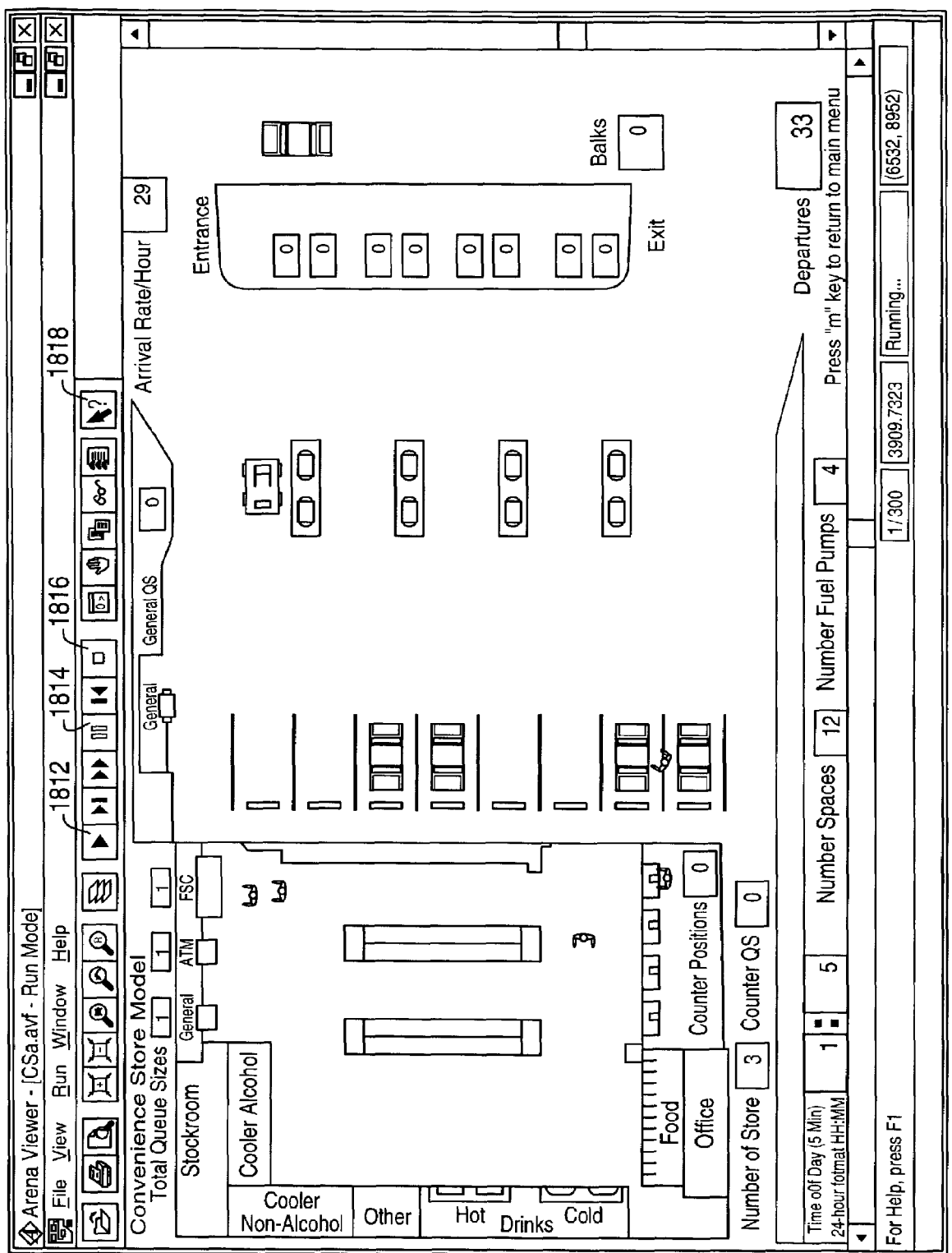
FIG. 18 depicts an animation overview screen.

To run a model with the animation on, the user checks the animation checkbox 548 before selecting the Run Simulation Analysis button 542. This action launches an application from System Modeling Corporation called Arena Viewer™, loads the model, and starts to run the scenario. FIG. 18 depicts the animation overview screen 1800 of the CStore.

In animation mode, the user controls the model execution using either the file menu options or a button menu bar. The set of buttons on the button menu bar control the scenario execution and include a Go (start a model) button 1812, a Pause button 1814, and an End button 1816. These buttons appear on the menu bar 1810 at the top of the window near the center of the screen 1800. The user can learn more about the Arena Viewer™ features using a Help file menu button 1818.

In animation mode, the model scenario will start running, i.e., Go, automatically. To pause the model, the user needs to click on the Pause button 1814, i.e., the button with two vertical lines, "||". The user may want to pause a model, for example, to describe the scenario to their audience or check to make sure the scenario status variables displayed on the screen appear correct. When the user is ready to start the model again, they select the Go button 1812, i.e., the right arrow button, "▶". To end the scenario, the user needs to click on the Pause button, "||", and then the End button, i.e., the button with a rectangle. The user can restart the model after a Pause or begin it again after they select the Pause and End buttons, by selecting the Go button. When the user finishes demonstrating the model or is confident the model scenario appears correct, the user needs to End the simulation scenario, close the Arena Viewer™ application, and return to the CSEM application. The simplest method to close the Arena Viewer™ application is to click on the X icon in the upper right hand corner of the screen.

Another important reason to first run a model scenario in animation mode is the simulation models perform additional checks on whether the parameter values for a scenario are feasible or not. If an error is found, the model will stop prematurely (i.e., before the model completes the specified number of replications). If the model stops, Arena Viewer™ will display a window asking if the user would like to see the model's results. Answer Yes to this prompt and a window displaying a text file will display on the screen. The first line of this text file will contain an error message that indicates why the model stopped. Take note of the error message, close the text file window, close the Arena Viewer™, and go into the Simulation Analysis Module and make the correction to the input scenario indicated by the error message. If the user is unable to correct the error, copy the error message into an email and send it the technical support email address provided in the Introduction section. If the user is in animation mode and the model scenario runs to completion, then click the No button on the prompt to see the model's results, close the Arena Viewer™ application, and go into the Output Module to see the results.

Figure 19:
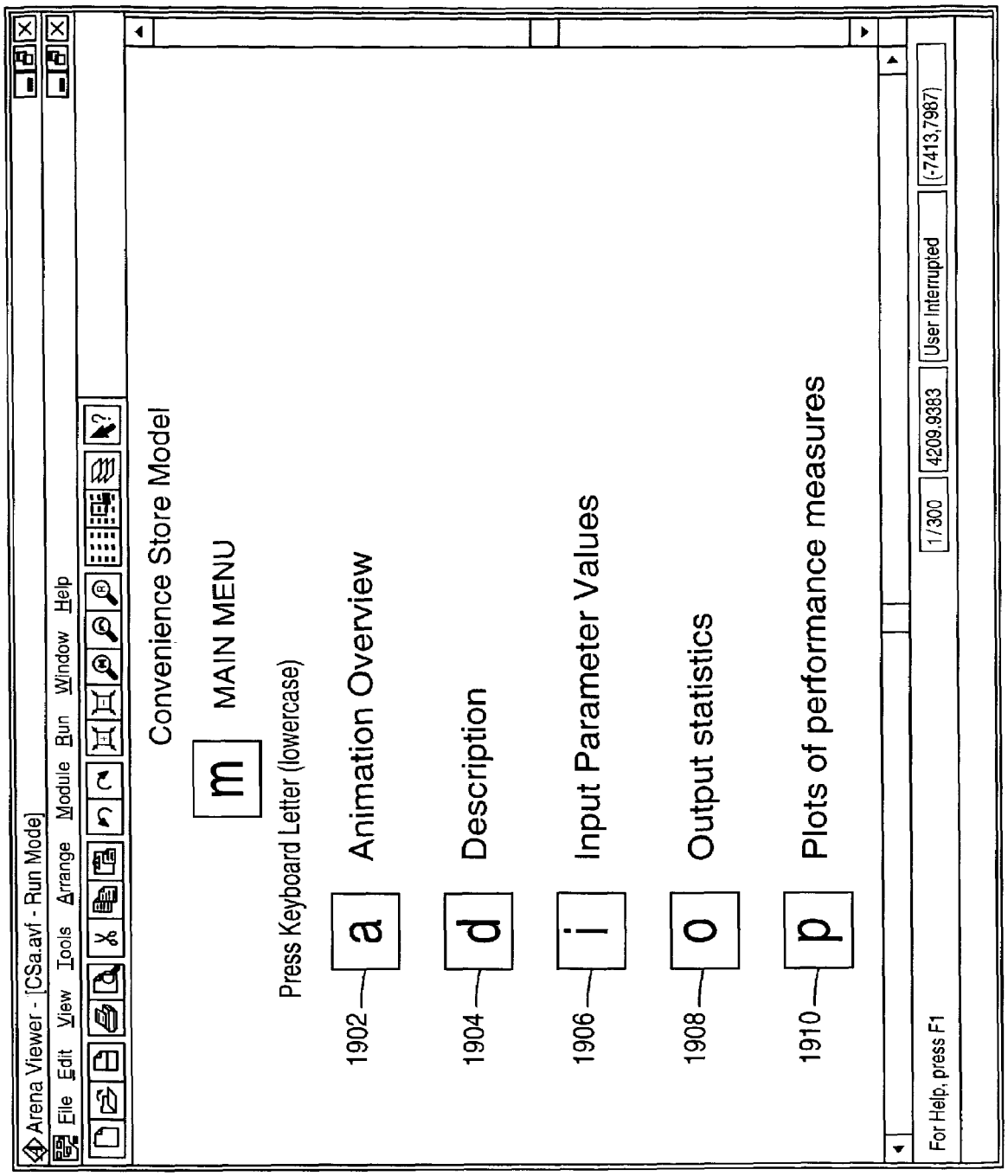
FIG. 19 depicts a main menu form.

The present invention also sets up several screen views in each of the simulation models to help the user better understand and communicate the model's results. The user can display these screen views only when a model is run in animation mode. Arena Viewer™ lists the screen views for each model when the user presses the "m" key (lower case) on the keyboard. FIG. 19 depicts a Main Menu form 1900 including buttons, i.e., an animation overview button 1902, a description button 1904, an input parameter values button 1906, an output statistics button 1908, and a plots of performance measures button 1910, providing access to the screen views available in the CStore model.

Figure 20:
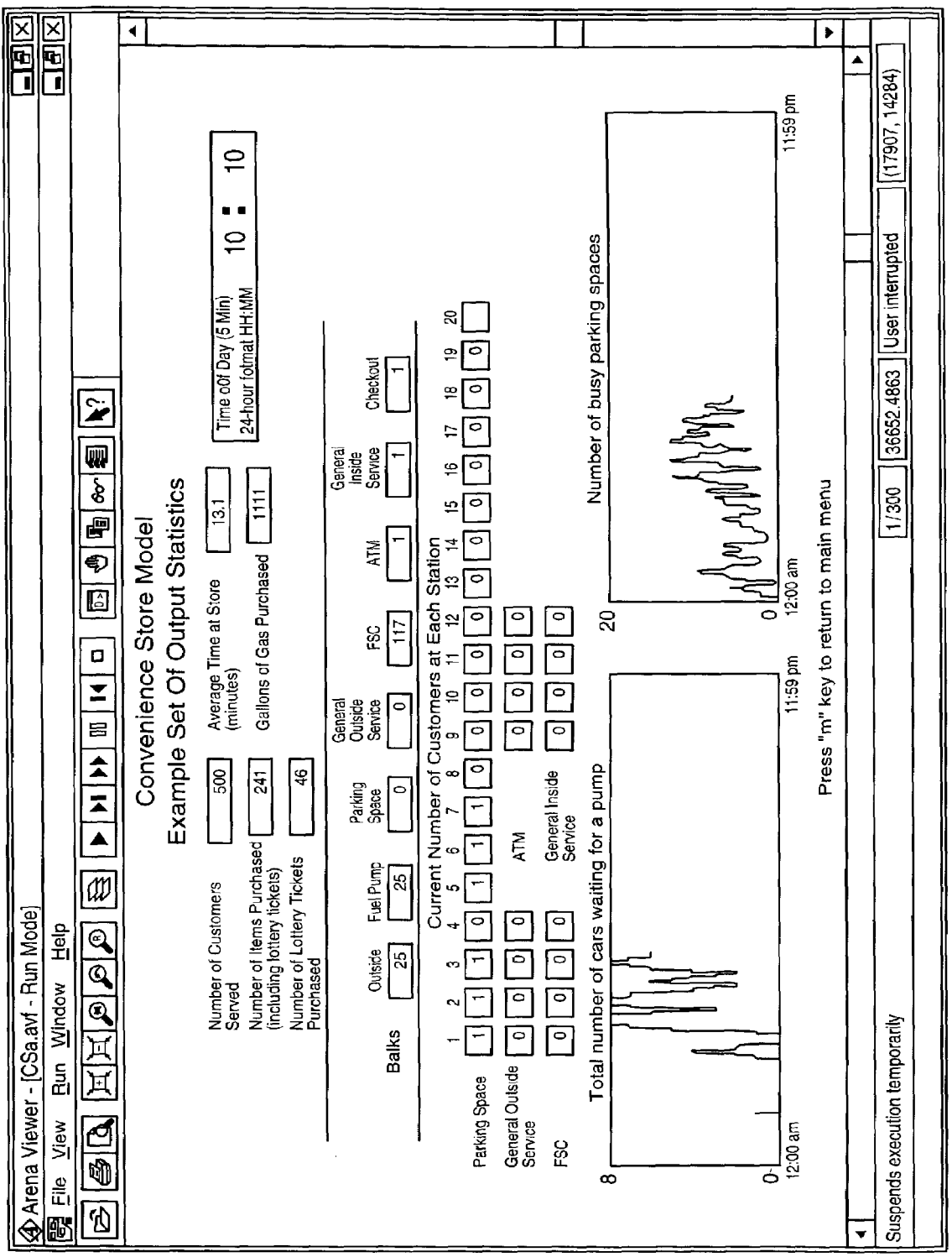
FIG. 20 depicts an example set of output statistics for the convenience store model.
Figure 21:
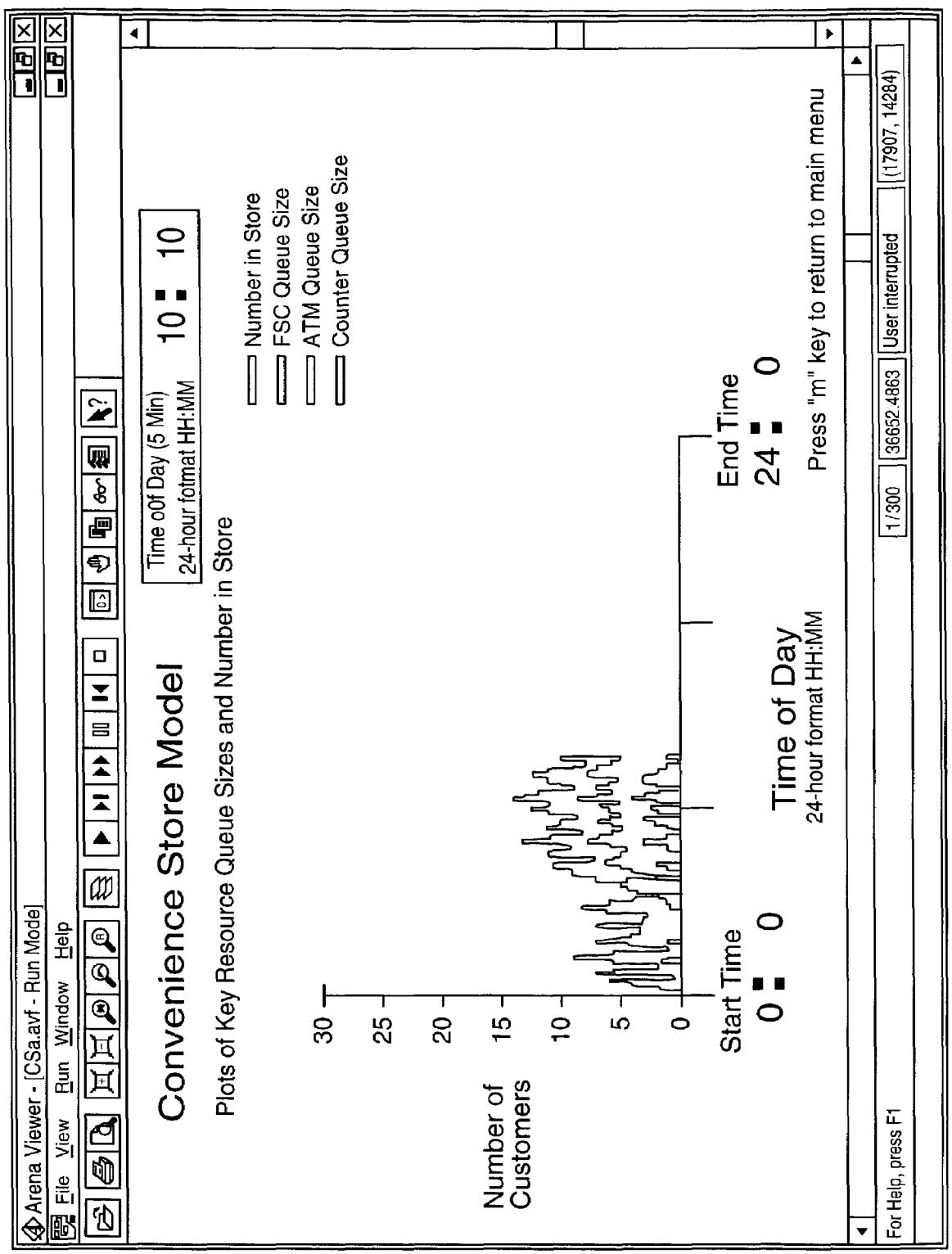
FIG. 21 depicts a graph of number of customers versus time of day.
Figure 22:
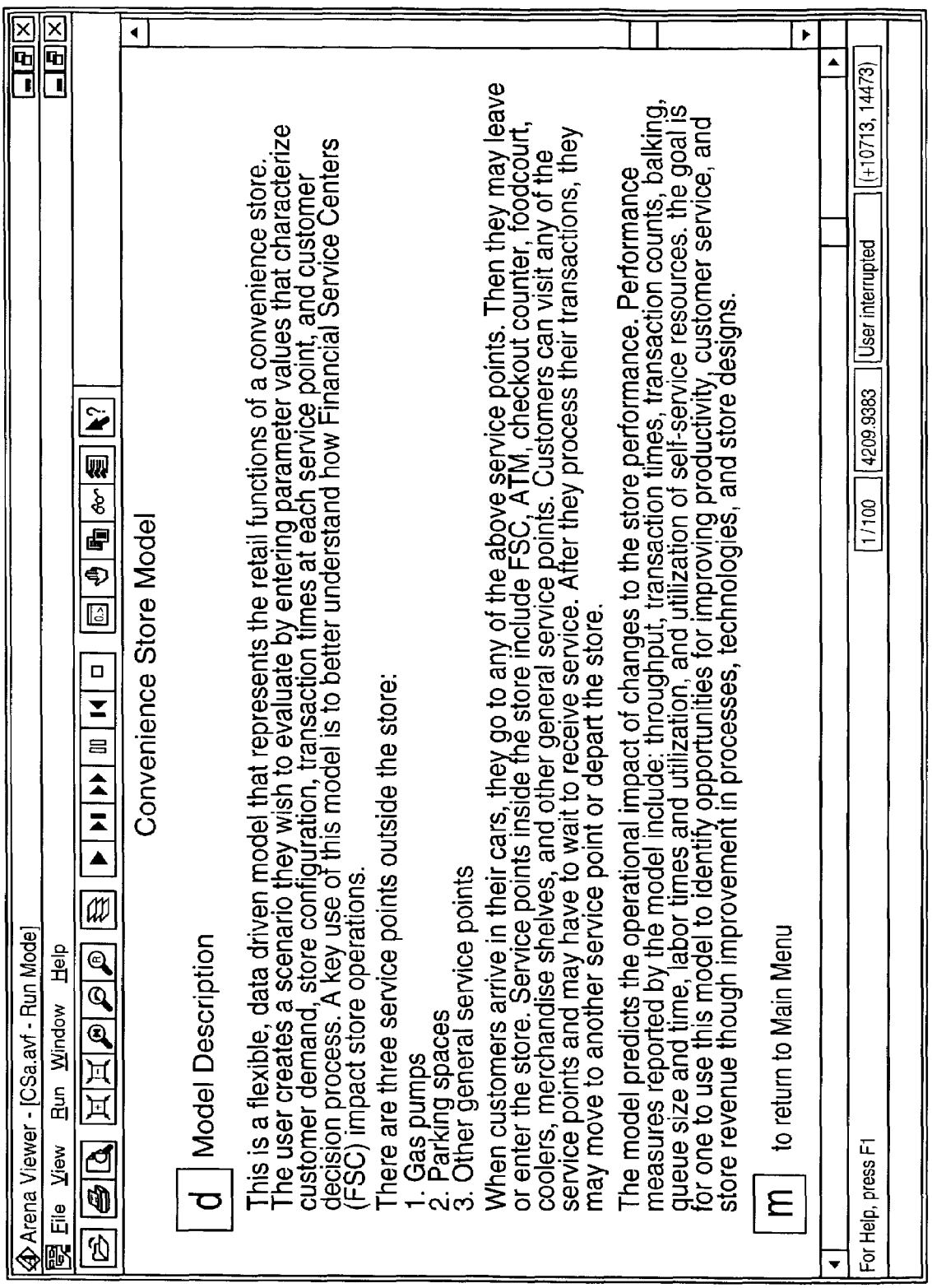
FIG. 22 is a model summary description.
Figure 23:
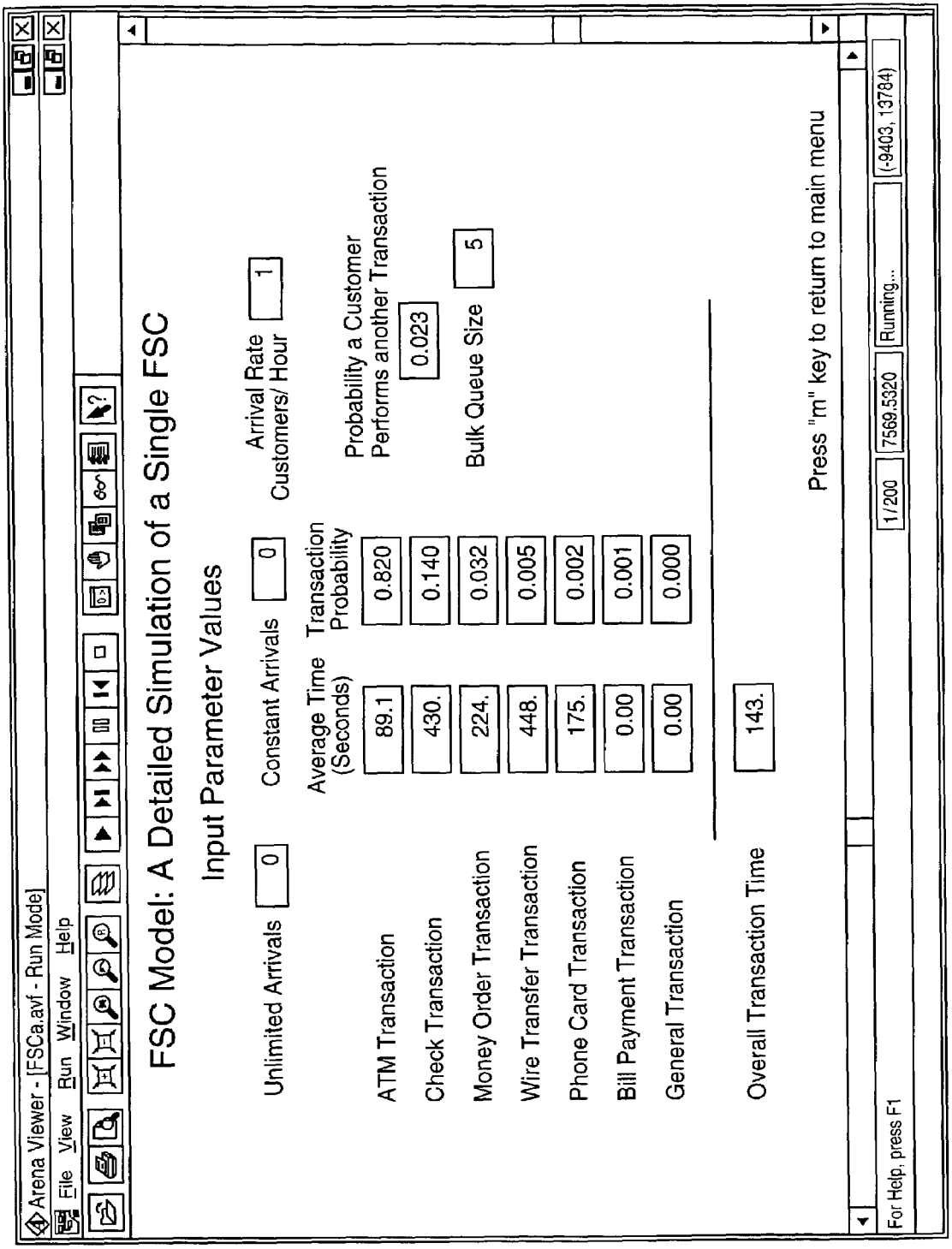
FIG. 23 depicts a screen view of an input parameter values form.
Figure 24:
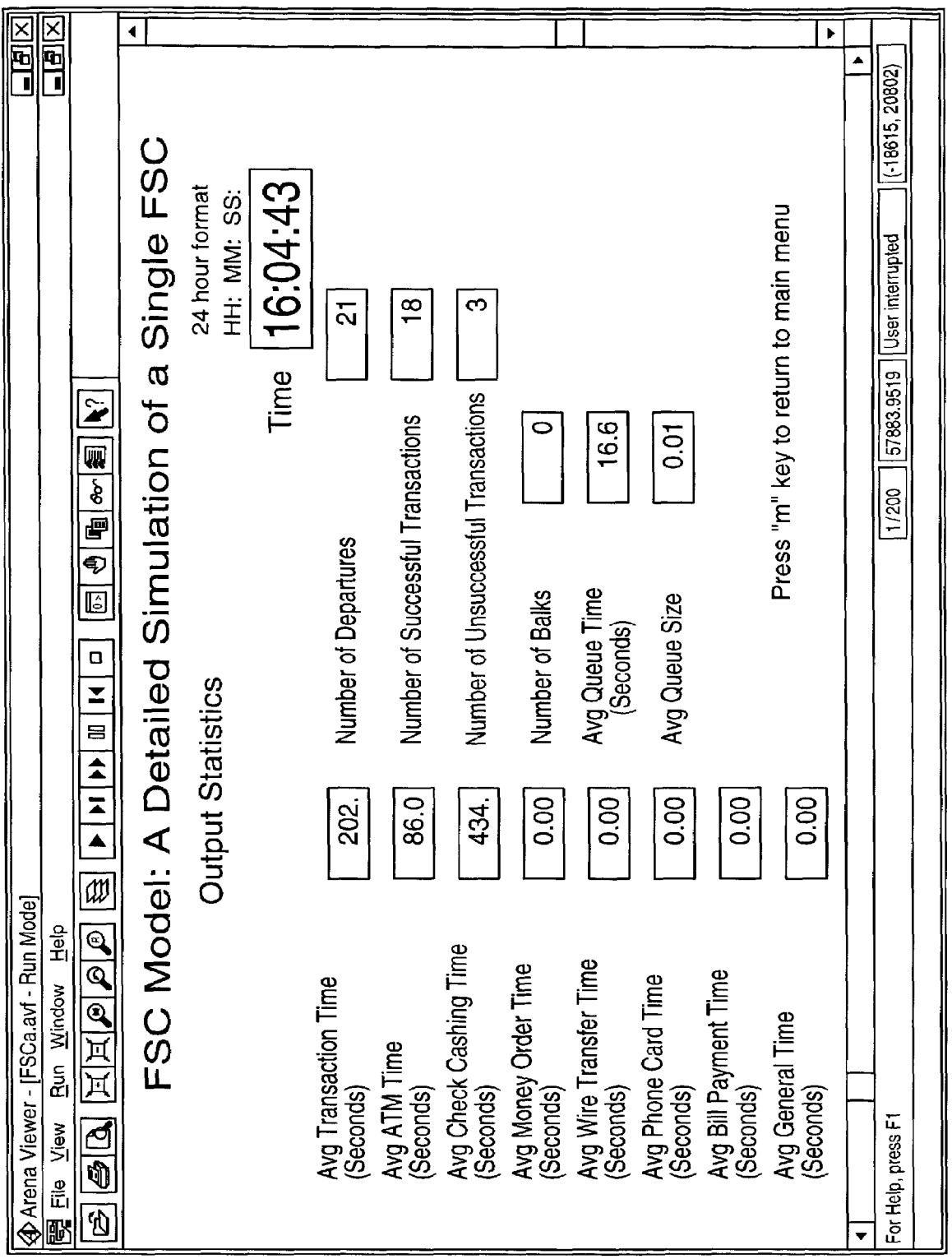
FIG. 24 depicts a screen view of an output statistics form.

The user can switch between screen views by entering the lower case letter corresponding to the screen view title. For example, pressing the "a" key 1902 switches the view back to the animation overview screen displayed in FIG. 18. FIG. 20 depicts the screen view displayed when pressing the "o" key 1908. This screen depicts the current value of some of the output performance measures reported by the model. FIG. 21 depicts a graph with a plot of Number of Customers in Store versus Time of Day. FIG. 22 depicts a screen view that gives a summary description of the model. FIG. 23 depicts a screen view of the input parameter values form and FIG. 24 depicts a screen view of the output statistics form.

Analysis Mode

When the user is ready to run simulation experiments to analyze the impact of certain design, procedure, or technology changes on FSC or convenience store performance, the user should do so with the animation off. This mode of running scenarios is referred to as the analysis mode. When the animation is off, the models execute much faster allowing the user to conduct more statistically sound experiments. The CSEM can also evaluate many more scenarios in a shorter time period.

Figure 25:
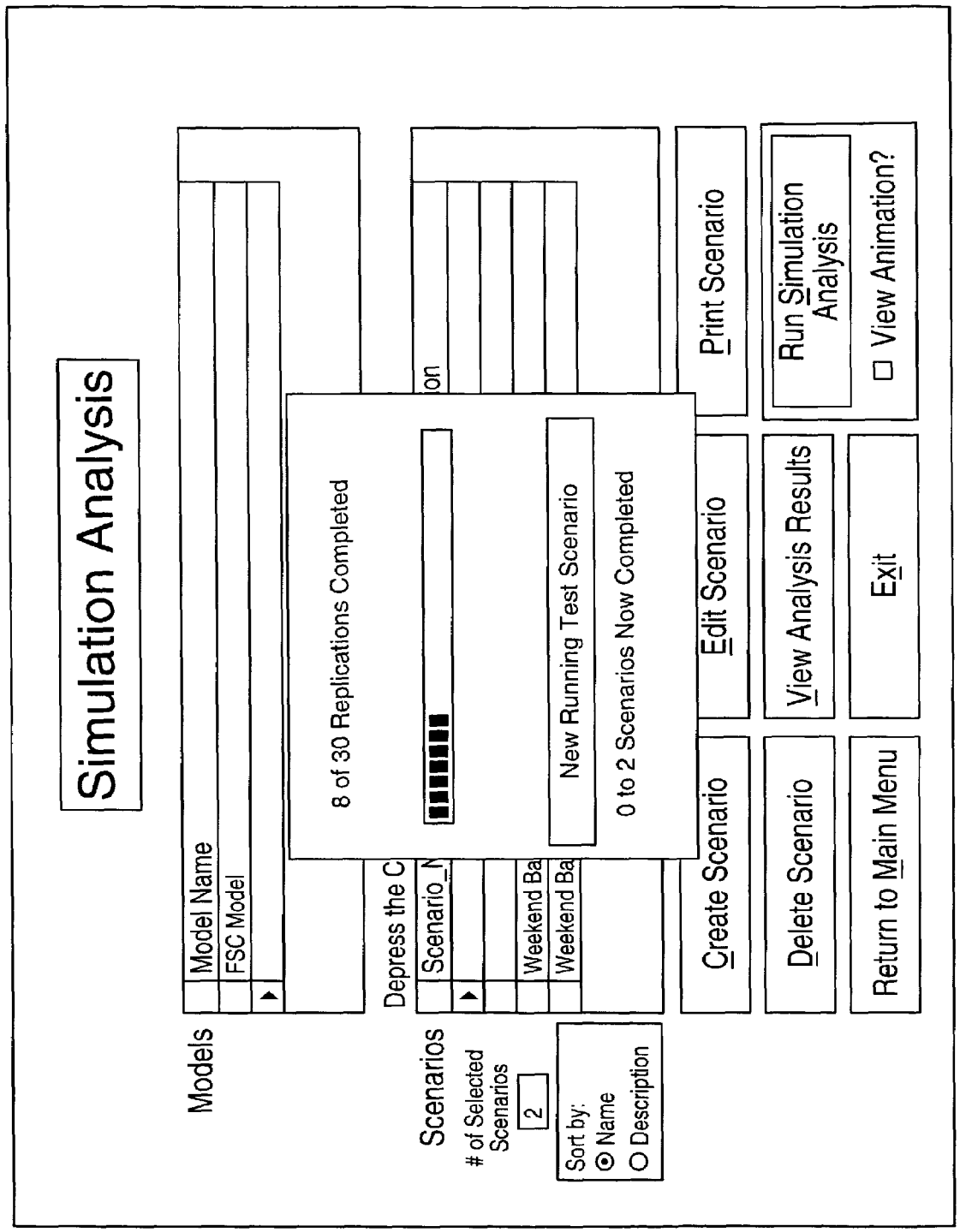
FIG. 25 depicts a model during processing of a scenario.

To run a scenario in analysis mode, the user selects the Run Simulation Analysis button 542 on the Simulation Analysis Module form 500, 700 with the Animation checkbox 548 left unchecked. After a slight delay to initialize the model, a window will appear displaying the current number of replications completed out of the total number of replication the user specified in the input parameter "Number of simulation replications". For example, FIG. 25 illustrates the model has processed 8 out of the 30 replications for this scenario, which is the first of the two scenario selected.

Figure 26:
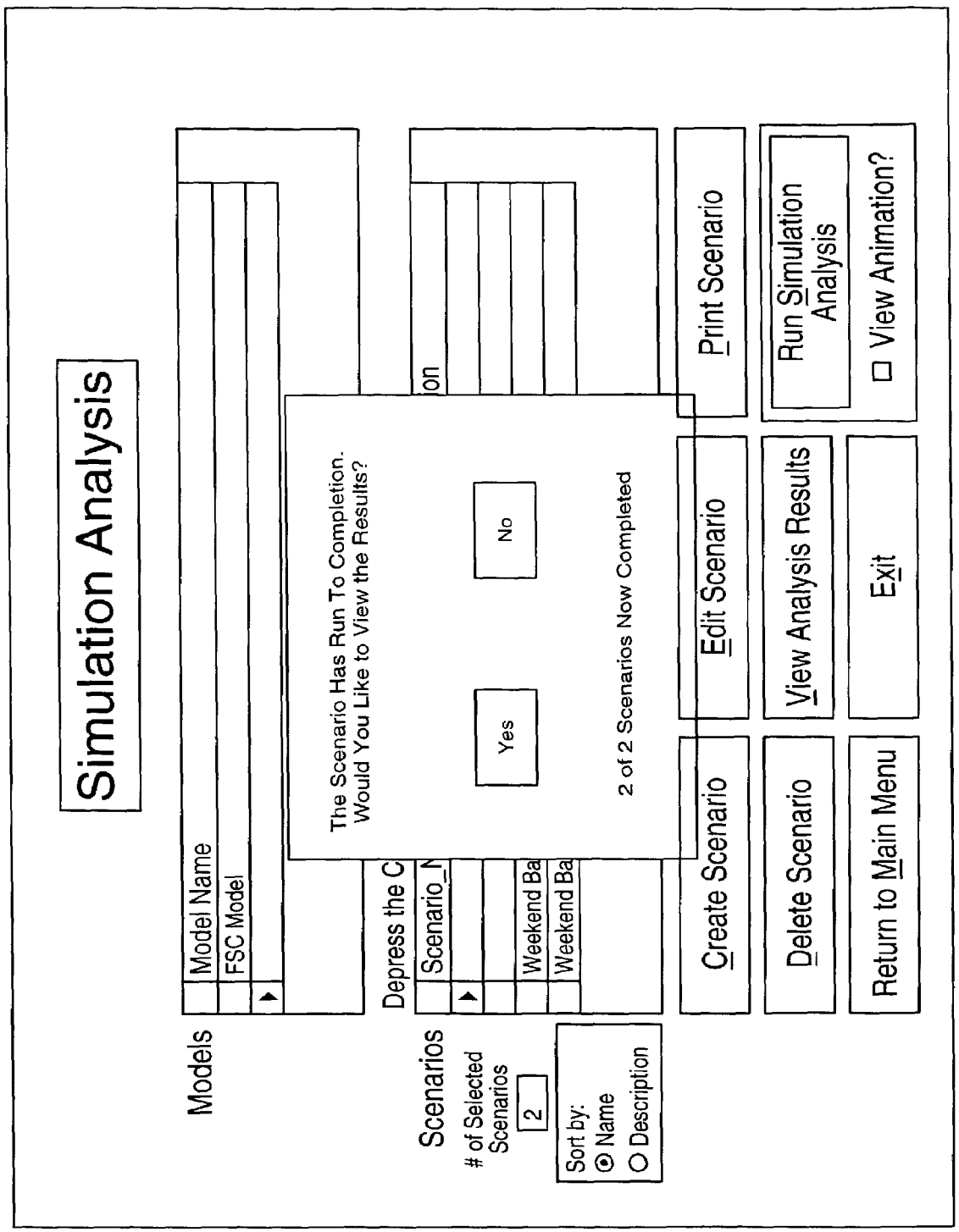
FIG. 26 depicts the model after completing replications.
Figure 27:
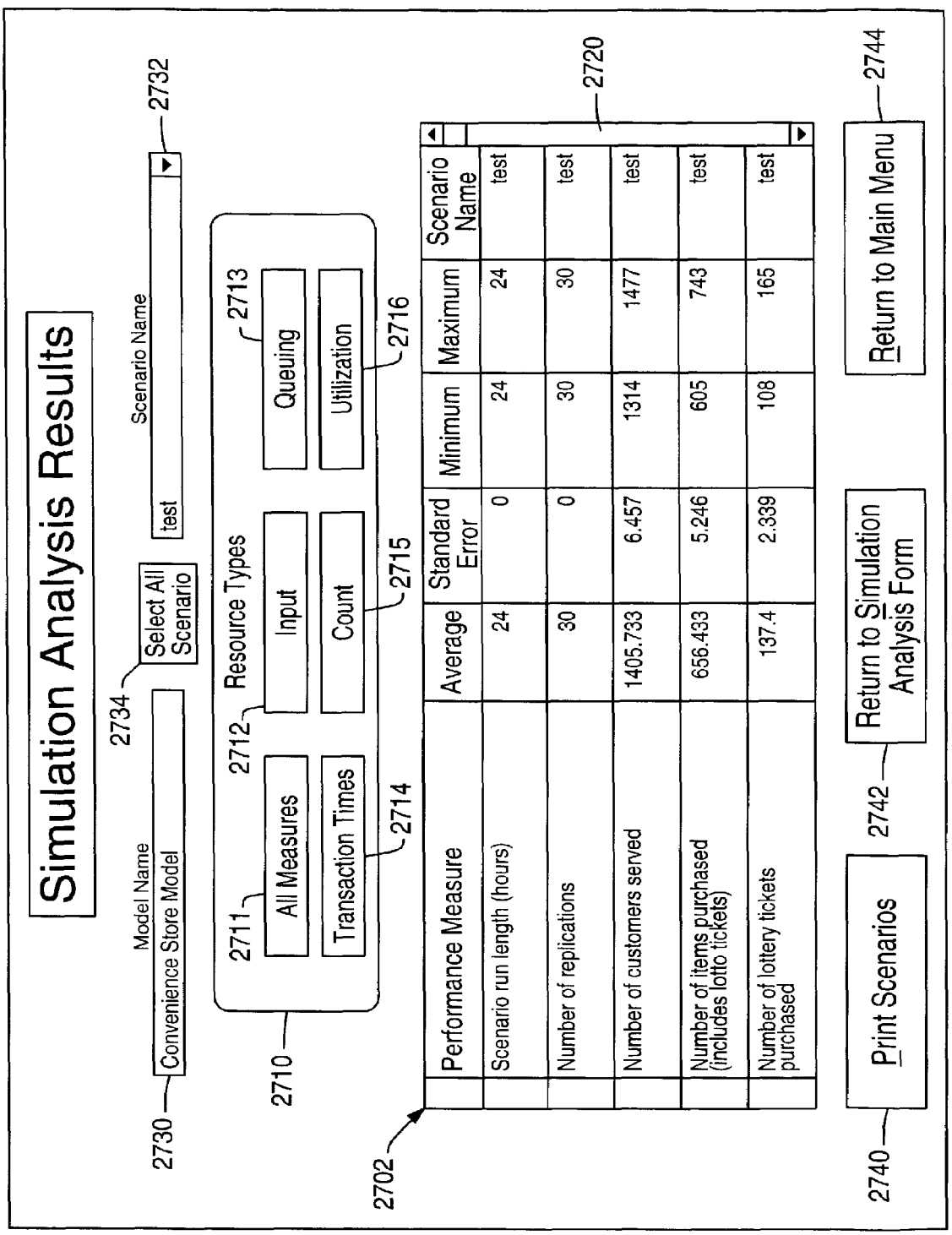
FIG. 27 depicts an output module form for a convenience store model.

As depicted in FIG. 26, when the model completes all the replications, the CSEM will display a window to ask if the user would like to see the results. Selecting Yes will cause the CSEM to display the Output Module form 2700 as depicted in FIG. 27 described below. Selecting No will return the user to the Run Simulation Module form 500, 700.

Simulation Output

Each of the simulation models in the CSEM has its own set of output performance measures. These measures include throughput, transaction times, queue sizes and times, resource utilization, and customer times.

Figure 28:
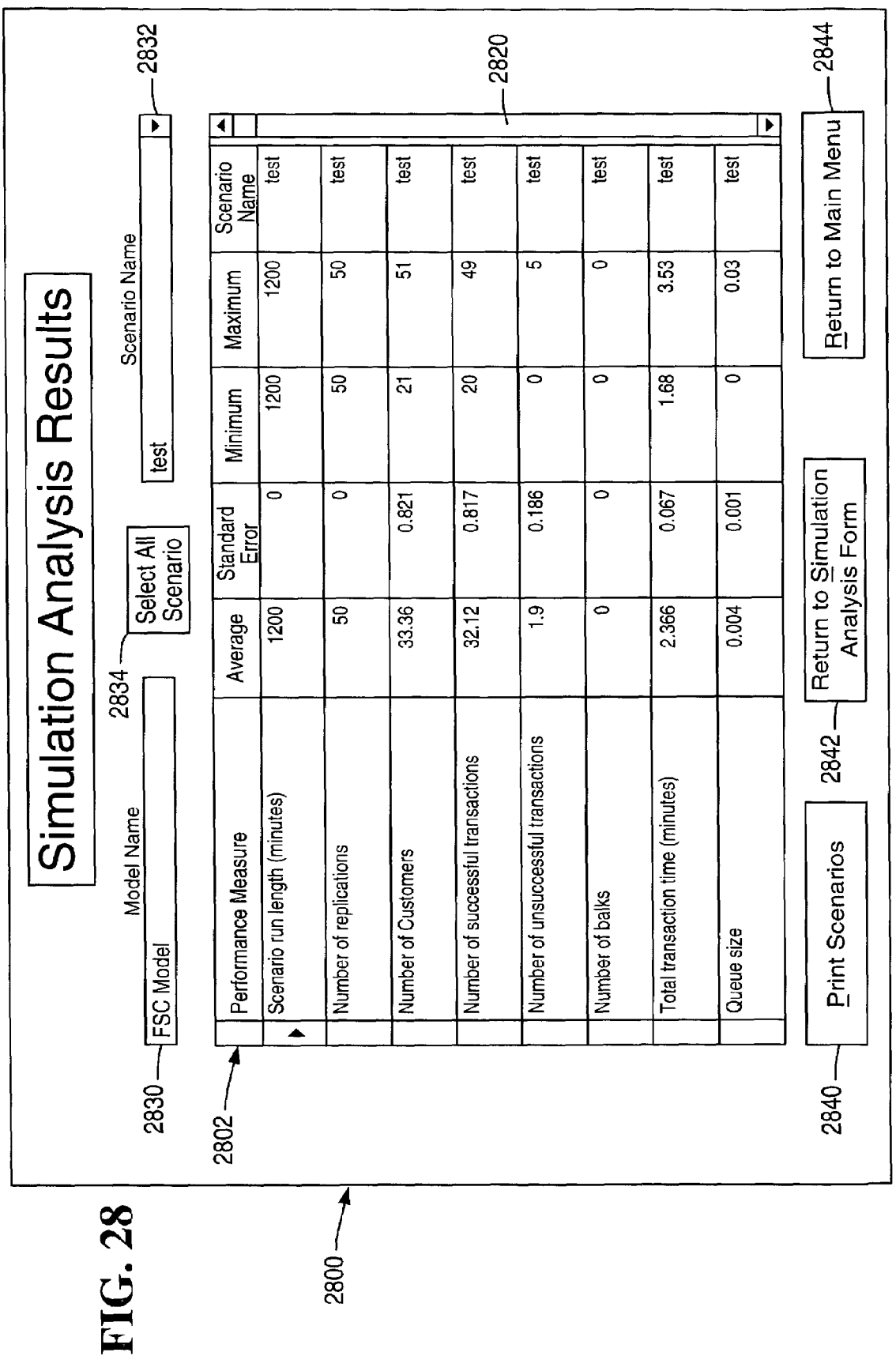
FIG. 28 depicts an output module form for an FSC model.

FIGS. 27 and 28 show the Output Module forms 2700, 2800 for the CStore and FSC models, respectively, and include a performance measure table 2702, 2802. The difference between the Output Module forms 2700, 2800 is the CStore model set includes a Resource Types section 2710 having Resource Type filter buttons, i.e., an All Measures button 2711, an Input button 2712, a Queuing button 2713, a Transaction Time button 2714, a Count button 2715, and a Utilization button 2716, for different sets of performance measures and the FSC model does not. These buttons 2711-2716 allow the user to display only particular performance measure types, e.g., Count button 2715 displays numbers of transactions by service point. To view the report, the user scrolls the table using the scroll bar 2720, 2820 to the right of the performance measures table 2702, 2802. To view a particular performance measure set, click the performance measure button in the Resource Type section 2710.

The Output Module forms 2700, 2800 also display the Model Name in a Model Name field 2730, 2830 and Scenario Name in a Scenario Name field 2732, 2832. If the user runs a batch of more than one scenario, then there will be a list of scenario names in the Scenario Name drop-down window from which they can choose to display the results in the table. Selecting a Select All Scenarios button 2734, 2834 will display the results for all scenarios run in the batch. The table entries in performance table 2702, 2802 will be grouped by performance measure.

The performance measures report 2702, 2802 contains estimates for the average, standard error, minimum, and maximum value for each performance measure. The minimum and maximum values are the minimum and maximum values of the summarized performance measure at the end of a replication and not necessarily the minimum and maximum value during a replication. The standard error statistic provides a measure of error for how well the average value reported by the model estimates "the true" average value. In general, the user can view "the true" average value to fall within plus or minus two times the standard error value around the estimated average.

An alternative way to view a performance measures report is to select a Print Scenario button 2740, 2840. This action creates a performance measures report document and displays it on the screen. FIGS. 29 and 30 depict the reports for the CStore and FSC models, respectively. The user can use the control buttons at the top of these forms to page through the report, print it, or save it to a disk file in various data formats.

The other two options for the Output Module form 2700, 2800 are a Return to Simulation Analysis Form button 2742, 2842 and a Return to Main Menu button 2744, 2844.

The CSEM does not save simulation results from previous simulation runs. So, the user will need to send the report to a printer or write it to a file to retain the results each time they run a scenario. Writing the report to a file and reading it into a spreadsheet application such as Excel™ or Lotus™ makes it easier to consolidate output reports comparing system performance across simulation scenario.

Financial Analysis Module

An analyst can use the Financial Analysis Module as a separate analysis tool or in conjunction with the Simulation Analysis Module. When used separately, an analyst enters the financial parameter values along with the expected transaction volume by transaction type for the analysis. When used with simulation, the financial analysis uses the transaction volume results from the corresponding simulation scenario to perform the analysis.

Figure 31:
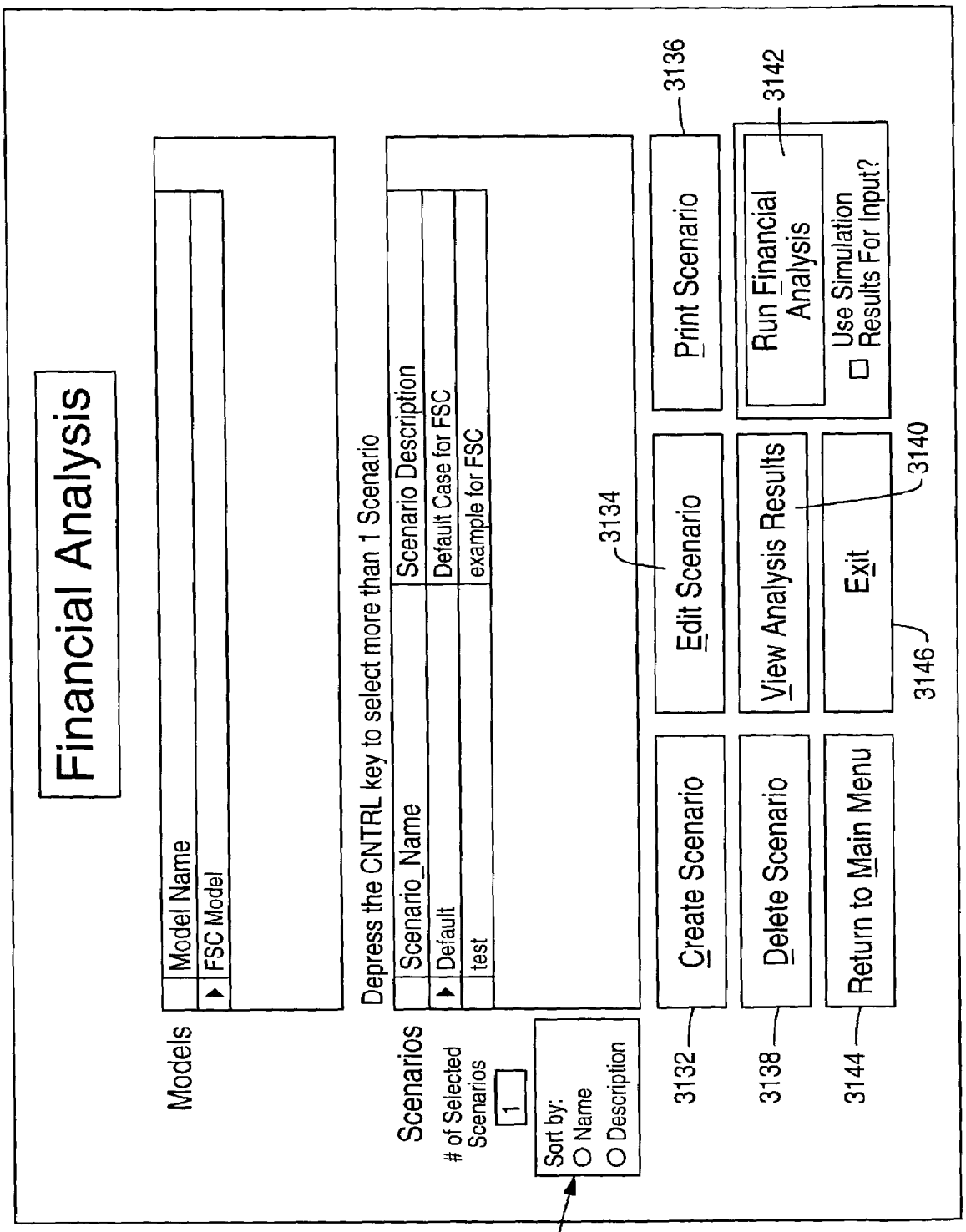
FIG. 31 depicts a financial analysis form.

FIG. 31 depicts the Financial Analysis form 3100 which is similar to the Simulation Analysis form 500 in appearance and functionality. That is, users can create, save, edit, delete, print and run one or more input parameter files to shows the financial impact of one or more FSCs. A Create Scenario button 3132, an Edit Scenario button 3134, a Print Scenario button 3136, and a Delete Scenario button 3138 perform the same parameter file operations as described in conjunction with the Simulation Analysis form 500. These features are described in the corresponding section of the Simulation Analysis chapter. The Financial Analysis form 3100 also includes a View Analysis Results button 3140, a Run Financial Analysis button 3142, a Return to Main Menu button 3144, and an Exit button 3146 which behave similar to the corresponding buttons 540, 542, 544, and 546 of the Simulation Analysis form 500. The Financial Analysis form 3100 includes a Use Simulation Results For Input checkbox 3148 described in detail below.

A FSC model scenario created in the Financial Analysis Module will also appear in the Simulation Analysis Module (and vice-versa). However, the user will only be able to edit a scenario's financial analysis parameters while in the Financial Analysis Edit Scenario form and the scenario's simulation parameters in the Simulation Analysis Edit Scenario form. Displaying the FSC model scenarios in both modules allows the user to link the financial analysis to the corresponding simulation scenario results.

To run a financial analysis, the user needs to select one or more scenario files and click the Run Financial Analysis button 3142. The financial calculations run very fast and the application prompts the user to view the results as soon as the application completes the analysis. If the user responds yes to the prompts, the application displays the Financial Analysis Output form 3200 similar to the one shown in FIG. 32. If the user responds no to the prompt when the analysis is finished, the user may still view the results by selecting the View Analysis Results button 3140. Remember that the application only retains the results for the last analysis run. If the user checks the Use Simulation Results for Input checkbox 3148 before running the financial analysis, the application will run the corresponding simulation scenario(s) for the FSC model first and use those results in the financial analysis. The user should be careful that all simulation scenarios run individually or in a batch are feasible scenarios, i.e., scenarios that run successfully and are terminated upon completion at the end of the simulation run. If a scenario is not feasible, and terminates prior to completing the first replication, then the application will use the results from the previous scenario for generating the performance measures report. Scenarios terminating after the first replication and before the end of the simulation may cause the application to close or provide unreliable results.

The last two options from the Financial Analysis form 3100 are Return to Main Menu button 3144, which returns the user to the main menu 400 (shown in FIG. 4), and Exit button 3146, which closes the application.

Similar to the Simulation Analysis Module, the Financial Analysis Module allows the user to create numerous scenario (assuming the user has adequate hard disk space available) files for the FSC model. The user can sort the list of scenarios by name or description by selecting the corresponding radio button in a Sort By section 3154.

When installed, the CSEM contains one Default scenario for the FSC model in the Financial Analysis Module. The values in the Default scenarios are from industry composite data collected and summarized. The user will not be able to delete or change any parameter values on the Default scenarios. These operations can only be performed on scenario files created by the user.

The application displays the Financial Analysis Results in the form of a standard profit and loss (P&L) statement 3300 as depicted in FIG. 33. The P&L statement 3300 consist of three sections. The first section shows the total annual number of transactions, benefits (revenue), and costs for the FSC(s). The second section shows the annual cash flows after accounting for the effects of depreciation and taxes. The final section contains the number of FSCs, NPV, IRR, and approximate payback for the after tax cash flows in section two. Users enter the number of years to include in the financial analysis.

An alternative way to view the output report is to select a Print Scenario button 3202. This action creates a performance measures report document and displays it on the screen. FIG. 33 illustrates the P&L report 3300. The user can use control buttons at the top of form 3300 to page through the report, print it, or save it to a disk file in various data formats.

The other two options for the Financial Analysis Result form 3200 are Return to Financial Analysis Form 3204 and Return to Main Menu 3206.

Figure 34:
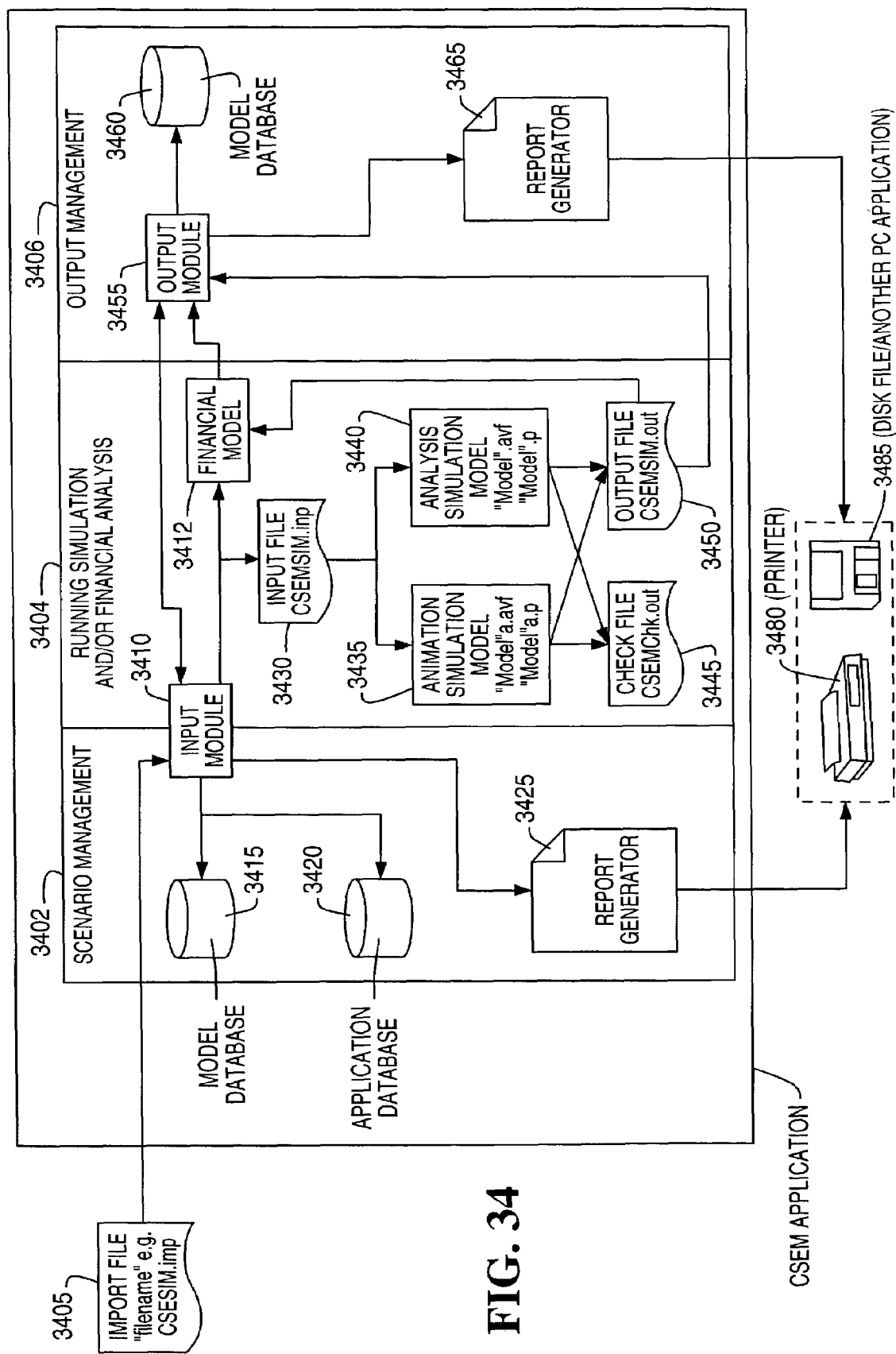
FIG. 34 depicts a logical architecture for a preferred embodiment of the CSEM.

As depicted in FIG. 34, a logical architecture for the CSEM simulation model is illustrated. As depicted in FIG. 34, an import file 3405 is provided to an input module 3410. As depicted in FIG. 34, there is a scenario management section 3402, a running simulation section 3404 and an output management section 3406. The input module 3410 straddles both the scenario management section 3402 and the running simulation section 3404. The input module 3410 provides a model database 3415 with information from the imported file 3405. The input module 3410 also provides the various parameters to an application database 3420. The input module generates an Report Generator report 3425 which can be output to a printer 3480 or another disk file 3485. The input module provides information to the running simulation section 3404 and more particularly to an input file 3430 and a Financial Model 3412. The input file 3430 is provided to an animation simulation model 3435 and to an analysis simulation model 3440. The models 3435, 3440 provide output to a check file 3445 and to an output file 3450. An output module 3455 receives the data from the input module 3410, financial model 3412, and from the output file 3450. The output module 3455 provides data to a model database 3460 and to a Report Generator report 3465. The Report Generator report 3465 can be printed on printer 3480 or output to another disk file 3485.

Figure 35:
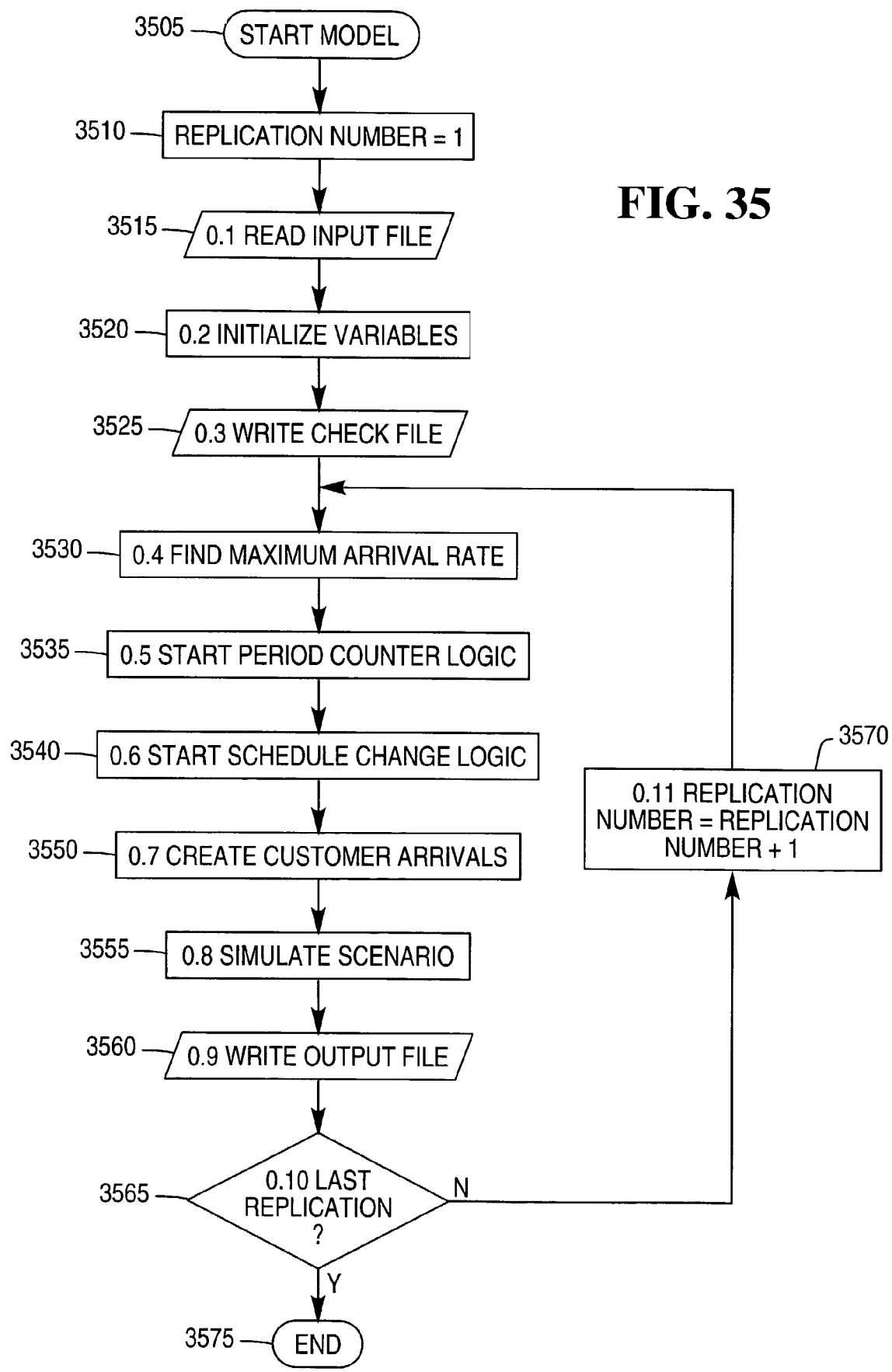
FIG. 35 depicts an overview of the simulation process.

An overview of the simulation process is illustrated in FIG. 35. At 3505, the model is started. At step 3510, the replication number is set at 1. At step 3515, the input file is read. At step 3520, the variables are initialized. At step 3525, the check file is written. At step 3530, the maximum arrival rate is found. At step 3535, the period counter-logic is started. At step 3540, the schedule change logic is started. At step 3550, the create customer arrivals has begun. At step 3555, the scenario is simulated. At step 3560, the output file is written. At step 3565, it is determined if the last replication has been performed. If the answer is no, then at step 3570, the replication number is incremented by 1 and the process is returned to step 3530. If the last replication has been performed, then from step 3565, the process is ended at step 3575.

Figure 36:
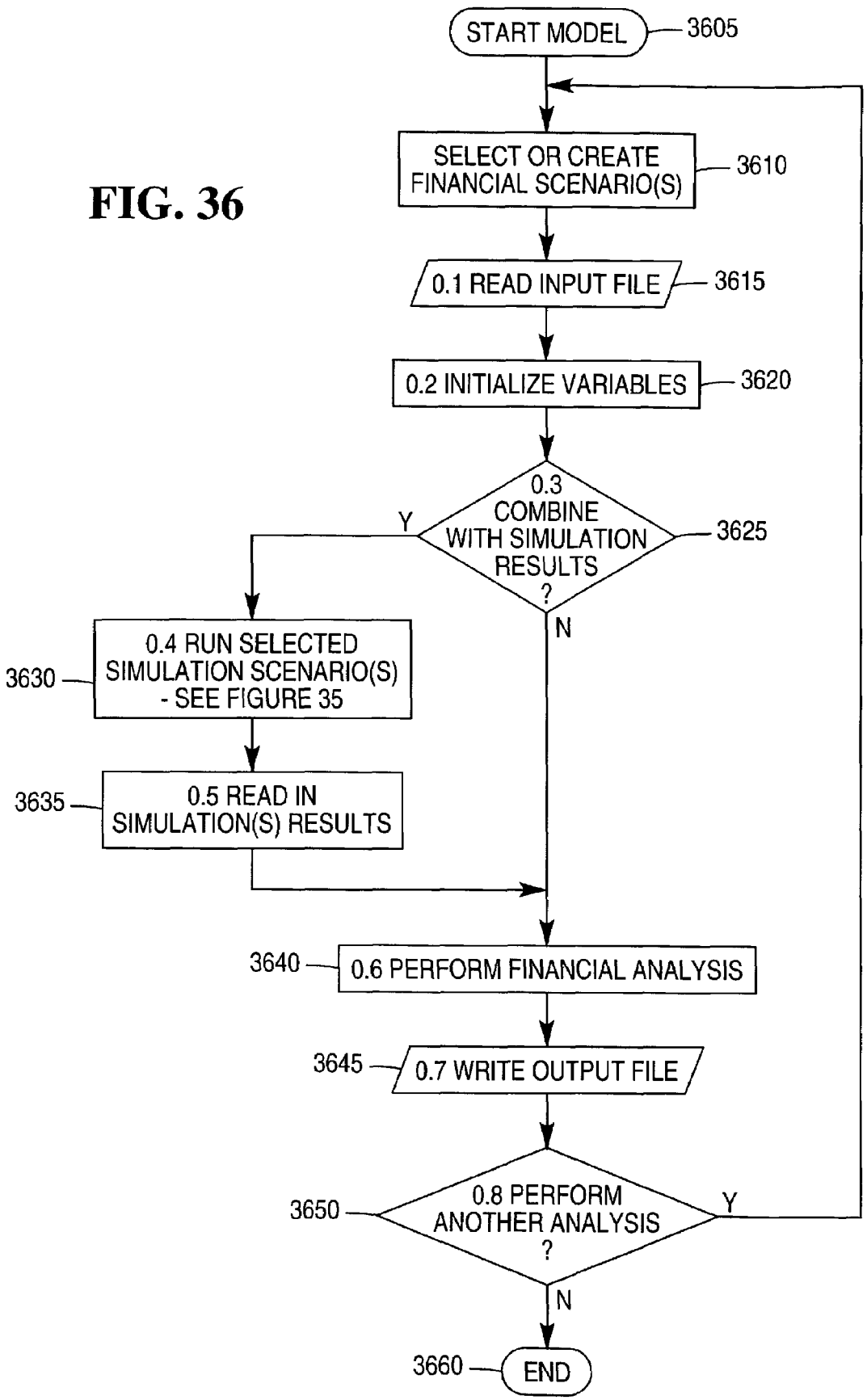
FIG. 36 is a flow diagram of the financial analysis module.

A process flow of the financial analysis module is depicted in FIG. 36. At 3605, the model is started. At step 3610, the user selects or creates a financial scenario using CSEM and the flow of control proceeds to step 3615. At step 3615, an input file is read. At step 3620, the variables are initialized. At step 3625, it is determined if the financial analysis is to be combined with the simulation results and if so, the flow proceeds to step 3630. At step 3630, the selected simulation scenario is executed as described in detail with reference to the process flow depicted in FIG. 37. The flow proceeds to step 3635 wherein the simulation results are read. The flow proceeds to step 3640. If the result of the determination of step 3625 is negative, the flow proceeds to step 3640. At step 3640, the financial analysis is performed. At step 3645, an output file is written. At step 3650, a determination is made whether to perform another analysis. If the determination is positive, the flow proceeds to step 3610 where the process is repeated. If the determination is negative, the flow proceeds to step 3660. At step 3660, the model ends.

Figure 37A:
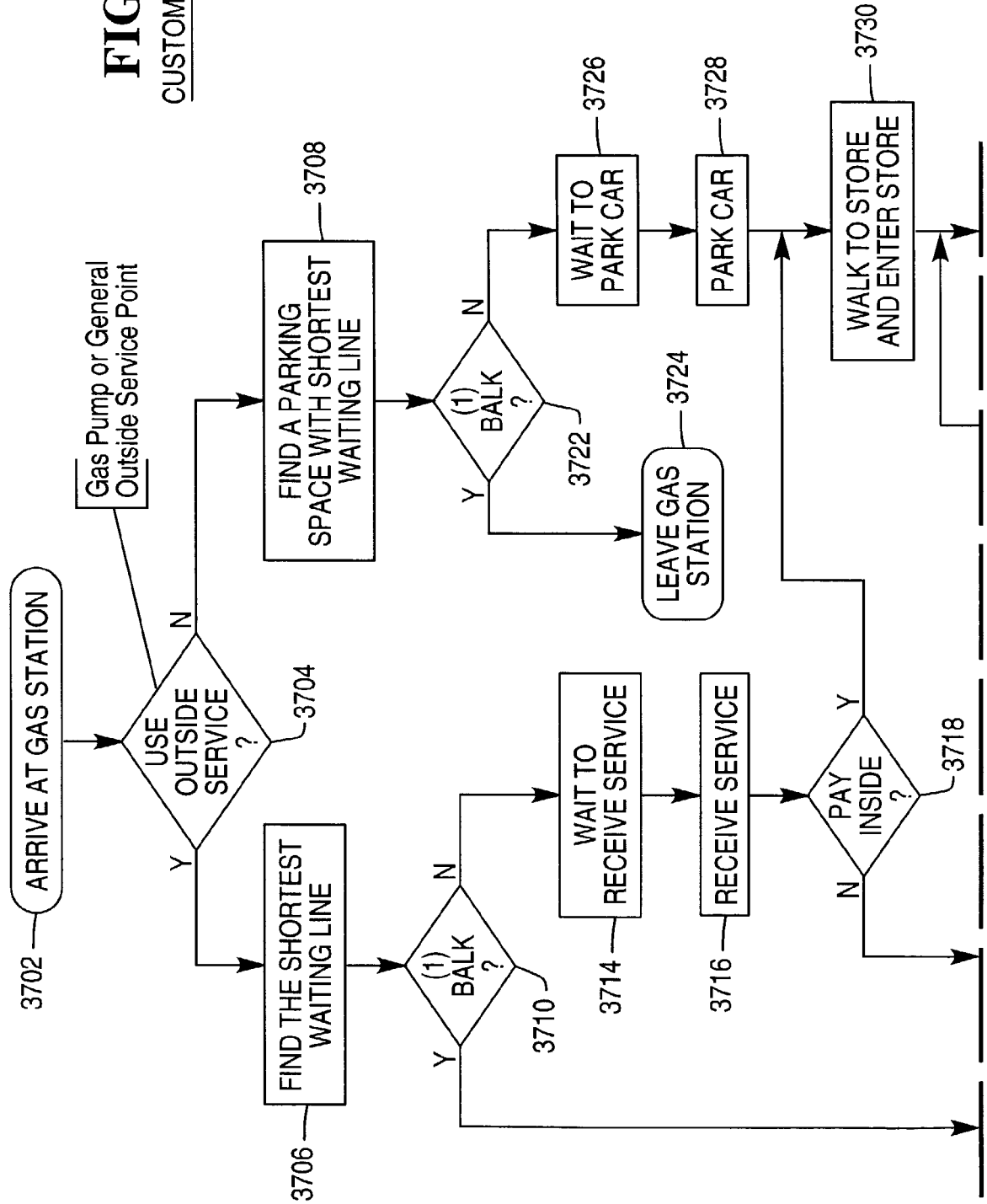
FIG. 37 is a flow diagram depicting the customer activity module.
Figure 37B:
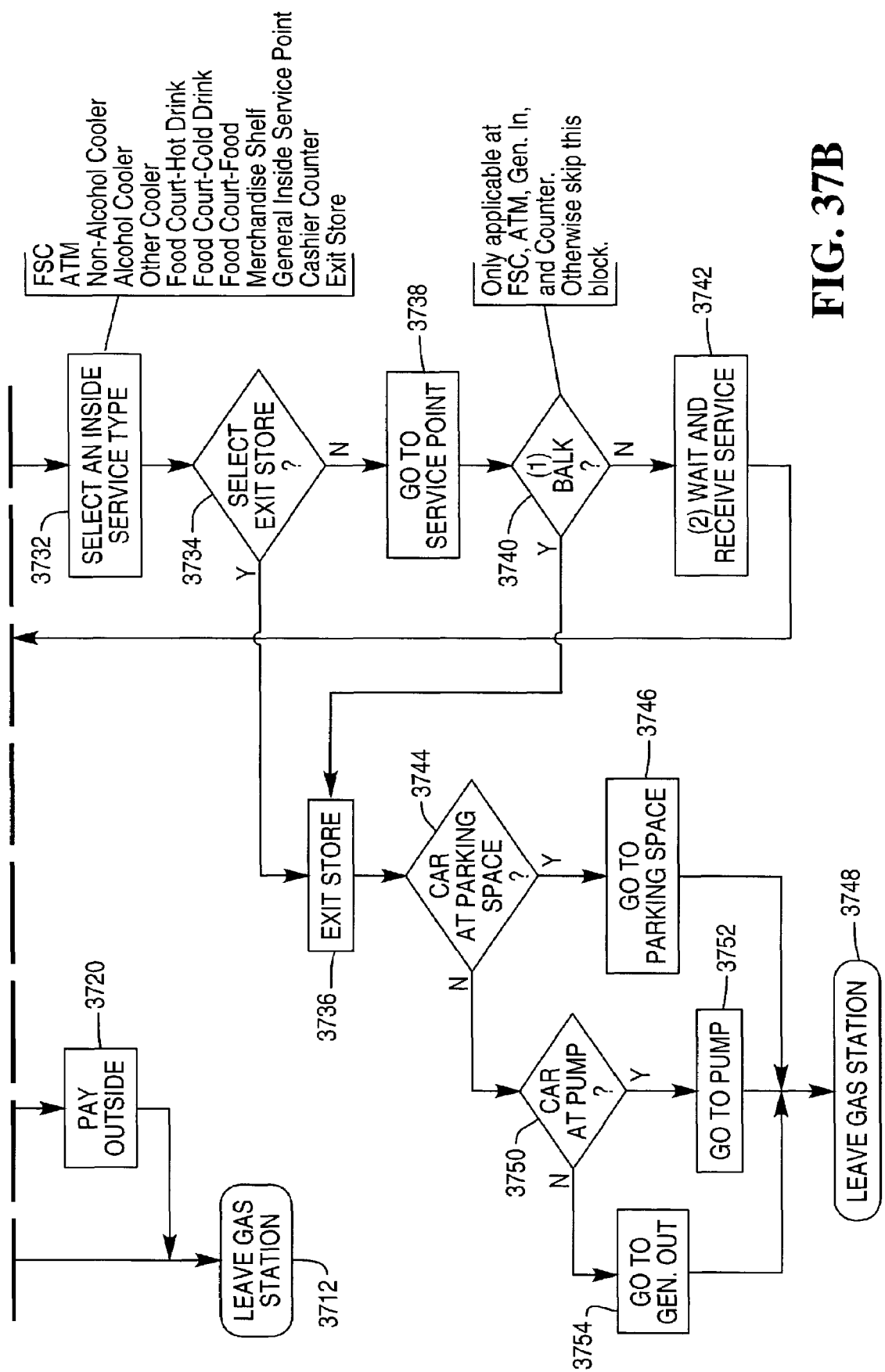

A process flow of the customer activity module is depicted in FIG. 37. At step 3702, the process starts by a customer arriving at a gas station. At step 3704, a determination is made whether a customer uses outside service. If the determination is positive, the flow proceeds to step 3706. If the determination is negative, the flow proceeds to step 3708.

Figure 38A:
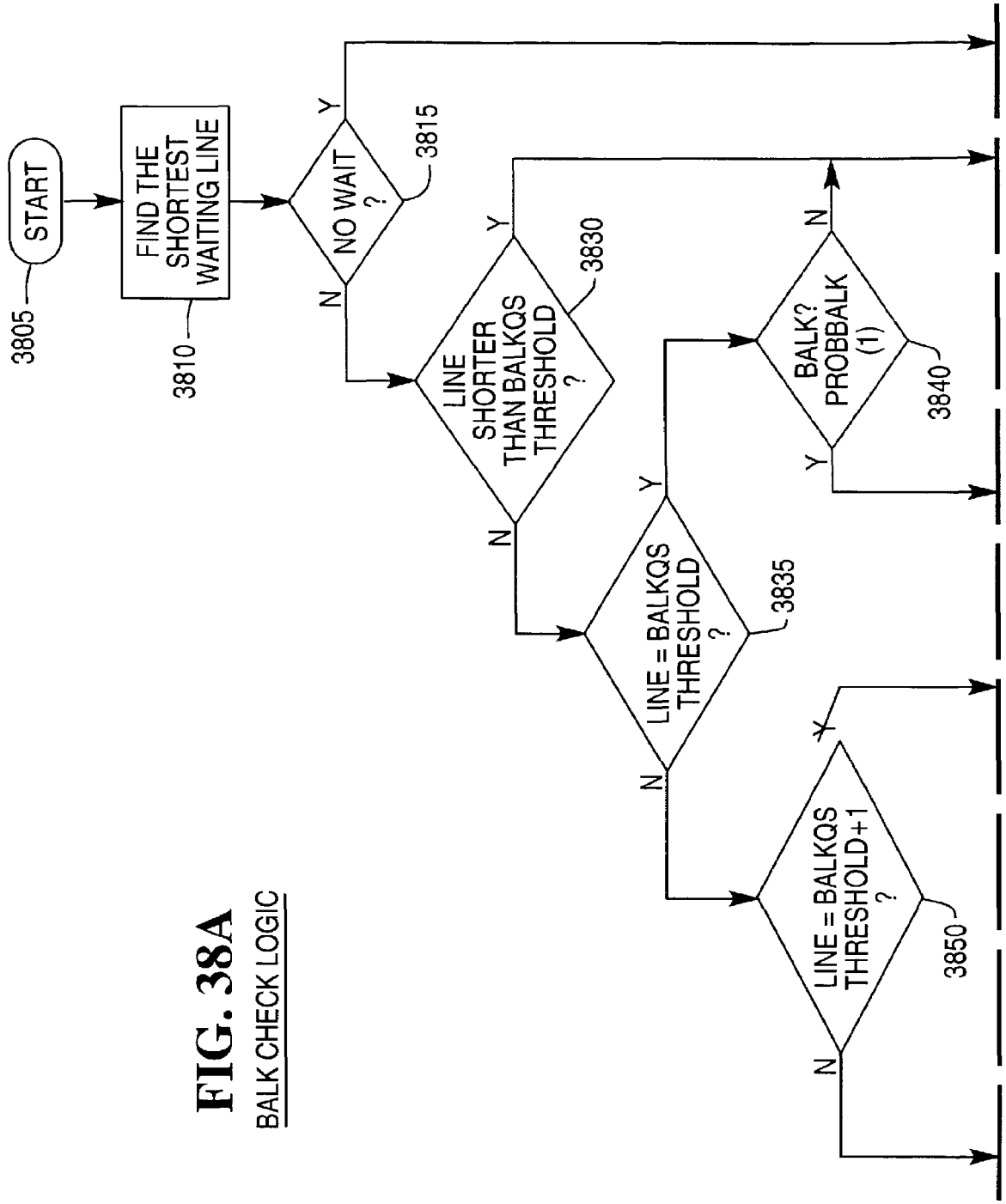
FIG. 38 is a flow diagram depicting the balk determination process.
Figure 38B:
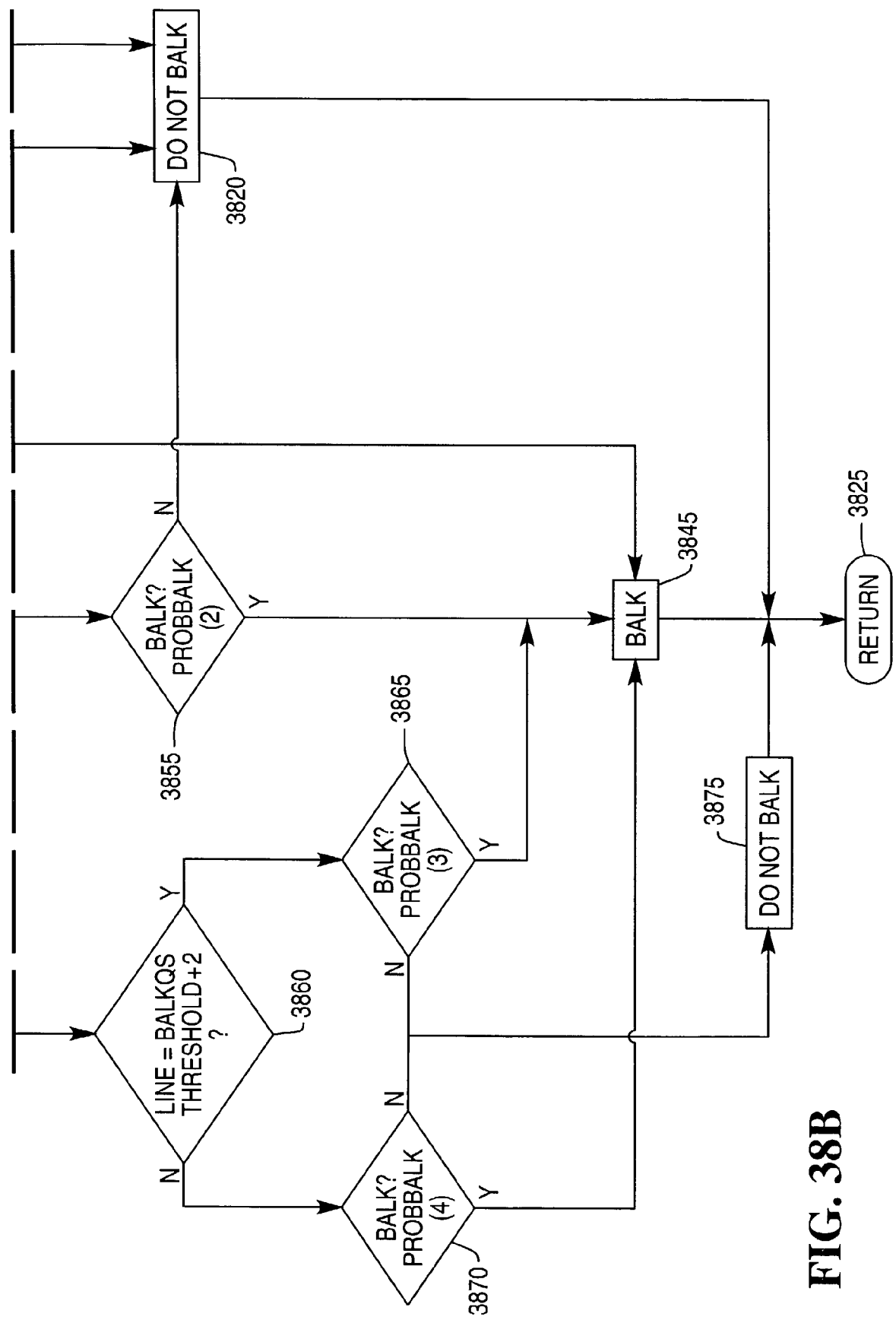

Continuing first with step 3706, at step 3706, the shortest waiting line is determined and the flow proceeds to step 3710. At step 3710, it is determined if the customer balks. The customer balk process determination is depicted in FIG. 38 and described in detail below. Continuing with the process flow of FIG. 37 at step 3710, if the determination is positive, the flow proceeds to step 3712 and the customer leaves the convenience store or gas station. If the determination at step 3710 is negative, the flow proceeds to step 3714 wherein the customer waits to receive service. At step 3716, the customer receives service and the flow proceeds to step 3718. At step 3718, a determination is made whether the customer pays inside. If the determination is negative, the flow proceeds to step 3720. At step 3720, the customer pays outside and the flow proceeds to step 3712. If the determination at step 3718 is positive, the customer will pay inside and the flow proceeds to the inside service control path branched from at step 3704.

Returning to step 3704, if the determination is negative, the flow proceeds to step 3708 wherein the customer finds a parking space with the shortest waiting line. At step 3722, a balk determination is performed as described in conjunction with step 3710 above and FIG. 38 below. If the outcome of the determination at step 3722 is positive, the flow proceeds to step 3724 wherein the customer balks and leaves the convenience store or gas station. If the outcome of the determination at step 3722 is negative, the flow proceeds to step 3726 wherein the customer waits to park the car. At step 3728, the customer parks the car. At step 3730, the customer walks to the store and enters the store. At step 3732, the customer selects an inside store service type, e.g., financial service center, automated teller machine, non-alcohol cooler, alcohol cooler, other cooler, food court, merchandise shelf, general inside service point, cashier counter, and store exit.

At step 3734, a determination is made whether the customer selected the service type of exiting the store. If the determination is positive the customer exits the store and the flow proceeds to step 3736. If the determination is negative, the flow proceeds to step 3738. At step 3738, the customer goes to a service point based on the selection at step 3732. At step 3740, another balk determination is performed as described in conjunction with FIG. 38 below. If the balk determination is positive, the flow proceeds to step 3736. If the balk determination is negative, the flow proceeds to step 3742. At step 3742, the customer waits to receive service and the flow returns to step 3732.

Continuing with step 3736, the flow proceeds to step 3744 wherein a determination is made whether the customer has a car at a parking space. If the determination at step 3744 is positive, the flow proceeds to step 3746 wherein the customer proceeds to the parking space. The flow proceeds to step 3748 wherein the customer leaves the convenience store or gas station.

Returning to step 3744, if the determination is negative, the flow proceeds to step 3750 wherein a determination is made whether the car is at a pump. If the determination is positive, the flow proceeds to step 3752 wherein the customer proceeds to the pump. The flow proceeds to step 3748. If the determination is negative, the flow proceeds to step 3754 wherein the customer leaves. The flow proceeds to step 3748.

The flow of control for the balk determination process is depicted in FIG. 38. At step 3805, the process starts. At step 3810, the shortest waiting line is determined. At step 3815, a determination is made whether there is a wait. If the determination is positive, i.e., there is no wait, the flow proceeds to step 3820 and the customer does not balk. The flow proceeds to step 3825 and returns the determination to the calling process. If the determination is negative, the flow proceeds to step 3830 wherein a determination is made whether the line is shorter than the balk queue size threshold. If the determination is positive the flow proceeds to step 3820. If the determination is negative, the flow proceeds to step 3835 wherein a determination is made whether the line, ie., service queue, is equal to the balk queue size threshold. If the determination is positive, the flow proceeds to step 3840 wherein a determination is made whether a first balk probability is achieved. If the determination at step 3840 is negative, the flow proceeds to step 3820. If the determination at step 3840 is positive, the flow proceeds to step 3845 wherein a balk occurs. The flow proceeds to step 3825.

Returning to step 3835, if the determination is negative, the flow proceeds to step 3850. At step 3850, a determination is made whether the line is equal to the balk queue size threshold plus one. If the determination is positive, the flow proceeds to step 3855 wherein a second balk probability determination is made. If the determination at step 3855 is positive, the flow proceeds to step 3845. If the determination at step 3855 is negative, the flow proceeds to step 3820.

Returning to step 3850, if the determination is negative, the flow proceeds to step 3860. At step 3860, a determination is made whether the line is equal to the balk queue size threshold plus two. If the determination is positive, the flow proceeds to step 3865 wherein a third balk probability determination is made. If the determination at step 3865 is positive, the flow proceeds to step 3845. If the determination at step 3865 is negative, the flow proceeds to step 3875 wherein a balk does not occur.

Returning to step 3860, if the determination is negative, the flow proceeds to step 3870. At step 3870, a fourth balk probability determination is made. If the determination at step 3870 is positive, the flow proceeds to step 3845 wherein a balk occurs. If the determination at step 3870 is negative, the flow proceeds to step 3875 wherein a balk does not occur.

Figure 39:
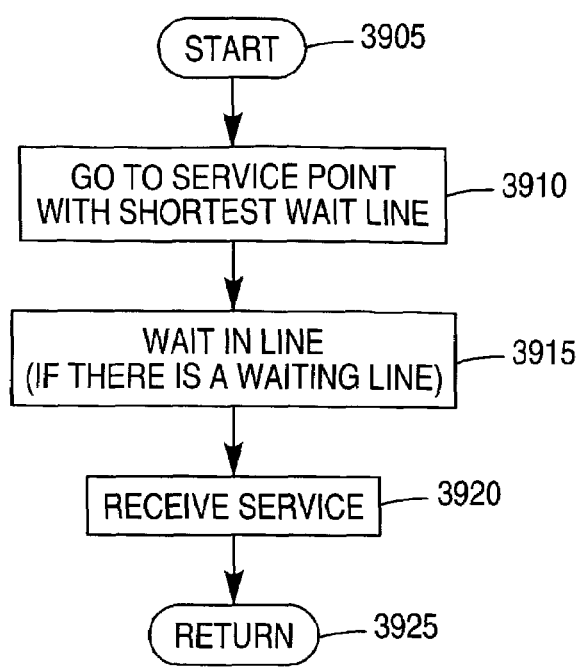
FIG. 39 is a flow diagram depicting the general service process.

The flow of control for the general service process is depicted in FIG. 39. The general service process may be executed or called from another process. At step 3905, the process starts. At step 3910, a customer proceeds to a service point with the shortest wait line. At step 3915, the customer waits in line if there is a waiting line. At step 3920, the customer receives service. At step 3925, the flow returns to the calling process.

Figure 40:
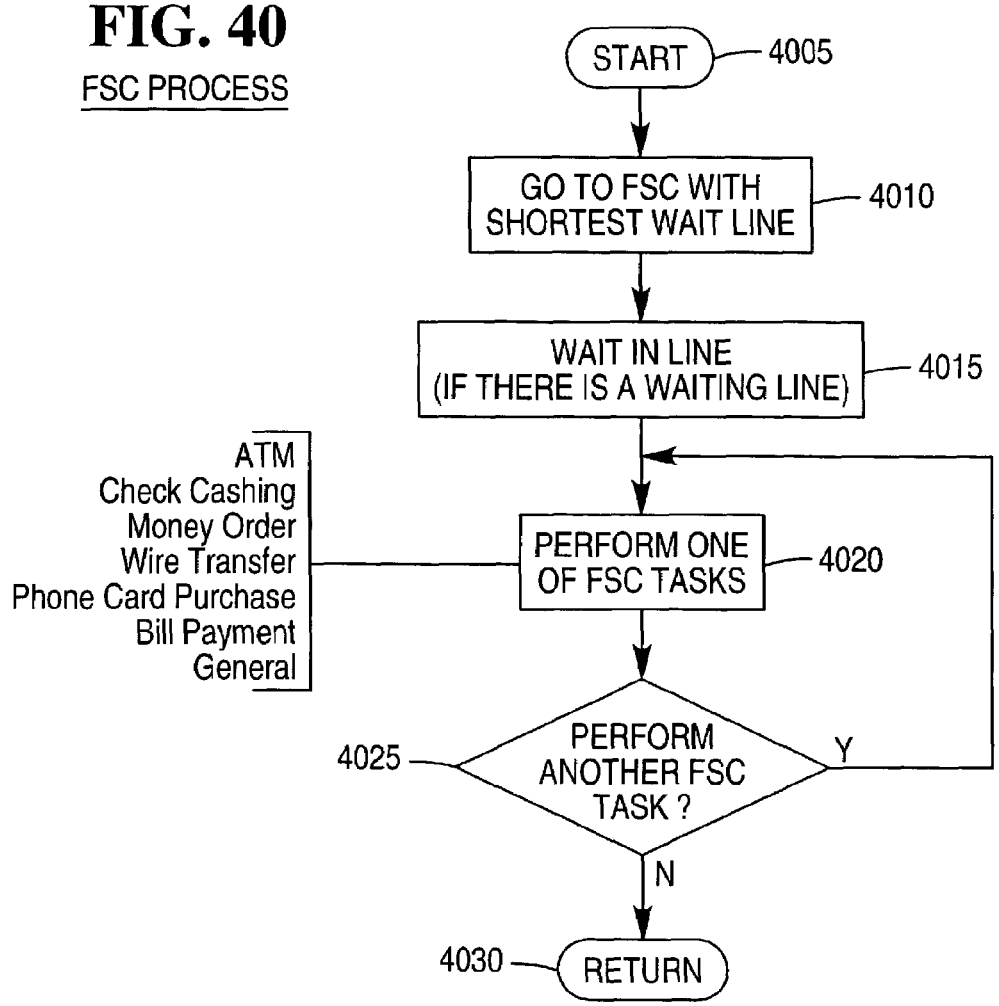
FIG. 40 is a flow diagram depicting a financial service center process.

The flow of control for the financial service center (FSC) process is depicted in FIG. 40. The financial service center process may be executed or called from another process. At step 4005, the process starts. At step 4010, the customer proceeds to the FSC having the shortest wait line. At step 4015, the customer waits in line if there is a waiting line. At step 4020, the customer performs one of the FSC tasks, i.e., ATM, check cashing, money order, wire transfer, phone card purchase, bill payment, or other general financial transaction. At step 4025, it is determined whether another FSC task is to be performed by the customer. If the outcome of the determination is positive, the flow proceeds to step 4020. If the outcome is negative, the flow proceeds to step 4030 wherein the flow returns to the calling process.

Figure 41:
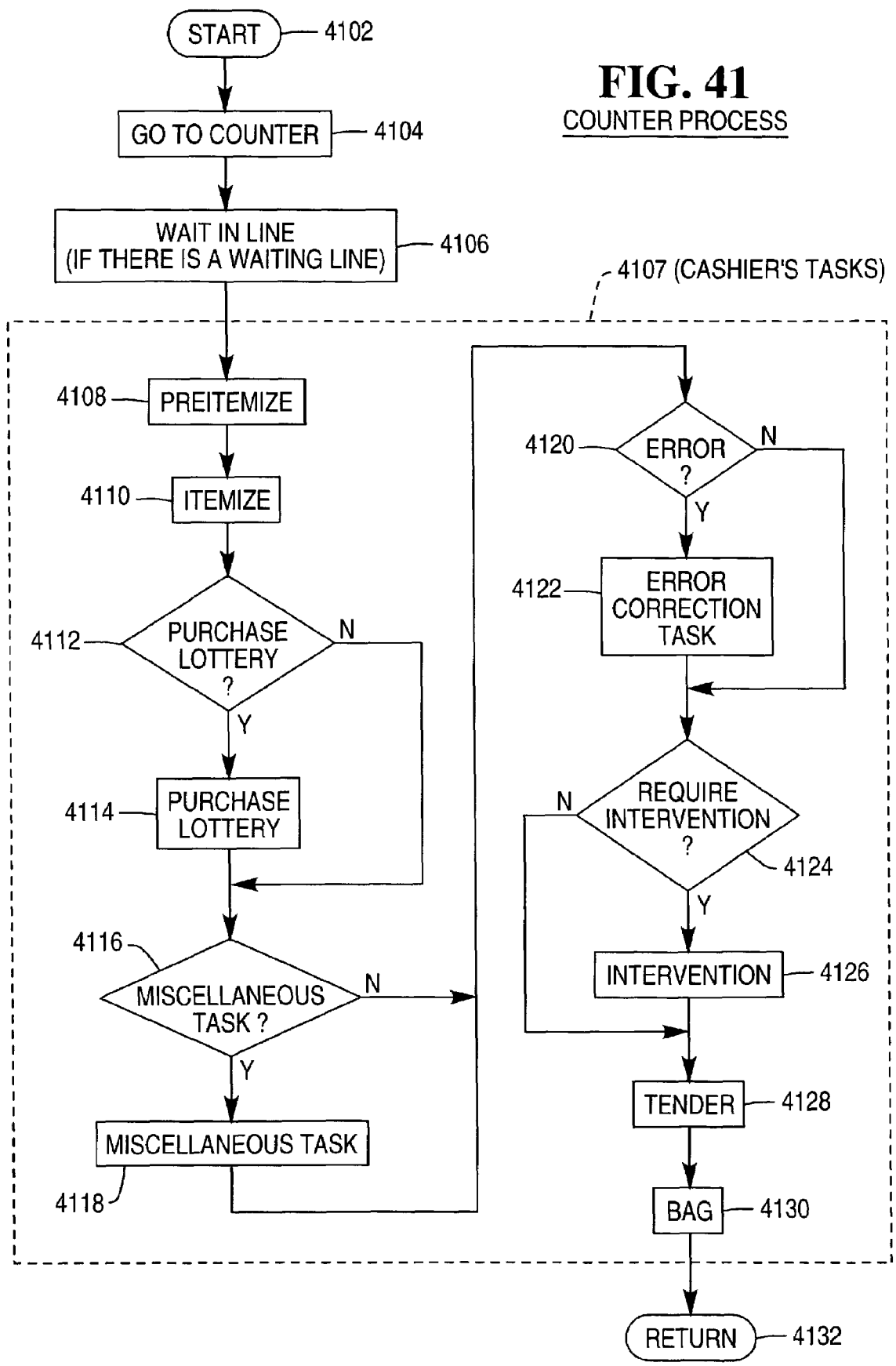
FIG. 41 is a flow diagram depicting a counter process.

The flow of control for the counter process is depicted in FIG. 41. The counter process may be executed or called from another process. At step 4102, the process starts. At step 4104, the customer proceeds to the counter. At step 4106, the customer waits in line if there is a waiting line. The flow of control then proceeds to the cashier task portion of the counter process as indicated by dotted line area of 4107. At step 4108, the cashier pre-itemizes and at step 4110 the cashier itemizes items from the customer. At step 4112, a determination is made whether the customer purchases a lottery ticket. If the outcome of the determination at step 4112 is positive, the flow proceeds to step 4114 wherein a lottery ticket is purchased and the flow proceeds to step 4116. If the outcome of the determination at step 4112 is negative, the flow proceeds to step 4116.

At step 4116, a determination is made whether a miscellaneous task is requested. If the outcome of the determination is positive, the miscellaneous task is performed at step 4118 and the flow proceeds to step 4120. If the outcome is negative, the flow proceeds to step 4120. At step 4120, a determination is made whether an error occurred. If the outcome of the determination at step 4120 is positive, an error correction task is performed at step 4122 and the flow proceeds to step 4124. If the outcome is negative, the flow proceeds to step 4124.

At step 4124, a determination is made whether intervention is required. If the outcome of the determination at step 4124 is positive then intervention occurs at step 4126 and the flow proceeds to step 4128. If the outcome of the determination at step 4124 is negative, the flow proceeds to step 4128.

At step 4128, a tender occurs. At step 4130, the customer items are bagged. At step 4132, the flow returns to the calling process.

Figure 42A:
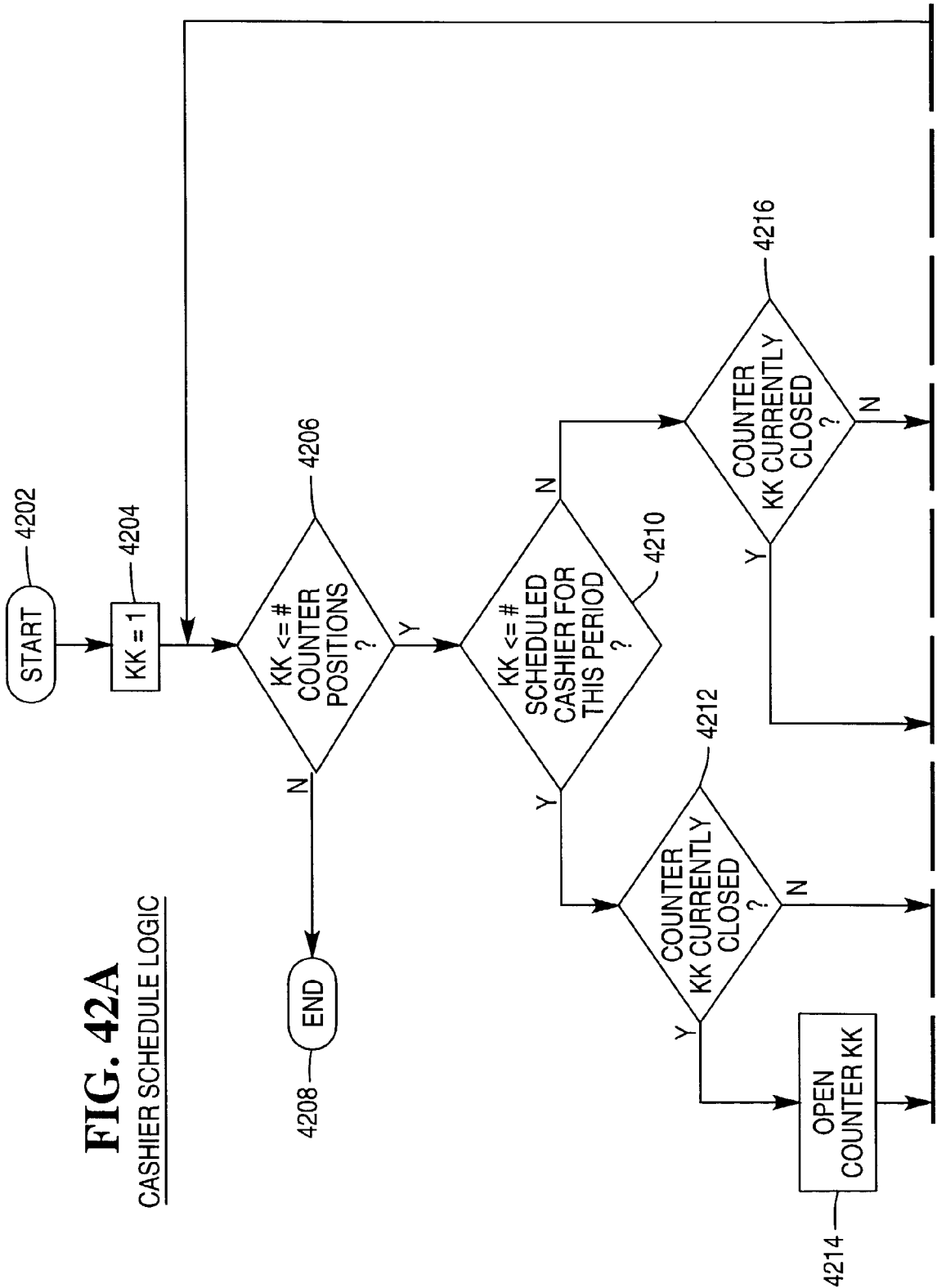
FIG. 42 is a flow diagram depicting a cashier schedule process.
Figure 42B:
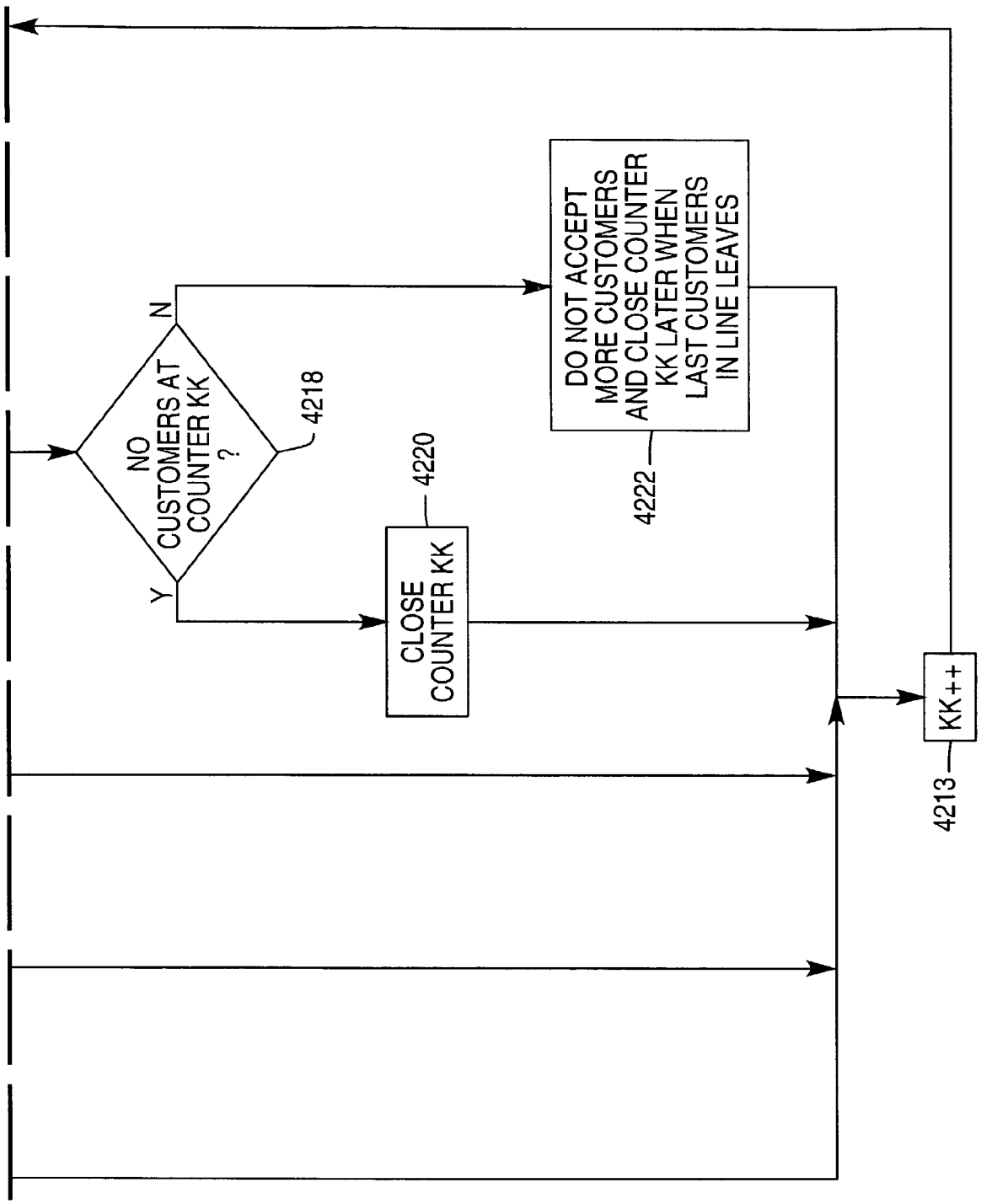

FIG. 42 depicts the flow of control for a cashier schedule process. The process starts at step 4202. At step 4204, KK is set to one. At step 4206, a determination is made whether KK is less than or equal to the number of counter positions. If the outcome of the step 4206 determination is negative, the flow proceeds to step 4208 wherein the flow returns to the calling process. If the outcome of the step 4206 determination is positive, the flow proceeds to step 4210.

At step 4210, a determination is made whether KK is less than or equal to the number of scheduled cashiers for the time period. If the outcome of the determination is positive, the flow proceeds to step 4212. At step 4212, a determination is made whether counter KK is currently closed. If the outcome is negative, the flow proceeds to step 4213 wherein KK is incremented and the flow proceeds to step 4206. If the outcome is positive, the flow proceeds to step 4214 wherein counter KK is opened and the flow proceeds to step 4213.

Returning to step 4210, if the outcome of the determination is negative, the flow proceeds to step 4216. At step 4216, a determination is made whether counter KK is currently closed. If the outcome of the determination is positive, the flow proceeds to step 4213. If the outcome of the determination is negative, the flow proceeds to step 4218.

At step 4218, a determination is made whether there are no customers at counter KK. If the outcome of the determination is positive, i.e., there are no customers at the counter, the flow proceeds to step 4220. At step 4220, counter KK is closed and the flow proceeds to step 4213. If the outcome of the determination at step 4218 is negative, the flow proceeds to step 4222. At step 4222, more customers are not accepted and counter KK is later closed when the last customer in line is served. The flow then proceeds to step 4213. The cashier schedule process is typically executed on half hour intervals of simulation time although different intervals may be used.

Figure 43:
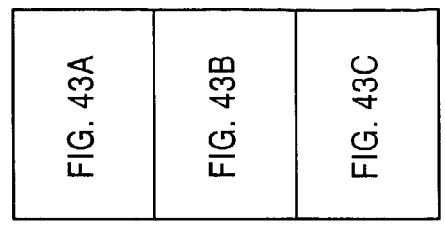
FIG. 43 is a flow diagram depicting a customer transaction process at a financial service center.
Figure 43C:
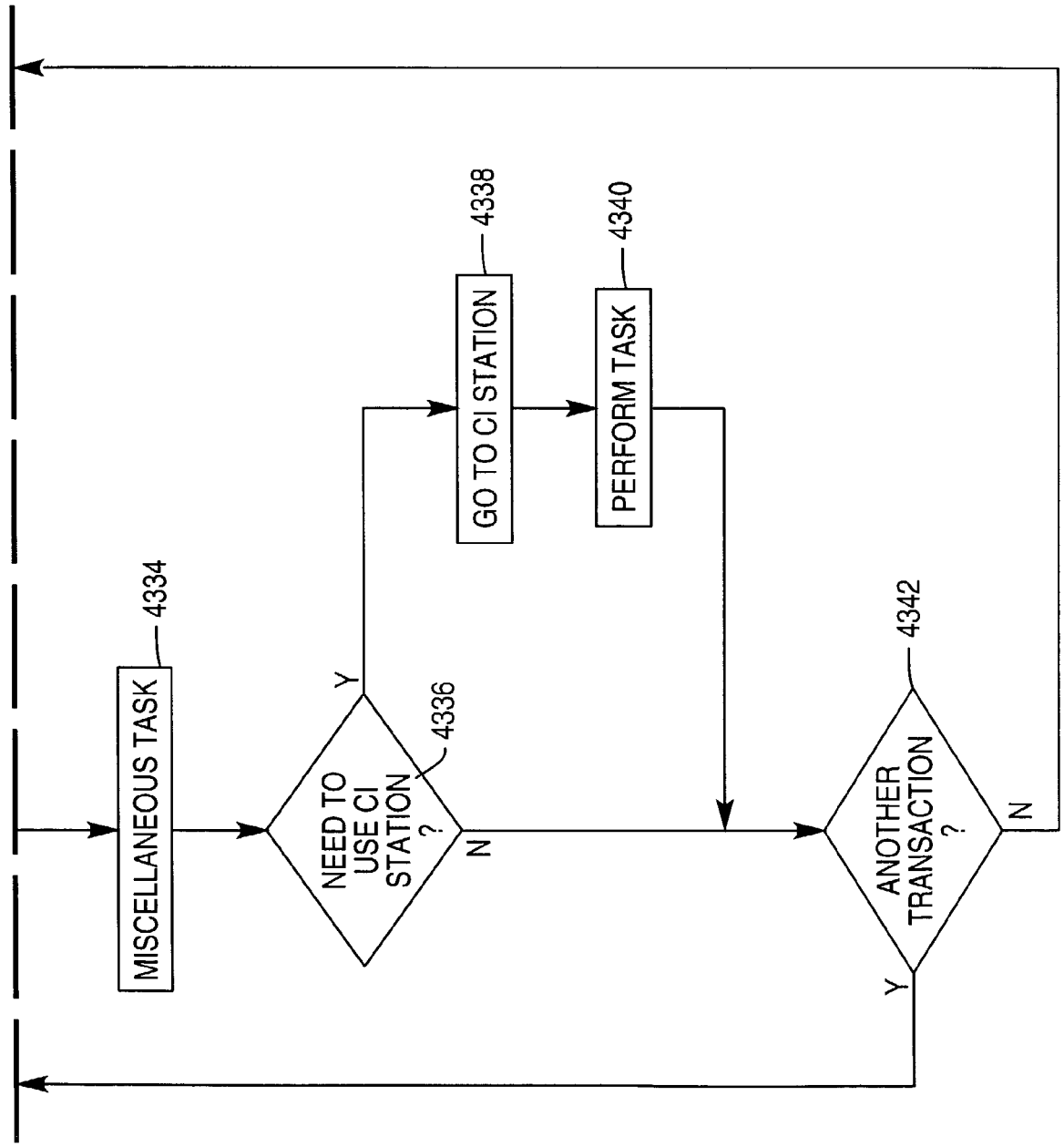
Figure 43A:
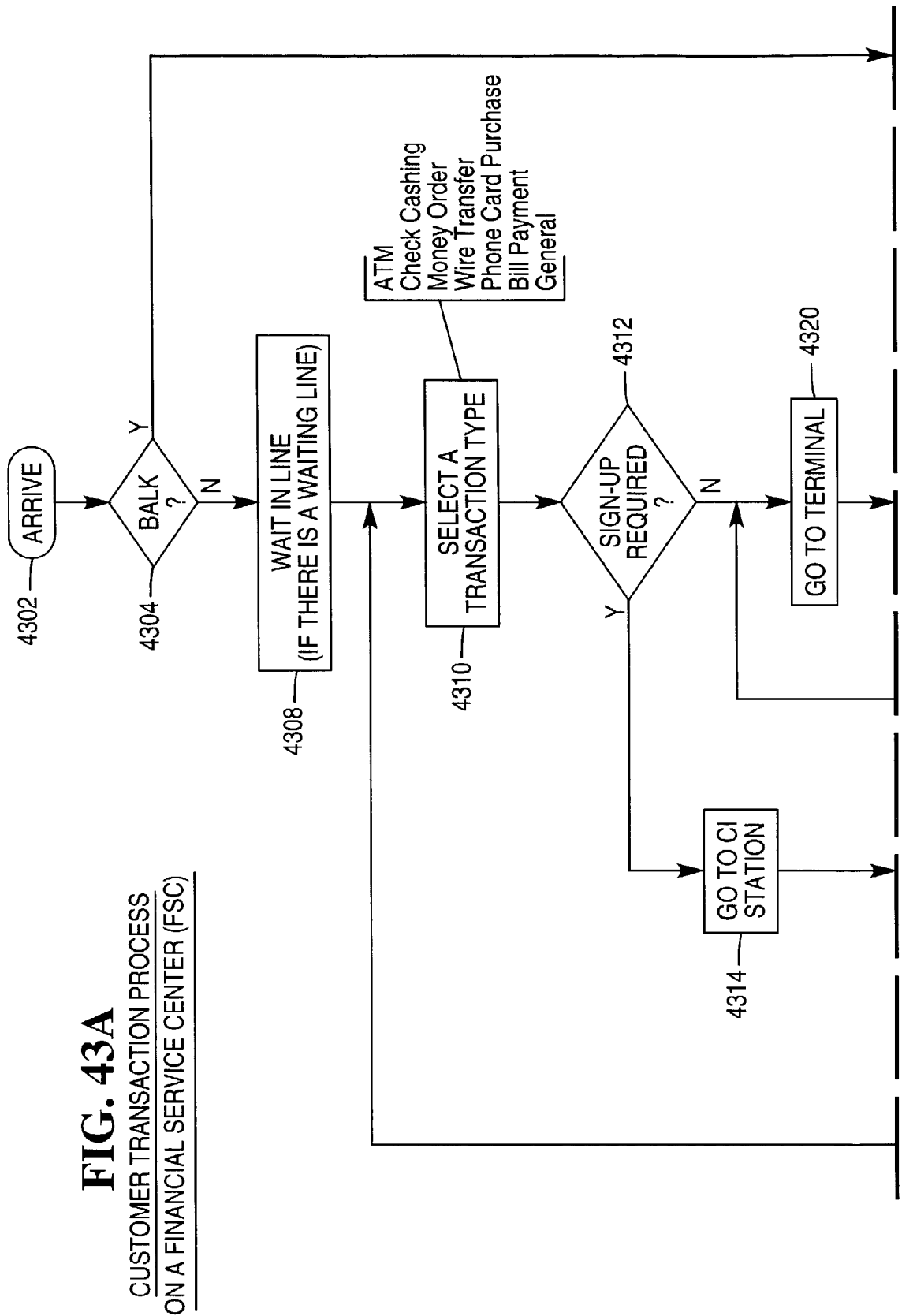
Figure 43B:
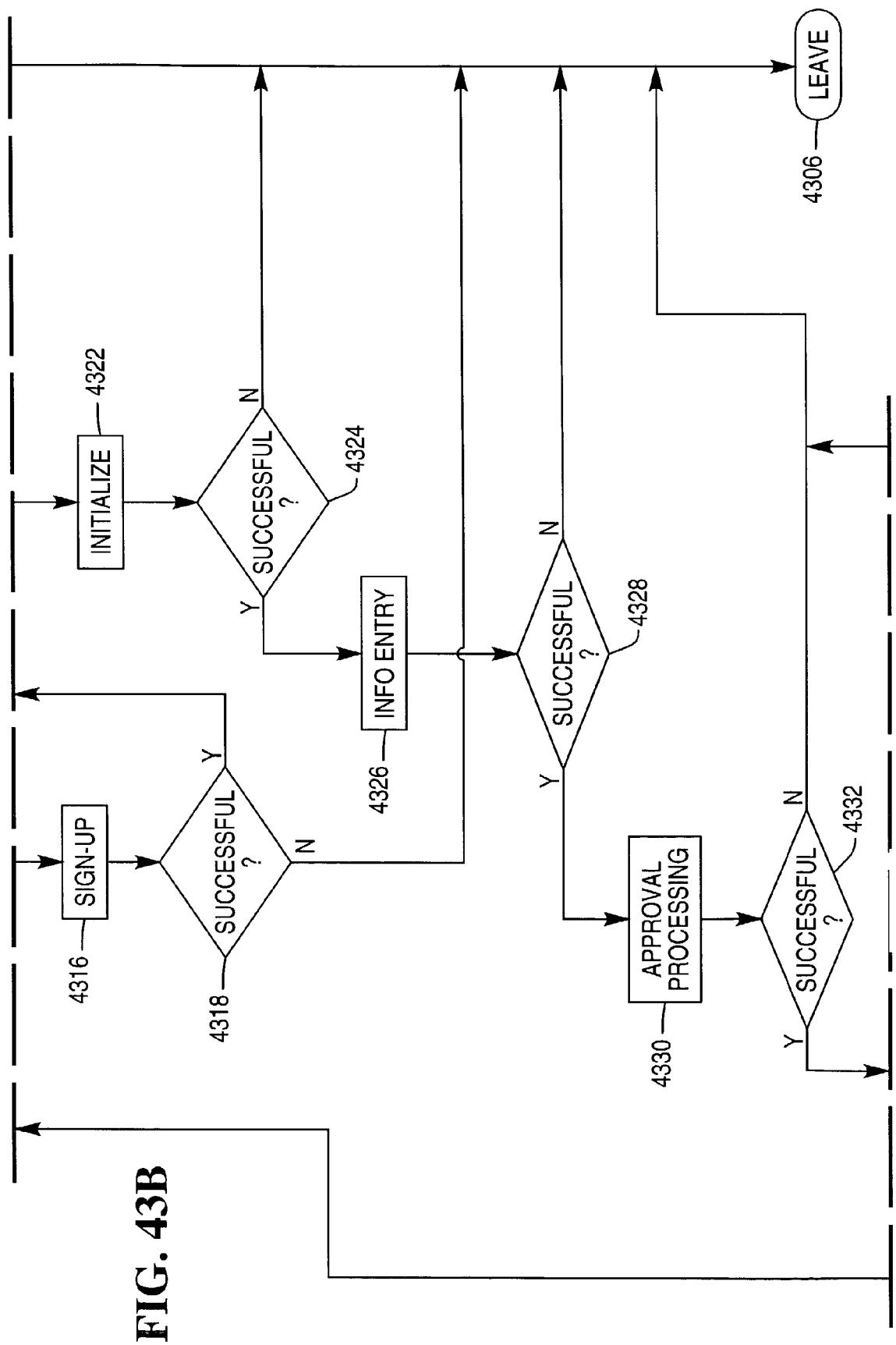

The flow of control of a customer transaction process at a FSC is depicted in FIG. 43. At step 4302, the process starts. At step 4304, a balk determination is performed as described above. If the outcome of the step 4304 determination is positive, the flow proceeds to step 4306 wherein the customer leaves. If the outcome of the step 4304 determination is negative, the flow proceeds to step 4308.

At step 4308, the customer waits in line if there is a waiting line. At step 4310, a transaction type is selected, e.g., ATM, check cashing, money order, wire transfer, phone card purchase, bill payment, or general transaction. At step 4312, a determination is made whether sign up is required for the transaction of step 4310. If the outcome of the step 4312 determination is positive, the flow proceeds to step 4314.

At step 4314, the customer proceeds to a CI station. At step 4316, the customer signs up and the flow proceeds to step 4318. At step 4318, a determination is made whether the sign up was successful. If the outcome is negative, the flow proceeds to step 4306. If the outcome of the step 4318 determination is positive, the flow proceeds to step 4320.

Returning to step 4312, if the outcome of the determination is negative, the flow proceeds to step 4320. At step 4320, the customer proceeds to a terminal and the flow proceeds to step 4322. At step 4322, an initialize is performed. At step 4324, a determination is made whether the initialize was successful. If the outcome of the determination is negative, the flow proceeds to step 4306. If the outcome of the step 4324 determination is positive, the flow proceeds to step 4326.

At step 4326, information is entered. At step 4328, a determination is made whether the entry was successful. If the determination is negative, the flow proceeds to step 4306. If the determination at step 4328 is positive, the flow proceeds to step 4330.

At step 4330, approval processing occurs and the flow proceeds to step 4332. At step 4332, a determination is made whether the approval is successful. If the outcome of the step 4332 determination is negative, the flow proceeds to step

4306. If the outcome of the step 4332 determination is positive, the flow proceeds to step 4334 wherein a miscellaneous task is performed. A step 4336, a determination is made whether a customer needs to use a CI station. If the outcome of the determination is positive, the flow proceeds to step 4338 wherein the customer proceeds to a CI station. At step 4340, the task is performed and the flow proceeds to step 4342.

If the outcome of the step 4336 determination is negative, the flow proceeds to step 4342. At step 4342, a determination is made whether another transaction is performed. If the outcome of the determination is positive, the flow proceeds to step 4310 and if the outcome is negative, the flow proceeds to step 4306.

Advantageously, the Convenience Store Effectiveness Model (CSEM) is a self-contained PC desktop application enabling an analyst to quantitatively predict the operational and financial impact of changes to Convenience Store and Financial Services Center (FSC) operations. This application contains a Simulation Analysis Module and a Financial Analysis Module. The Simulation Module consists of two simulation models: FSC model and CStore model. The FSC model represents the detailed transaction process performed by customers at a Financial Services Center. This model allows the user or analyst to predict the effect of changes in FSC design, transaction features, and transaction times on customer service (e.g., queue times, queue size, and throughput). The CStore model represents the complex interactions between customers, staff, and the primary service points of a Convenience Store (e.g., gas pumps, parking spaces, food courts, self-service points, checkout counters, etc.). An analyst can use the CStore model to predict the effect of an unlimited number of changes in store design, customer demand patterns, and checkout procedures on store performance. The Financial Analysis Module allows the user to create a Profit and Loss (P&L) statement showing the cash flows, Net Value (NPV), Internal Rate of Return (IRR) for deploying FSCs using simulation or user input values. An analyst can use the CSEM to provide a sound and ed basis for developing a business case for investing in new technologies, i.e., other design and procedure changes in a convenience store environment.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer-implemented method of quantitatively evaluating alternative convenience store and alternative financial services center operations using a simulation model, comprising: inputting parameter values describing the alternative convenience store and the alternative financial services center operations into the simulation model wherein the operations represent complex interactions between customers, staff and convenience store service points; running the simulation model by the computer wherein the parameter values describing the alternative convenience store and the alternative financial services center operations are transformed into performance results where the transformation is performed in either an unlimited arrival mode or a limited arrival mode: and outputting the results from the simulation model where the results predict the effect of the alternative financial services center's operations on the alternative convenience store.

2. The method of claim 1, wherein the input parameters are listed in a data input dictionary used to define the parameters used in the simulation model.

3. The method of claim 1, wherein the simulation model includes one of a financial service center model and a convenience store model.

4. The method of claim 3, wherein the financial service center model includes the ability to model changes in financial service center design, transaction features, and transaction times.

5. The method of claim 1, wherein the simulation model simulates a number and type of service points, transaction times, customer arrival patterns, number of items purchased, and personnel schedules.

6. The method of claim 3, wherein the convenience store model includes simulation parameter categories of model parameters, customer demand, transaction characteristics, labor schedule, and configuration.

7. The method of claim 3, wherein the financial service center model includes simulation parameter categories of model parameters, customer demand, transaction probabilities, ATM transactions, check transactions, bill payment transactions, money order transactions, wire transfer transactions, phone card transactions, and general transactions.

8. The method of claim 1, wherein the parameters are divided into a customer demand category, a transaction characteristics category, a labor schedule category, a configuration category, and a financial parameters category.

9. The method of claim 8, wherein the configuration category includes parameters defining the length and resources in a scenario.

10. The method of claim 9, wherein the resources include a number of checkout counters and number of financial service centers.

11. The method of claim 8, wherein the customer demand category has parameters controlling the workload of the alternative convenience store.

12. The method of claim 11, wherein the parameters that control the workload include a number of customer arrivals, where customers go, and number of items purchased.

13. The method of claim 8, wherein the parameters include a number of replications, a stream number identifier and check input option identifier.

14. The method of claim 1, further comprising editing the input parameter values.

15. The method of claim 1, wherein the input parameter values include a value and a range.

16. The method of claim 1, further comprising one of outputting a report and displaying an animation of the results of the simulation.

17. The method of claim 1, further comprising repeating said running step and step outputting step.

18. The method of claim 1, wherein the results of said outputting step include performance measurements for each type of resource.

19. The method of claim 3, wherein the convenience store model includes non-scalar parameters.

20. The method of claim 19, wherein the non-scalar parameters include an expected number of arrivals, a balking probability, a customer decision matrix, a cashier schedule, a supervisor schedule, a number of items purchased distribution, and a number of gallons of gas purchased distribution.

21. A computer-implemented method of quantitatively evaluating alternative convenience store and financial services center operations using a simulation model and a financial analysis model, comprising: inputting parameter values describing the alternative convenience store operations into the simulation model and the financial analysis model, wherein the simulation model comprises a financial services center model and a convenience store simulation model and wherein the operations represent complex interactions between customers, staff and convenience store service points; running the simulation model by the computer; running the financial analysis model; transforming the parameter values describing the alternative convenience store operations into performance results where the transforming step is performed in either an unlimited arrival mode or a limited arrival mode and uses both the simulation model and the financial analysis model; outputting the results from the financial analysis model; and outputting the results from the simulation model wherein the results from the two models predict the effect of the alternative convenience store and financial services center operations.

22. The method of claim 21, wherein the financial analysis model enables the user to create a profit and loss statement for the alternative convenience store.

23. The method of claim 22, wherein the profit and loss statement includes a cash flow, a net present value, and an internal rate of return.

* * * * *